US011937246B2

(12) United States Patent
Babaei

(10) Patent No.: US 11,937,246 B2
(45) Date of Patent: Mar. 19, 2024

(54) PUCCH CELL SWITCHING AND CELL ACTIVATION/DEACTIVATION STATUS

(71) Applicant: Alireza Babaei, Fairfax, VA (US)

(72) Inventor: Alireza Babaei, Fairfax, VA (US)

(73) Assignee: PanPsy Technologies, LLC, Fairfax, VA (US)

( * ) Notice: Subject to any disclaimer, the term of this patent is extended or adjusted under 35 U.S.C. 154(b) by 0 days.

(21) Appl. No.: 17/954,626

(22) Filed: Sep. 28, 2022

(65) Prior Publication Data
US 2023/0102290 A1     Mar. 30, 2023

Related U.S. Application Data

(60) Provisional application No. 63/249,528, filed on Sep. 28, 2021.

(51) Int. Cl.
*H04W 72/21*     (2023.01)
*H04W 48/20*     (2009.01)

(52) U.S. Cl.
CPC ........... *H04W 72/21* (2023.01); *H04W 48/20* (2013.01)

(58) Field of Classification Search
CPC .... H04L 5/0053; H04L 5/0055; H04L 5/0057
See application file for complete search history.

(56) References Cited

U.S. PATENT DOCUMENTS

2022/0053522 A1*   2/2022   MolavianJazi ....... H04W 72/20
2023/0055203 A1*   2/2023   Huang ................ H04W 72/044

FOREIGN PATENT DOCUMENTS

WO    WO-2023007565 A1 *   2/2023

OTHER PUBLICATIONS

3GPP TS 38.211 V16.6.0 (Jun. 2021-06); Technical Specification; 3rd Generation Partnership Project; Technical Specification Group Radio Access Network; NR; Physical channels and modulation; (Release 16).
3GPP TS 38.212 V16.6.0 (Jun. 2021); Technical Specification; 3rd Generation Partnership Project; Technical Specification Group Radio Access Network; NR; Multiplexing and channel coding; (Release 16).
3GPP TS 38.213 V16.6.0 (Jun. 2021); Technical Specification; 3rd Generation Partnership Project; Technical Specification Group Radio Access Network; NR; Physical layer procedures for control; (Release 16).
3GPP TS 38.214 V16.6.0 (Jun. 2021); Technical Specification; 3rd Generation Partnership Project; Technical Specification Group Radio Access Network; NR; Physical layer procedures for data; (Release 16).

(Continued)

*Primary Examiner* — Bo Hui A Zhu
(74) *Attorney, Agent, or Firm* — Alireza Babaei

(57) ABSTRACT

A wireless device may receive a configuration parameter of a time-domain pattern indicating first timings that a first cell in a PUCCH group and second timings, including a transmission timing, that a second cell in the PUCCH group is the cell configured for PUCCH transmission. The wireless device may transmit uplink control information in the transmission timing via the second cell or via the first cell based on the activation or deactivation status of the second cell in the transmission timing.

18 Claims, 38 Drawing Sheets

(56) References Cited

OTHER PUBLICATIONS

3GPP TS 38.300 V16.6.0 (Jun. 2021); Technical Specification; 3rd Generation Partnership Project; Technical Specification Group Radio Access Network; NR; NR and NG-RAN Overall Description; Stage 2; (Release 16).

3GPP TS 38.321 V16.5.0 (Jun. 2021); Technical Specification; 3rd Generation Partnership Project; Technical Specification Group Radio Access Network; NR; Medium Access Control (MAC) protocol specification; (Release 16).

3GPP TS 38.331 V16.5.0 (Jun. 2021-06); Technical Specification; 3rd Generation Partnership Project; Technical Specification Group Radio Access Network; NR; Radio Resource Control (RRC); Protocol specification; (Release 16).

3GPP TSG-RAN WG1 Meeting #105-e; Tdoc R1-2104217; e-Meeting, May 10-27, 2021; Agenda Item: 8.3.1.1; Source: Ericsson; Title: HARQ-ACK Enhancements for IIoT/URLLC; Document for: Discussion, Decision.

3GPP TSG RAN WG1 #105-e; R1-2104262; e-Meeting, May 10-27, 2021; Agenda Item: 8.3.1.1; Source: Huawei, HiSilicon; Title: UE feedback enhancements for HARQ-ACK; Document for: Discussion and Decision.

3GPP TSG RAN WG1 #105-e; R1-2104309; e-Meeting, May 19-27, 2021; Agenda item: 8.3.1.1; Source: Nokia, Nokia Shanghai Bell; Title: HARQ-ACK Feedback Enhancements for URLLC/IIoT; Document for: Discussion and Decision.

3GPP TSG RAN WG1 Meeting #105-e; R1-2104326; e-Meeting, May 10-27, 2021; Source: ZTE; Title: Discussion on HARQ-ACK enhancements for eURLLC; Agenda item: 8.3.1.1; Document for: Discussion and Decision.

3GPP TSG RAN WG1#105-e; R1-2104353; e-Meeting, May 10-27, 2021; Source: vivo; Title: HARQ-ACK enhancements for Rel-17 URLLC; Agenda Item: 8.3.1.1; Document for: Discussion and Decision.

3GPP TSG RAN WG1 #105-e; R1-2104512; e-Meeting, May 19-27, 2021; Source: CATT; Title: UE feedback enhancements for HARQ-ACK; Agenda Item: 8.3.1.1; Document for: Discussion and Decision.

3GPP TSG RAN WG1 #105-e; R1-2104663; e-Meeting, May 10-27, 2021; Agenda item: 8.3.1.1; Source: Qualcomm Incorporated; Title: HARQ-ACK enhancement for IOT and URLLC; Document for: Discussion/Decision.

3GPP TSG RAN WG1 #105-e; R1-2104854; e-Meeting, May 10-27, 2021; Agenda item: 8.3.1.1; Source: China Telecom; Title: Discussion on two aspects of UE HARQ-ACK feedback enhancements; Document for: Discussion.

3GPP TSG RAN WG1 #105-e; R1-2104899; e-Meeting, May 10-27, 2021; Source: Intel Corporation; Title: On dynamic carrier switching and dropped HARQ feedback retransmission; Agenda item: 8.3.1.1; Document for: Discussion and Decision.

3GPP TSG-RAN WG1 Meeting #105-e; R1-2105097; e-Meeting, May 10-27, 2021; Agenda Item: 8.3.1.1; Source: Apple Inc.; Title: Views on URLLC HARQ feedback enhancements; Document for: Discussion/Decision.

3GPP TSG RAN WG1 #105-e; R1-2105188; e-Meeting, May 10-27, 2021; Source: Panasonic; Title: Discussion on UE feedback enhancements for HARQ-ACK; Agenda Item: 8.3.1.1; Document for: Discussion.

3GPP TSG RAN WG1 #105-e; R1-2105212; e-Meeting, May 10-27, 2021; Source: ETRI; Title: UE feedback enhancements for HARQ-ACK; Agenda Item: 8.3.1.1 UE feedback enhancements for HARQ-ACK; Document for: Discussion.

3GPP TSG RAN WG1 #105-e; R1-2105258; e-Meeting, May 10-27, 2021; Source: NEC; Title: UE feedback enhancements for HARQ-ACK; Agenda Item: 8.3.1.1; Document for: Discussion and Decision.

3GPP TSG RAN WG1 #105; R1-2105302; e-Meeting, May 19-27, 2021; Agenda item: 8.3.1.1; Source: Samsung; Title: HARQ-ACK Reporting Enhancements for URLLC; Document for: Discussion and Decision.

3GPP TSG RAN WG1 #105-e; R1-2105425; e-Meeting, May 10-27, 2021; Agenda Item: 8.3.1.1; Source: LG Electronics; Title: Discussion on UE feedback enhancement for HARQ-ACK; Document for: Discussion and decision.

3GPP TSG RAN WG1 #105-e; R1-2105693; e-Meeting, May 10-27, 2021; Source: NTT Docomo, Inc.; Title: Discussion on HARQ-ACK feedback enhancements for Rel.17 URLLC; Agenda Item: 8.3.1.1; Document for: Discussion and Decision.

3GPP TSG RAN WG1 Meeting #105-e; R1-2105732; e-Meeting, May 10-27, 2021; Agenda Item: 8.3.1.1; Source: MediaTek Inc.; Title: On UE feedback enhancements for HARQ-ACK; Document for: Discussion and Decision.

3GPP TSG RAN WG1 Meeting #105; R1-2105750; e-Meeting, May 10-27, 2021; Source: CAICT; Title: UE feedback enhancements for HARQ-ACK; Agenda Item: 8.3.1.1; Document for: Discussion / Decision.

3GPP TSG RAN WG1 #105; R1-2105766; e-Meeting, May 10-27, 2021; Agenda item: 8.3.1.1; Source: Lenovo, Motorola Mobility; Title: HARQ-ACK feedback enhancement for IIoT/URLLC; Document for: Discussion and Decision.

3GPP TSG RAN WG1 #105-e; R1-2105872; e-Meeting, May 10-27, 2021; Source: WILUS Inc.; Title: Discussion on HARQ-ACK enhancement for URLLC/IIoT; Agenda item: 8.3.1.1; Document for: Discussion/Decision.

3GPP TSG RAN WG1 Meeting #106-e; R1-2106490; E-meeting, Aug. 16-27, 2021; Agenda Item: 8.3.1.1; Source: Huawei, HiSilicon; Title: UE feedback enhancements for HARQ-ACK; Document for: Discussion and Decision.

3GPP TSG RAN WG1#106-e; R1-2106586; e-Meeting, Aug. 16-27, 2021; Source: vivo; Title: HARQ-ACK enhancements for Rel-17 URLLC; Agenda Item: 8.3.1.1; Document for: Discussion and Decision.

3GPP TSG RAN WG1 #106-e; R1-2106636; e-Meeting, Aug. 16-27, 2021; Agenda item: 8.3.1.1; Source: Nokia, Nokia Shanghai Bell; Title: HARQ-ACK Feedback Enhancements for URLLC/IIoT; Document for: Discussion and Decision.

3GPP TSG-RAN WG1 Meeting #106-e; R1-2106678; e-Meeting, Aug. 16-27, 2021; Agenda Item: 8.3.1.1; Source: Ericsson; Title: HARQ-ACK Enhancements for IIoT/URLLC; Document for: Discussion, Decision.

3GPP TSG RAN WG1 Meeting #106-e; R1-2106734; e-Meeting, Aug. 16-27, 2021; Source: ZTE; Title: Discussion on HARQ-ACK enhancements for eURLLC; Agenda item: 8.3.1.1; Document for: Discussion and Decision.

3GPP TSG RAN WG1 #106-e; R1-2106879; e-Meeting, Aug. 16-27, 2021; Agenda Item: 8.3.1.1; Source: Samsung; Title: On HARQ-ACK reporting enhancements; Document for: Discussion and decision.

3GPP TSG RAN WG1 #106-e; R1-2106962; e-Meeting, Aug. 16-27, 2021; Source: CATT; Title: UE feedback enhancements for HARQ-ACK; Agenda Item: 8.3.1.1; Document for: Discussion and Decision.

3GPP TSG RAN WG1 #106-e; R1-2107025; e-Meeting, Aug. 16-27, 2021; Source: Panasonic; Title: Discussion on UE feedback enhancements for HARQ-ACK; Agenda Item: 8.3.1.1; Document for: Discussion.

3GPP TSG RAN WG1 #106-e; R1-2107133; e-Meeting, Aug. 16-27, 2021; Agenda item: 8.3.1.1; Source: China Telecom; Title: Discussion on UE feedback enhancements for HARQ-ACK; Document for: Discussion.

3GPP TSG RAN WG1 #106-e; R1-2107156; e-Meeting, Aug. 16-27, 2021; Source: NEC; Title: UE feedback enhancements for HARQ-ACK; Agenda Item: 8.3.1.1; Document for: Discussion and Decision.

3GPP TSG RAN WG1 #106-e; R1-2107272; e-Meeting, Aug. 16-27, 2021; Source: OPPO; Title: HARQ-ACK enhancements for Rel-17 URLLC/IIoT; Agenda Item: 8.3.1.1; Document for: Discussion and Decision.

3GPP TSG-RAN WG1 Meeting #106-e; R1-2107296; e-Meeting, Aug. 16-27, 2021; Source: FGI, Asia Pacific Telecom; Title: Discussion on UE feedback enhancements for HARQ-ACK; Agenda item: 8.3.1.1; Document for: Discussion and Decision.

(56) References Cited

OTHER PUBLICATIONS

3GPP TSG RAN WG1 #106-e; R1-2107336; e-Meeting, Aug. 16-27, 2021; Agenda item: 8.3.1.1; Source: Qualcomm Incorporated; Title: HARQ-ACK enhancement for IOT and URLLC; Document for: Discussion/Decision.
3GPP TSG RAN WG1 #106-e; R1-2107397; e-Meeting, Aug. 16-27, 2021; Agenda item: 8.3.1.1; Title: Discussion on UE feedback enhancements for HARQ-ACK; Source: CMCC; Document for: Discussion and Decision.
3GPP TSG RAN WG1 #106-e; R1-2107443; e-Meeting, Aug. 16-27, 2021; Agenda Item: 8.3.1.1; Source: LG Electronics; Title: Discussion on UE feedback enhancement for HARQ-ACK; Document for: Discussion and decision.
3GPP TSG RAN WG1 #106-e; R1-2107472; e-Meeting, Aug. 16-27, 2021; Source: ETRI; Title: UE feedback enhancements for HARQ-ACK; Agenda Item: 8.3.1.1 UE feedback enhancements for HARQ-ACK; Document for: Discussion.
3GPP TSG RAN WG1 Meeting #106-e; R1-2107491; e-Meeting, Aug. 16-27, 2021; Agenda Item: 8.3.1.1; Source: MediaTek Inc.; Title: On UE feedback enhancements for HARQ-ACK; Document for: Discussion and Decision.
3GPP TSG RAN WG1 #106-e; R1-2107583; e-Meeting, May 16-27, 2021; Source: Intel Corporation; Title: Design aspects for the agreed HARQ feedback enhancements; Agenda item: 8.3.1.1; Document for: Discussion and Decision.
3GPP TSG RAN WG1 #106-e; R1-2107639; e-Meeting, Aug. 16-27, 2021; Agenda Item: 8.3.1.1; Source: InterDigital, Inc.; Title: HARQ enhancements for IIoT and URLLC; Document for: Discussion.
3GPP TSG RAN WG1 #106-e; R1-2107732; e-Meeting, Aug. 16-27, 2021; Agenda Item: 8.3.1.1; Source: Apple Inc.; Title: HARQ Feedback Enhancements for URLLC; Document for: Discussion/Decision.
3GPP TSG RAN WG1 #106-e; R1-2107851; e-Meeting, Aug. 16-27, 2021; Source: NTT Docomo, Inc.; Title: Discussion on HARQ-ACK feedback enhancements for Rel.17 URLLC; Agenda Item: 8.3.1.1; Document for: Discussion and Decision.
3GPP TSG RAN WG1#106-e; R1-2107917; e-Meeting, Aug. 16-27, 2021; Source: Xiaomi; Title: UE feedback enhancements for HARQ-ACK; Agenda Item: 8.3.1.1; Document for: Discussion and Decision.
3GPP TSG RAN WG1 Meeting #106e; R1-2108162; e-Meeting, Aug. 16-27, 2021; Source: CAICT; Title: UE feedback enhancements for HARQ-ACK; Agenda Item: 8.3.1.1; Document for: Discussion / Decision.

* cited by examiner

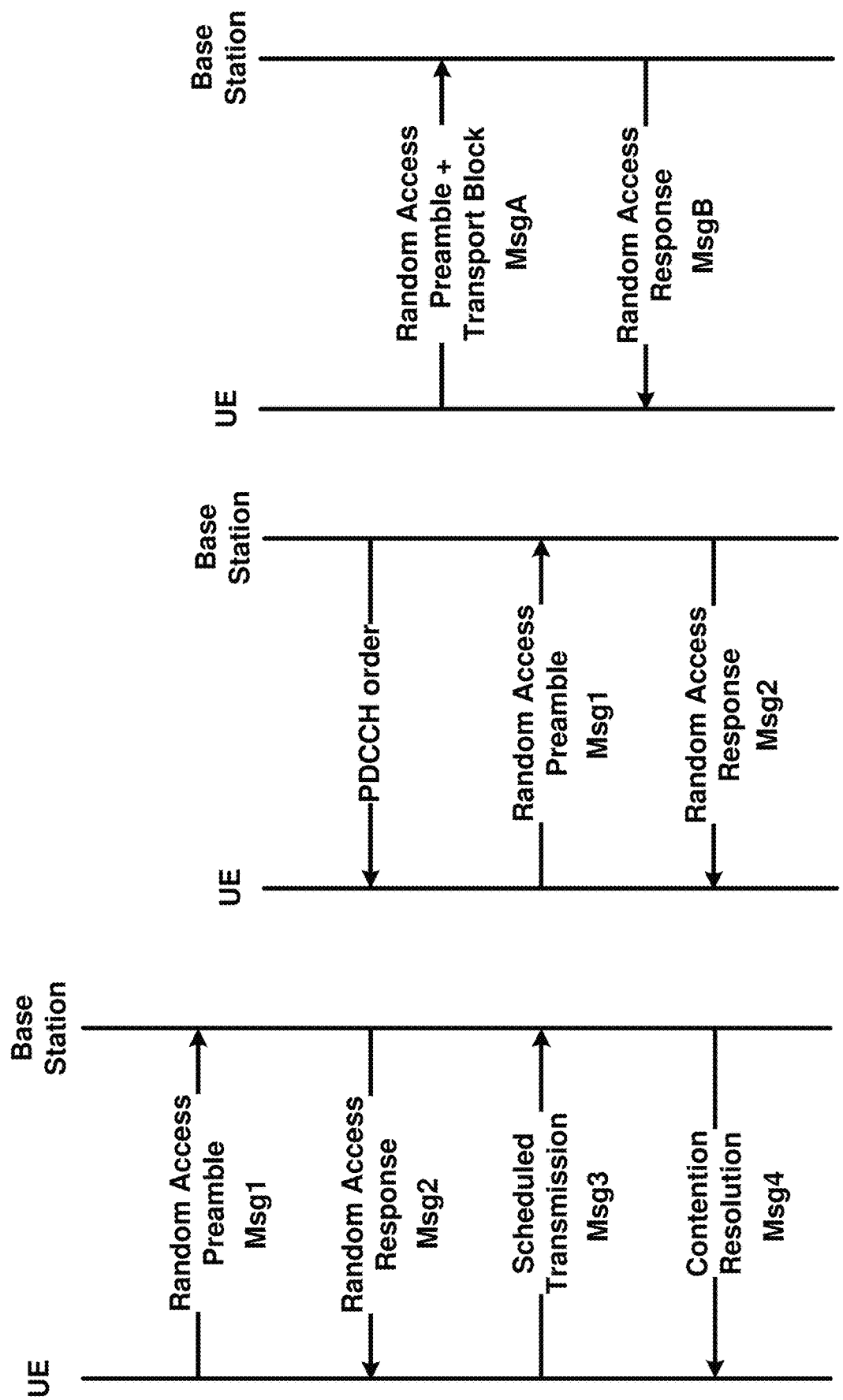

|   | Oct 1 | Oct 2 | Oct 3 | Oct 4 |
|---|---|---|---|---|
|   | R | $C_8$ | $C_{16}$ | $C_{24}$ |
|   | $C_1$ | $C_9$ | $C_{17}$ | $C_{25}$ |
|   | $C_2$ | $C_{10}$ | $C_{18}$ | $C_{26}$ |
|   | $C_3$ | $C_{11}$ | $C_{19}$ | $C_{27}$ |
|   | $C_4$ | $C_{12}$ | $C_{20}$ | $C_{28}$ |
|   | $C_5$ | $C_{13}$ | $C_{21}$ | $C_{29}$ |
|   | $C_6$ | $C_{14}$ | $C_{22}$ | $C_{30}$ |
|   | $C_7$ | $C_{15}$ | $C_{23}$ | $C_{31}$ |

FIG. 17

Receive:

1st configuration parameters of a 1st cell and a 2nd cell (The 1st cell and the 2nd cell are in a PUCCH group);

a 2nd configuration parameter indicating the 2nd cell as a PUCCH switching SCell in the PUCCH group; and a 3rd configuration parameter of a time-domain pattern for PUCCH cell switching The time-domain pattern indicates:

1st timings that the 1st cell is a cell for PUCCH transmission

2nd timings, comprising a 1st transmission timing, that the 2nd cell is the cell for PUCCH transmission

3510

Transmit 1st UCI in the 1st transmission timing:

via the 2nd cell in response to the 2nd cell being activated in the 1st transmission timing; and via the 1st cell in response to the 2nd cell being deactivated in the 1st transmission timing

Receive a configuration parameters of a time-domain pattern indicating:

1st timings that a 1st cell in a PUCCH group is a cell for PUCCH transmission

2nd timings, including a transmission timing, that a 2nd cell in the PUCCH group is the cell for PUCCH transmission

3810

Transmit UCI in the 1st timing via the 2nd cell or via the 1st cell based on an activation state of the 2nd cell in the 1st timing

PUCCH CELL SWITCHING AND CELL ACTIVATION/DEACTIVATION STATUS

CROSS-REFERENCE TO RELATED APPLICATIONS

This application claims the benefit of U.S. Provisional Application No. 63/249,528, filed Sep. 28, 2021, which is hereby incorporated by reference in its entirety.

BRIEF DESCRIPTION OF THE DRAWINGS

FIG. 12A, FIG. 12B and FIG. 12C show example random access processes in accordance with several of various embodiments of the present disclosure.

FIG. 17 shows an example MAC CE in accordance with several of various embodiments of the present disclosure.

FIG. 35 shows an example flow diagram in accordance with several of various embodiments of the present disclosure.

FIG. 38 shows an example flow diagram in accordance with several of various embodiments of the present disclosure.

DETAILED DESCRIPTION

The exemplary embodiments of the disclosed technology enable PUCCH cell switching in a PUCCH group for a wireless device and/or one or more base stations. The exemplary disclosed embodiments may be implemented in the technical field of wireless communication systems. More particularly, the embodiments of the disclosed technology may enhance processes associated with PUCCH Cell Switching in a PUCCH group and activation/deactivation status of candidate PUCCH cells in the PUCCH group.

The devices and/or nodes of the mobile communications system disclosed herein may be implemented based on various technologies and/or various releases/versions/amendments of a technology. The various technologies include various releases of long-term evolution (LTE) technologies, various releases of 5G new radio (NR) technologies, various wireless local area networks technologies and/or a combination thereof and/or alike. For example, a base station may support a given technology and may communicate with wireless devices with different characteristics. The wireless devices may have different categories that define their capabilities in terms of supporting various features. The wireless device with the same category may have different capabilities. The wireless devices may support various technologies such as various releases of LTE technologies, various releases of 5G NR technologies and/or a combination thereof and/or alike. At least some of the wireless devices in the mobile communications system of the present disclosure may be stationary or almost stationary. In this disclosure, the terms "mobile communications system" and "wireless communications system" may be used interchangeably.

Figure 1A:
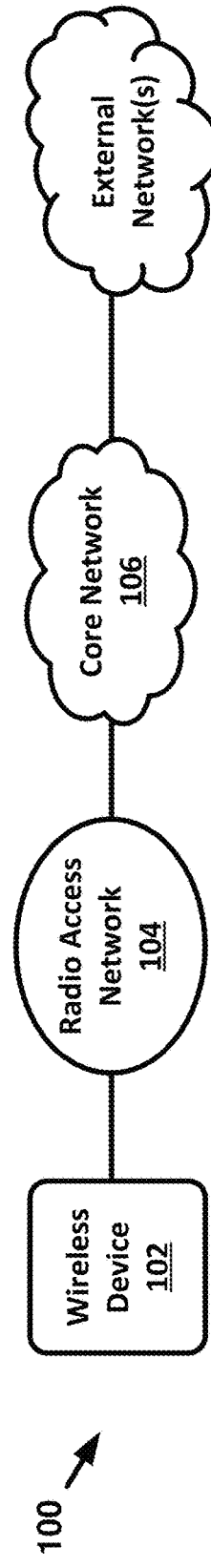
FIG. 1A and FIG. 1B show examples of mobile communications systems in accordance with several of various embodiments of the present disclosure.

FIG. 1A shows an example of a mobile communications system 100 in accordance with several of various embodiments of the present disclosure. The mobile communications system 100 may be, for example, run by a mobile network operator (MNO) or a mobile virtual network operator (MVNO). The mobile communications system 100 may be a public land mobile network (PLMN) run by a network operator providing a variety of service including voice, data, short messaging service (SMS), multimedia messaging service (MMS), emergency calls, etc. The mobile communications system 100 includes a core network (CN) 106, a radio access network (RAN) 104 and at least one wireless device 102.

The CN 106 connects the RAN 104 to one or more external networks (e.g., one or more data networks such as the Internet) and is responsible for functions such as authentication, charging and end-to-end connection establishment. Several radio access technologies (RATs) may be served by the same CN 106.

The RAN 104 may implement a RAT and may operate between the at least one wireless device 102 and the CN 106. The RAN 104 may handle radio related functionalities such as scheduling, radio resource control, modulation and coding, multi-antenna transmissions and retransmission protocols. The wireless device and the RAN may share a portion of the radio spectrum by separating transmissions from the wireless device to the RAN and the transmissions from the RAN to the wireless device. The direction of the transmissions from the wireless device to the RAN is known as the uplink and the direction of the transmissions from the RAN to the wireless device is known as the downlink. The separation of uplink and downlink transmissions may be achieved by employing a duplexing technique. Example duplexing techniques include frequency division duplexing (FDD), time division duplexing (TDD) or a combination of FDD and TDD.

In this disclosure, the term wireless device may refer to a device that communicates with a network entity or another device using wireless communication techniques. The wireless device may be a mobile device or a non-mobile (e.g., fixed) device. Examples of the wireless device include cellular phone, smart phone, tablet, laptop computer, wearable device (e.g., smart watch, smart shoe, fitness trackers, smart clothing, etc.), wireless sensor, wireless meter, extended reality (XR) devices including augmented reality (AR) and virtual reality (VR) devices, Internet of Things (IoT) device, vehicle to vehicle communications device, road-side units (RSU), automobile, relay node or any combination thereof. In some examples, the wireless device (e.g., a smart phone, tablet, etc.) may have an interface (e.g., a graphical user interface (GUI)) for configuration by an end user. In some examples, the wireless device (e.g., a wireless sensor device, etc.) may not have an interface for configuration by an end user. The wireless device may be referred to as a user equipment (UE), a mobile station (MS), a subscriber unit, a handset, an access terminal, a user terminal, a wireless transmit and receive unit (WTRU) and/or other terminology.

The at least one wireless device may communicate with at least one base station in the RAN 104. In this disclosure, the term base station may encompass terminologies associated with various RATs. For example, a base station may be referred to as a Node B in a 3G cellular system such as Universal Mobile Telecommunication Systems (UMTS), an evolved Node B (eNB) in a 4G cellular system such as evolved universal terrestrial radio access (E-UTRA), a next generation eNB (ng-eNB), a Next Generation Node B (gNB) in NR and/or a 5G system, an access point (AP) in Wi-Fi and/or other wireless local area networks. A base station may be referred to as a remote radio head (RRH), a baseband unit (BBU) in connection with one or more RRHs, a repeater or relay for coverage extension and/or any combination thereof. In some examples, all protocol layers of a base station may be implemented in one unit. In some examples, some of the protocol layers (e.g., upper layers) of the base station may be implemented in a first unit (e.g., a central unit (CU)) and some other protocol layer (e.g., lower layers) may be implemented in one or more second units (e.g., distributed units (DUs)).

A base station in the RAN 104 includes one or more antennas to communicate with the at least one wireless device. The base station may communicate with the at least one wireless device using radio frequency (RF) transmissions and receptions via RF transceivers. The base station antennas may control one or more cells (or sectors). The size and/or radio coverage area of a cell may depend on the range that transmissions by a wireless device can be successfully received by the base station when the wireless device transmits using the RF frequency of the cell. The base station may be associated with cells of various sizes. At a given location, the wireless device may be in coverage area of a first cell of the base station and may not be in coverage area of a second cell of the base station depending on the sizes of the first cell and the second cell.

A base station in the RAN 104 may have various implementations. For example, a base station may be implemented by connecting a BBU (or a BBU pool) coupled to one or more RRHs and/or one or more relay nodes to extend the cell coverage. The BBU pool may be located at a centralized site like a cloud or data center. The BBU pool may be connected to a plurality of RRHs that control a plurality of cells. The combination of BBU with the one or more RRHs may be referred to as a centralized or cloud RAN (C-RAN) architecture. In some implementations, the BBU functions may be implemented on virtual machines (VMs) on servers at a centralized location. This architecture may be referred to as virtual RAN (vRAN). All, most or a portion of the protocol layer functions (e.g., all or portions of physical layer, medium access control (MAC) layer and/or higher layers) may be implemented at the BBU pool and the processed data may be transmitted to the RRHs for further processing and/or RF transmission. The links between the BBU pool and the RRHs may be referred to as fronthaul.

In some deployment scenarios, the RAN 104 may include macrocell base stations with high transmission power levels and large coverage areas. In other deployment scenarios, the RAN 104 may include base stations that employ different transmission power levels and/or have cells with different coverage areas. For example, some base station may be macrocell base stations with high transmission powers and/or large coverage areas and other base station may be small cell base stations with comparatively smaller transmission powers and/or coverage areas. In some deployment scenarios, a small cell base station may have coverage that is within or has overlap with coverage area of a macrocell base station. A wireless device may communicate with the macrocell base station while within the coverage area of the macrocell base station. For additional capacity, the wireless device may communicate with both the macrocell base station and the small cell base station while in the overlapped coverage area of the macrocell base station and the small cell base station. Depending on their coverage areas, a small cell base station may be referred to as a microcell base station, a picocell base station, a femtocell base station or a home base station.

Different standard development organizations (SDOs) have specified, or may specify in future, mobile communications systems that have similar characteristics as the mobile communications system 100 of FIG. 1A. For example, the Third-Generation Partnership Project (3GPP) is a group of SDOs that provides specifications that define 3GPP technologies for mobile communications systems that are akin to the mobile communications system 100. The 3GPP has developed specifications for third generation (3G) mobile networks, fourth generation (4G) mobile networks and fifth generation (5G) mobile networks. The 3G, 4G and 5G networks are also known as Universal Mobile Telecommunications System (UMTS), Long Term Evolution (LTE) and 5G system (5GS), respectively. In this disclosure, embodiments are described with respect to the RAN implemented in a 3GPP 5G mobile network that is also referred to as next generation RAN (NG-RAN). The embodiments may also be implemented in other mobile communications systems such as 3G or 4G mobile networks or mobile networks that may be standardized in future such as sixth generation (6G) mobile networks or mobile networks that are implemented by standards bodies other than 3GPP. The NG-RAN may be based on a new RAT known as new radio (NR) and/or other radio access technologies such as LTE and/or non-3GPP RATs.

Figure 1B:
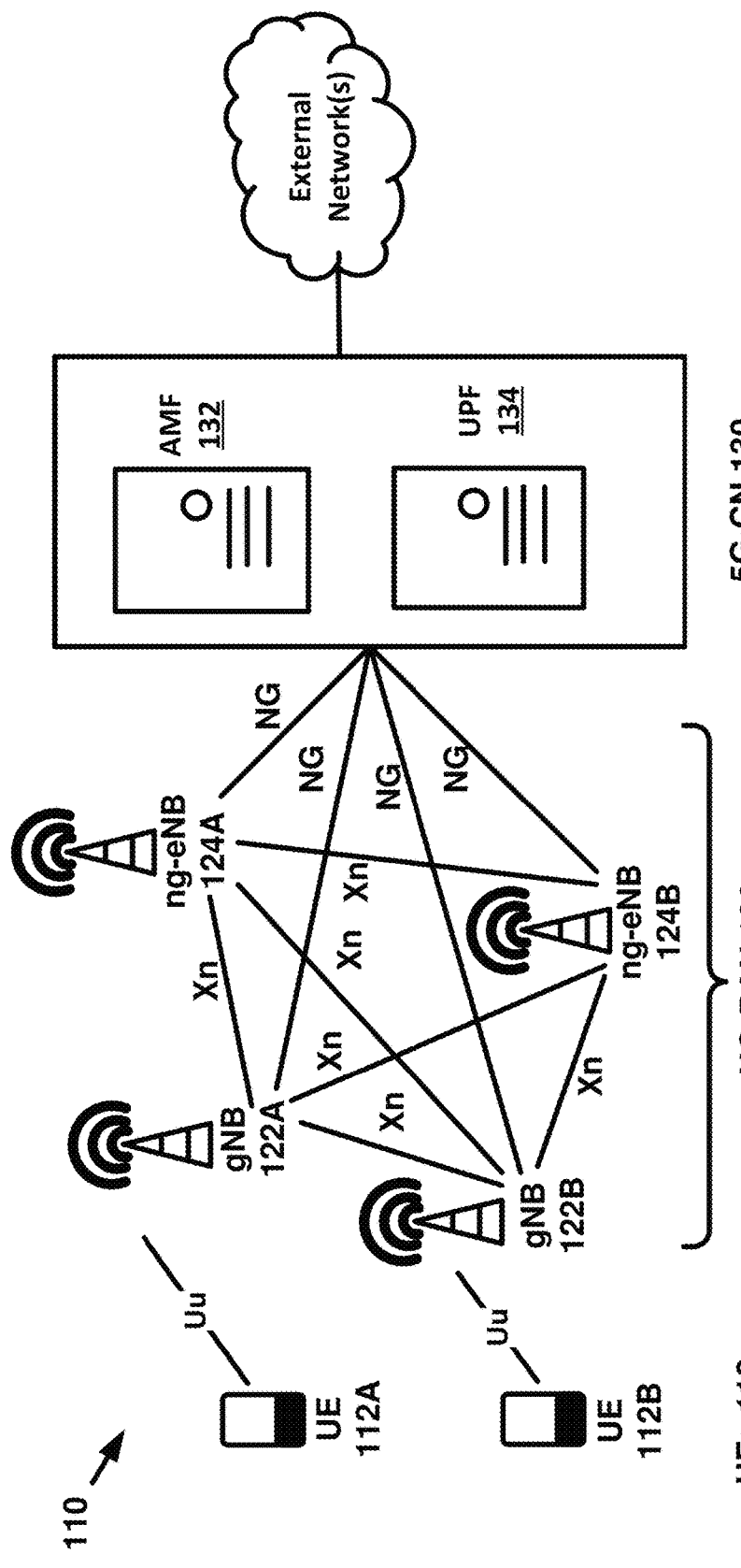

FIG. 1B shows an example of a mobile communications system 110 in accordance with several of various embodiments of the present disclosure. The mobile communications system 110 of FIG. 1B is an example of a 5G mobile network and includes a 5G CN (5G-CN) 130, an NG-RAN 120 and UEs (collectively 112 and individually UE 112A and UE 112B). The 5G-CN 130, the NG-RAN 120 and the UEs 112 of FIG. 1B operate substantially alike the CN 106, the RAN 104 and the at least one wireless device 102, respectively, as described for FIG. 1A.

The 5G-CN 130 of FIG. 1B connects the NG-RAN 120 to one or more external networks (e.g., one or more data networks such as the Internet) and is responsible for functions such as authentication, charging and end-to-end connection establishment. The 5G-CN has new enhancements compared to previous generations of CNs (e.g., evolved packet core (EPC) in the 4G networks) including service-based architecture, support for network slicing and control plane/user plane split. The service-based architecture of the 5G-CN provides a modular framework based on service and functionalities provided by the core network wherein a set of network functions are connected via service-based interfaces. The network slicing enables multiplexing of independent logical networks (e.g., network slices) on the same physical network infrastructure. For example, a network slice may be for mobile broadband applications with full mobility support and a different network slice may be for non-mobile latency-critical applications such as industry automation. The control plane/user plane split enables independent scaling of the control plane and the user plane. For example, the control plane capacity may be increased without affecting the user plane of the network.

The 5G-CN 130 of FIG. 1B includes an access and mobility management function (AMF) 132 and a user plane function (UPF) 134. The AMF 132 may support termination of non-access stratum (NAS) signaling, NAS signaling security such as ciphering and integrity protection, inter-3GPP access network mobility, registration management, connection management, mobility management, access authentication and authorization and security context management. The NAS is a functional layer between a UE and the CN and the access stratum (AS) is a functional layer between the UE and the RAN. The UPF 134 may serve as an interconnect point between the NG-RAN and an external data network. The UPF may support packet routing and forwarding, packet inspection and Quality of Service (QoS) handling and packet filtering. The UPF may further act as a Protocol Data Unit (PDU) session anchor point for mobility within and between RATs.

The 5G-CN 130 may include additional network functions (not shown in FIG. 1B) such as one or more Session Management Functions (SMFs), a Policy Control Function (PCF), a Network Exposure Function (NEF), a Unified Data Management (UDM), an Application Function (AF), and/or an Authentication Server Function (AUSF). These network functions along with the AMF 132 and UPF 134 enable a service-based architecture for the 5G-CN.

The NG-RAN 120 may operate between the UEs 112 and the 5G-CN 130 and may implement one or more RATs. The NG-RAN 120 may include one or more gNBs (e.g., gNB 122A or gNB 122B or collectively gNBs 122) and/or one or more ng-eNBs (e.g., ng-eNB 124A or ng-eNB 124B or collectively ng-eNB s 124). The general terminology for gNB s 122 and/or an ng-eNBs 124 is a base station and may be used interchangeably in this disclosure. The gNBs 122 and the ng-eNBs 124 may include one or more antennas to communicate with the UEs 112. The one or more antennas of the gNB s 122 or ng-eNBs 124 may control one or more cells (or sectors) that provide radio coverage for the UEs 112.

A gNB and/or an ng-eNB of FIG. 1B may be connected to the 5G-CN 130 using an NG interface. A gNB and/or an ng-eNB may be connected with other gNBs and/or ng-eNBs using an Xn interface. The NG or the Xn interfaces are logical connections that may be established using an underlying transport network. The interface between a UE and a gNB or between a UE and an ng-eNBs may be referred to as the Uu interface. An interface (e.g., Uu, NG or Xn) may be established by using a protocol stack that enables data and control signaling exchange between entities in the mobile communications system of FIG. 1B. When a protocol stack is used for transmission of user data, the protocol stack may be referred to as user plane protocol stack. When a protocol stack is used for transmission of control signaling, the protocol stack may be referred to as control plane protocol stack. Some protocol layer may be used in both of the user plane protocol stack and the control plane protocol stack while other protocol layers may be specific to the user plane or control plane.

The NG interface of FIG. 1B may include an NG-User plane (NG-U) interface between a gNB and the UPF 134 (or an ng-eNB and the UPF 134) and an NG-Control plane (NG-C) interface between a gNB and the AMF 132 (or an ng-eNB and the AMF 132). The NG-U interface may provide non-guaranteed delivery of user plane PDUs between a gNB and the UPF or an ng-eNB and the UPF. The NG-C interface may provide services such as NG interface management, UE context management, UE mobility management, transport of NAS messages, paging, PDU session management, configuration transfer and/or warning message transmission.

The UEs 112 and a gNB may be connected using the Uu interface and using the NR user plane and control plane protocol stack. The UEs 112 and an ng-eNB may be connected using the Uu interface using the LTE user plane and control plane protocol stack.

In the example mobile communications system of FIG. 1B, a 5G-CN is connected to a RAN comprised of 4G LTE and/or 5G NR RATs. In other example mobile communications systems, a RAN based on the 5G NR RAT may be connected to a 4G CN (e.g., EPC). For example, earlier releases of 5G standards may support a non-standalone mode of operation where a NR based RAN is connected to the 4G EPC. In an example non-standalone mode, a UE may be connected to both a 5G NR gNB and a 4G LTE eNB (e.g., a ng-eNB) and the control plane functionalities (such as initial access, paging and mobility) may be provided through the 4G LTE eNB. In a standalone of operation, the 5G NR gNB is connected to a 5G-CN and the user plane and the control plane functionalities are provided by the 5G NR gNB.

Figure 2A:
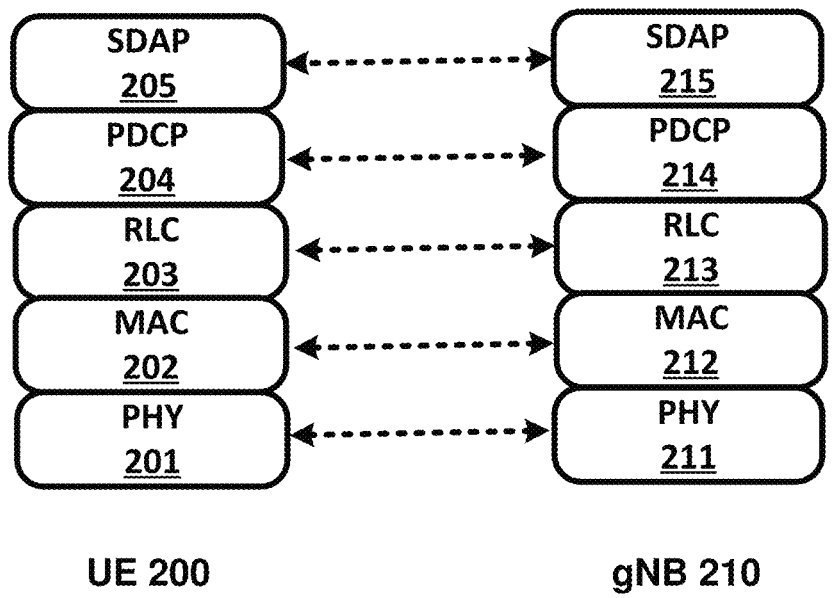
FIG. 2A and FIG. 2B show examples of user plane and control plane protocol layers in accordance with several of various embodiments of the present disclosure.

FIG. 2A shows an example of the protocol stack for the user plan of an NR Uu interface in accordance with several of various embodiments of the present disclosure. The user plane protocol stack comprises five protocol layers that terminate at the UE 200 and the gNB 210. The five protocol layers, as shown in FIG. 2A, include physical (PHY) layer referred to as PHY 201 at the UE 200 and PHY 211 at the gNB 210, medium access control (MAC) layer referred to as MAC 202 at the UE 200 and MAC 212 at the gNB 210, radio link control (RLC) layer referred to as RLC 203 at the UE 200 and RLC 213 at the gNB 210, packet data convergence protocol (PDCP) layer referred to as PDCP 204 at the UE 200 and PDCP 214 at the gNB 210, and service data application protocol (SDAP) layer referred to as SDAP 205 at the UE 200 and SDAP 215 at the gNB 210. The PHY layer, also known as layer 1 (L1), offers transport services to higher layers. The other four layers of the protocol stack (MAC, RLC, PDCP and SDAP) are collectively known as layer 2 (L2).

Figure 2B:
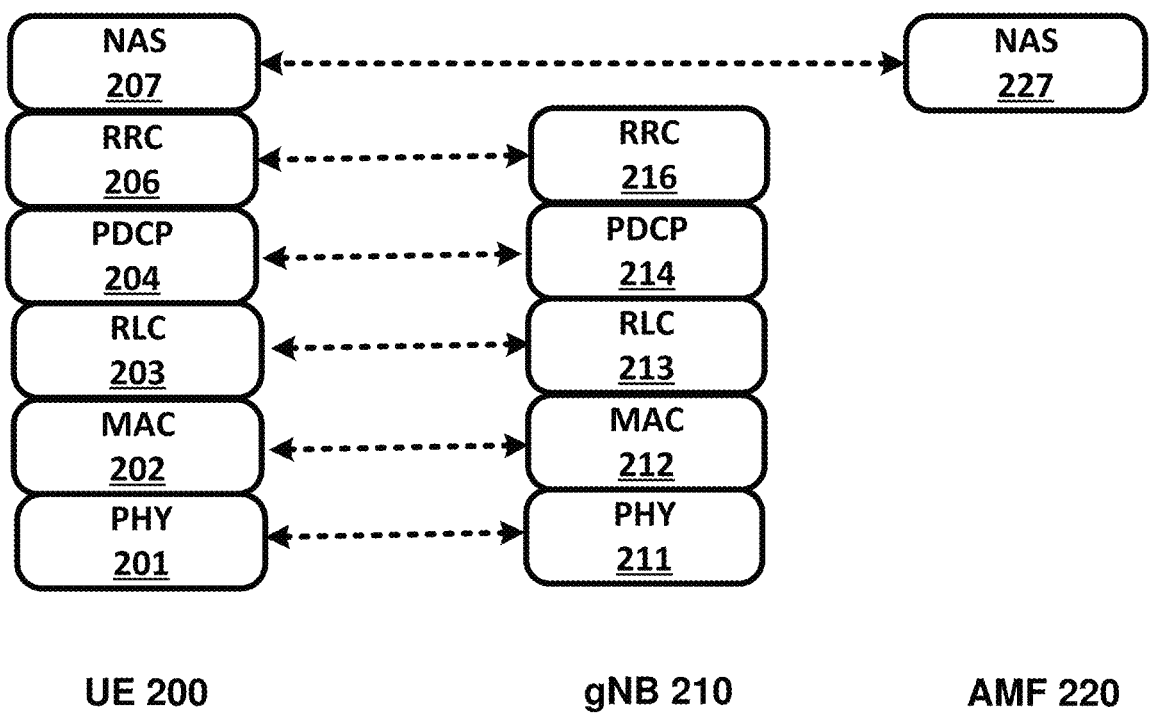

FIG. 2B shows an example of the protocol stack for the control plan of an NR Uu interface in accordance with several of various embodiments of the present disclosure. Some of the protocol layers (PHY, MAC, RLC and PDCP) are common between the user plane protocol stack shown in FIG. 2A and the control plan protocol stack. The control plane protocol stack also includes the RRC layer, referred to RRC 206 at the UE 200 and RRC 216 at the gNB 210, that also terminates at the UE 200 and the gNB 210. In addition, the control plane protocol stack includes the NAS layer that terminates at the UE 200 and the AMF 220. In FIG. 2B, the NAS layer is referred to as NAS 207 at the UE 200 and NAS 227 at the AMF 220.

Figure 3:
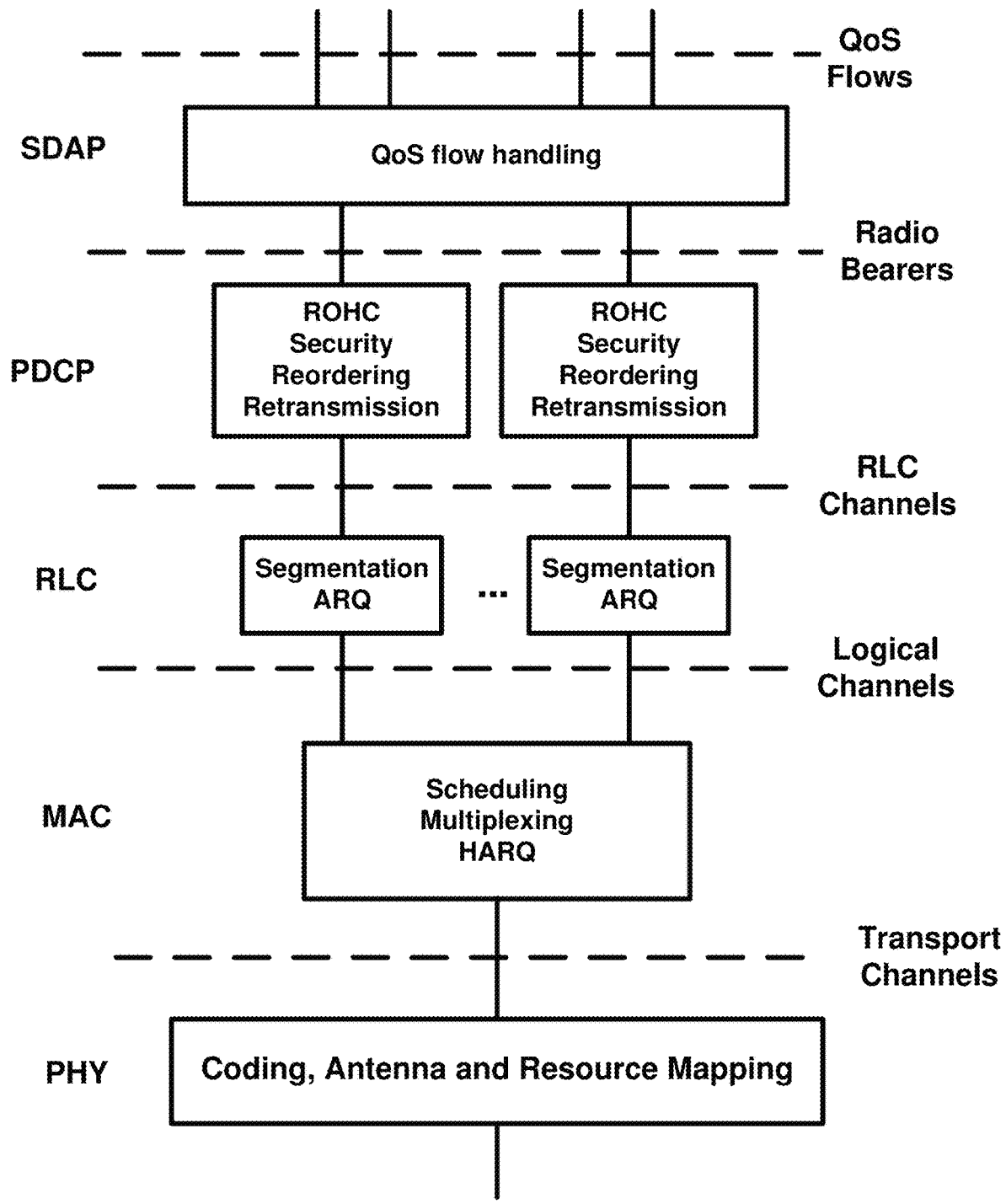
FIG. 3 shows example functions and services offered by protocol layers in a user plane protocol stack in accordance with several of various embodiments of the present disclosure.

FIG. 3 shows example functions and services offered to other layers by a layer in the NR user plane protocol stack of FIG. 2A in accordance with several of various embodiments of the present disclosure. For example, the SDAP layer of FIG. 3 (shown in FIG. 2A as SDAP 205 at the UE side and SDAP 215 at the gNB side) may perform mapping and de-mapping of QoS flows to data radio bearers. The mapping and de-mapping may be based on QoS (e.g., delay, throughput, jitter, error rate, etc.) associated with a QoS flow. A QoS flow may be a QoS differentiation granularity for a PDU session which is a logical connection between a UE 200 and a data network. A PDU session may contain one or more QoS flows. The functions and services of the SDAP layer include mapping and de-mapping between one or more QoS flows and one or more data radio bearers. The SDAP layer may also mark the uplink and/or downlink packets with a QoS flow ID (QFI).

The PDCP layer of FIG. 3 (shown in FIG. 2A as PDCP 204 at the UE side and PDCP 214 at the gNB side) may perform header compression and decompression (e.g., using Robust Header Compression (ROHC) protocol) to reduce the protocol header overhead, ciphering and deciphering and integrity protection and verification to enhance the security over the air interface, reordering and in-order delivery of packets and discarding of duplicate packets. A UE may be configured with one PDCP entity per bearer.

In an example scenario not shown in FIG. 3, a UE may be configured with dual connectivity and may connect to two different cell groups provided by two different base stations. For example, a base station of the two base stations may be referred to as a master base station and a cell group provided by the master base station may be referred to as a master cell group (MCG). The other base station of the two base stations may be referred to as a secondary base station and the cell group provided by the secondary base station may be referred to as a secondary cell group (SCG). A bearer may be configured for the UE as a split bearer that may be handled by the two different cell groups. The PDCP layer may perform routing of packets corresponding to a split bearer to and/or from RLC channels associated with the cell groups.

In an example scenario not shown in FIG. 3, a bearer of the UE may be configured (e.g., with control signaling) with PDCP packet duplication. A bearer configured with PDCP duplication may be mapped to a plurality of RLC channels each corresponding to different one or more cells. The PDCP layer may duplicate packets of the bearer configured with PDCP duplication and the duplicated packets may be mapped to the different RLC channels. With PDCP packet duplication, the likelihood of correct reception of packets increases thereby enabling higher reliability.

The RLC layer of FIG. 3 (shown in FIG. 2A as RLC 203 at the UE side and RLC 213 at the gNB side) provides service to upper layers in the form of RLC channels. The RLC layer may include three transmission modes: transparent mode (TM), Unacknowledged mode (UM) and Acknowledged mode (AM). The RLC layer may perform error correction through automatic repeat request (ARQ) for the AM transmission mode, segmentation of RLC service data units (SDUs) for the AM and UM transmission modes and re-segmentation of RLC SDUs for AM transmission mode, duplicate detection for the AM transmission mode, RLC SDU discard for the AM and UM transmission modes, etc. The UE may be configured with one RLC entity per RLC channel.

The MAC layer of FIG. 3 (shown in FIG. 2A as MAC 202 at the UE side and MAC 212 at the gNB side) provides services to the RLC layer in form of logical channels. The MAC layer may perform mapping between logical channels and transport channels, multiplexing/demultiplexing of MAC SDUs belonging to one or more logical channels into/from transport blocks (TBs) delivered to/from the physical layer on transport channels, reporting of scheduling information, error correction through hybrid automatic repeat request (HARQ), priority handling between UEs by means of dynamic scheduling, priority handling between logical channels of one UE by means of logical channel prioritization and/or padding. In case of carrier aggregation, a MAC entity may comprise one HARQ entity per cell. A MAC entity may support multiple numerologies, transmission timings and cells. The control signaling may configure logical channels with mapping restrictions. The mapping restrictions in logical channel prioritization may control the numerology(ies), cell(s), and/or transmission timing(s)/duration(s) that a logical channel may use.

The PHY layer of FIG. 3 (shown in FIG. 2A as PHY 201 at the UE side and PHY 211 at the gNB side) provides transport services to the MAC layer in form of transport channels. The physical layer may handle coding/decoding, HARQ soft combining, rate matching of a coded transport channel to physical channels, mapping of coded transport channels to physical channels, modulation and demodulation of physical channels, frequency and time synchronization, radio characteristics measurements and indication to higher layers, RF processing, and mapping to antennas and radio resources.

Figure 4:
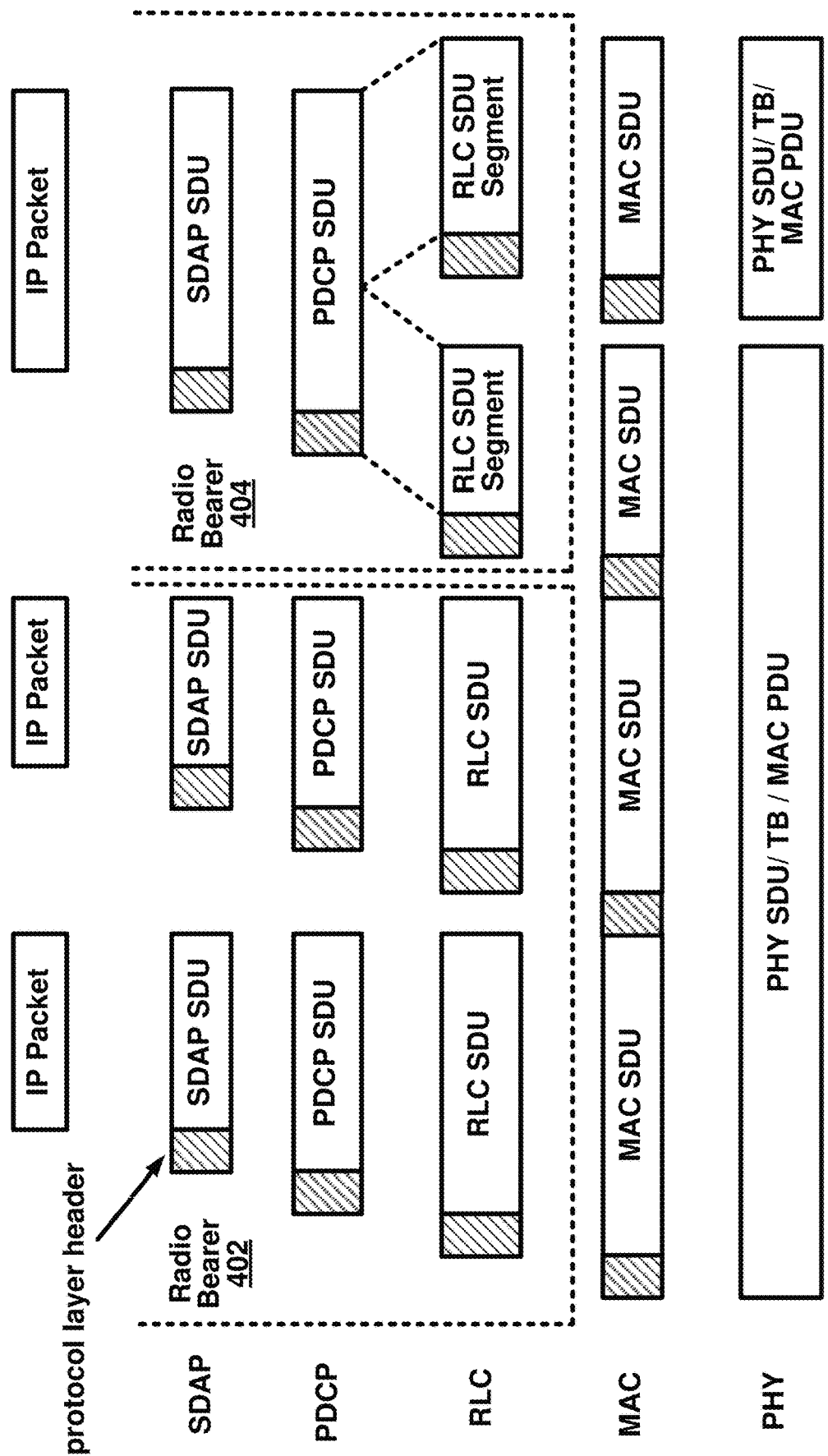
FIG. 4 shows example flow of packets through the protocol layers in accordance with several of various embodiments of the present disclosure.

FIG. 4 shows example processing of packets at different protocol layers in accordance with several of various embodiments of the present disclosure. In this example, three Internet Protocol (IP) packets that are processed by the different layers of the NR protocol stack. The term SDU shown in FIG. 4 is the data unit that is entered from/to a higher layer. In contrast, a protocol data unit (PDU) is the data unit that is entered to/from a lower layer. The flow of packets in FIG. 4 is for downlink. An uplink data flow through layers of the NR protocol stack is similar to FIG. 4. In this example, the two leftmost IP packets are mapped by the SDAP layer (shown as SDAP 205 and SDAP 215 in FIG. 2A) to radio bearer 402 and the rightmost packet is mapped by the SDAP layer to the radio bearer 404. The SDAP layer adds SDAP headers to the IP packets which are entered into the PDCP layer as PDCP SDUs. The PDCP layer is shown as PDCP 204 and PDCP 214 in FIG. 2A. The PDCP layer adds the PDCP headers to the PDCP SDUs which are entered into the RLC layer as RLC SDUs. The RLC layer is shown as RLC 203 and RLC 213 in FIG. 2A. An RLC SDU may be segmented at the RLC layer. The RLC layer adds RLC headers to the RLC SDUs after segmentation (if segmented) which are entered into the MAC layer as MAC SDUs. The MAC layer adds the MAC headers to the MAC SDUs and multiplexes one or more MAC SDUs to form a PHY SDU (also referred to as a transport block (TB) or a MAC PDU).

In FIG. 4, the MAC SDUs are multiplexed to form a transport block. The MAC layer may multiplex one or more MAC control elements (MAC CEs) with zero or more MAC SDUs to form a transport block. The MAC CEs may also be referred to as MAC commands or MAC layer control signaling and may be used for in-band control signaling. The MAC CEs may be transmitted by a base station to a UE (e.g., downlink MAC CEs) or by a UE to a base station (e.g., uplink MAC CEs). The MAC CEs may be used for transmission of information useful by a gNB for scheduling (e.g., buffer status report (BSR) or power headroom report (PHR)), activation/deactivation of one or more cells, activation/deactivation of configured radio resources for or one or more processes, activation/deactivation of one or more processes, indication of parameters used in one or more processes, etc.

Figure 5A:
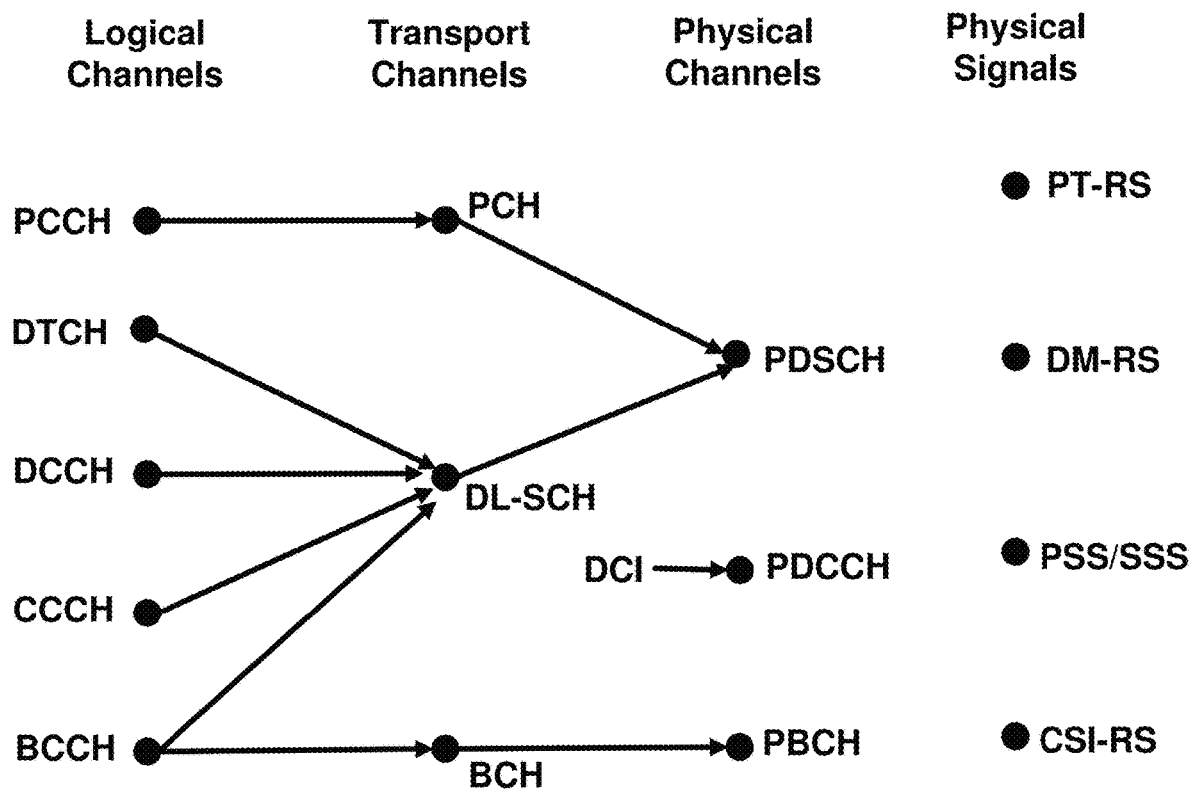
FIG. 5A shows example mapping of channels between layers of the protocol stack and different physical signals in downlink in accordance with several of various embodiments of the present disclosure.
Figure 5B:
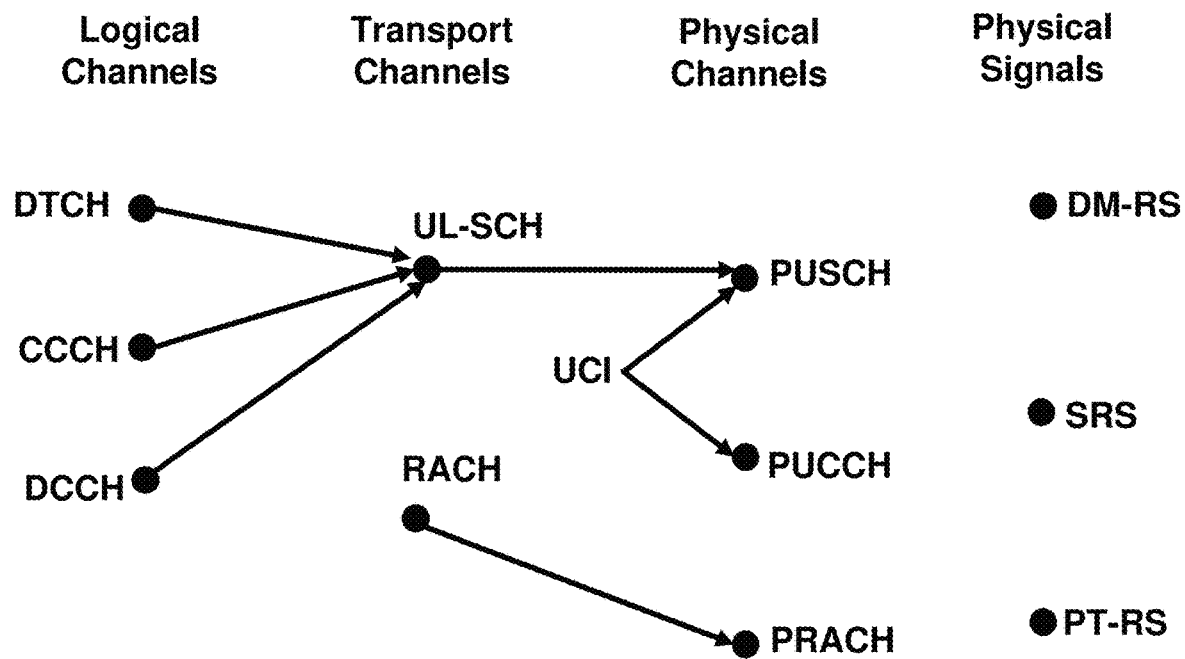
FIG. 5B shows example mapping of channels between layers of the protocol stack and different physical signals in uplink in accordance with several of various embodiments of the present disclosure.

FIG. 5A and FIG. 5B show example mapping between logical channels, transport channels and physical channels for downlink and uplink, respectively in accordance with several of various embodiments of the present disclosure. As discussed before, the MAC layer provides services to higher layer in the form of logical channels. A logical channel may be classified as a control channel, if used for transmission of control and/or configuration information, or a traffic channel if used for transmission of user data. Example logical channels in NR include Broadcast Control Channel (BCCH) used for transmission of broadcast system control information, Paging Control Channel (PCCH) used for carrying paging messages for wireless devices with unknown locations, Common Control Channel (CCCH) used for transmission of control information between UEs and network and for UEs that have no RRC connection with the network, Dedicated Control Channel (DCCH) which is a point-to-point bi-directional channel for transmission of dedicated control information between a UE that has an RRC connection and the network and Dedicated Traffic Channel (DTCH) which is point-to-point channel, dedicated to one UE, for the transfer of user information and may exist in both uplink and downlink.

As discussed before, the PHY layer provides services to the MAC layer and higher layers in the form of transport channels. Example transport channels in NR include Broadcast Channel (BCH) used for transmission of part of the BCCH referred to as master information block (MIB), Downlink Shared Channel (DL-SCH) used for transmission of data (e.g., from DTCH in downlink) and various control information (e.g., from DCCH and CCCH in downlink and part of the BCCH that is not mapped to the BCH), Uplink Shared Channel (UL-SCH) used for transmission of uplink data (e.g., from DTCH in uplink) and control information (e.g., from CCCH and DCCH in uplink) and Paging Channel (PCH) used for transmission of paging information from the PCCH. In addition, Random Access Channel (RACH) is a transport channel used for transmission of random access preambles. The RACH does not carry a transport block. Data on a transport channel (except RACH) may be organized in transport blocks, wherein One or more transport blocks may be transmitted in a transmission time interval (TTI).

The PHY layer may map the transport channels to physical channels. A physical channel may correspond to time-frequency resources that are used for transmission of information from one or more transport channels. In addition to mapping transport channels to physical channels, the physical layer may generate control information (e.g., downlink control information (DCI) or uplink control information (UCI)) that may be carried by the physical channels. Example DCI include scheduling information (e.g., downlink assignments and uplink grants), request for channel state information report, power control command, etc.

Example UCI include HARQ feedback indicating correct or incorrect reception of downlink transport blocks, channel state information report, scheduling request, etc. Example physical channels in NR include a Physical Broadcast Channel (PBCH) for carrying information from the BCH, a Physical Downlink Shared Channel (PDSCH) for carrying information form the PCH and the DL-SCH, a Physical Downlink Control Channel (PDCCH) for carrying DCI, a Physical Uplink Shared Channel (PUSCH) for carrying information from the UL-SCH and/or UCI, a Physical Uplink Control Channel (PUCCH) for carrying UCI and Physical Random Access Channel (PRACH) for transmission of RACH (e.g., random access preamble).

The PHY layer may also generate physical signals that are not originated from higher layers. As shown in FIG. 5A, example downlink physical signals include Demodulation Reference Signal (DM-RS), Phase Tracking Reference Signal (PT-RS), Channel State Information Reference Signal (CSI-RS), Primary Synchronization Signal (PSS) and Secondary Synchronization Signal (SSS). As shown in FIG. 5B, example uplink physical signals include DM-RS, PT-RS and sounding reference signal (SRS).

As indicated earlier, some of the protocol layers (PHY, MAC, RLC and PDCP) of the control plane of an NR Uu interface, are common between the user plane protocol stack (as shown in FIG. 2A) and the control plane protocol stack (as shown in FIG. 2B). In addition to PHY, MAC, RLC and PDCP, the control plane protocol stack includes the RRC protocol layer and the NAS protocol layer.

The NAS layer, as shown in FIG. 2B, terminates at the UE 200 and the AMF 220 entity of the 5G-C 130. The NAS layer is used for core network related functions and signaling including registration, authentication, location update and session management. The NAS layer uses services from the AS of the Uu interface to transmit the NAS messages.

The RRC layer, as shown in FIG. 2B, operates between the UE 200 and the gNB 210 (more generally NG-RAN 120) and may provide services and functions such as broadcast of system information (SI) related to AS and NAS as well as paging initiated by the 5G-C 130 or NG-RAN 120. In addition, the RRC layer is responsible for establishment, maintenance and release of an RRC connection between the UE 200 and the NG-RAN 120, carrier aggregation configuration (e.g., addition, modification and release), dual connectivity configuration (e.g., addition, modification and release), security related functions, radio bearer configuration/maintenance and release, mobility management (e.g., maintenance and context transfer), UE cell selection and reselection, inter-RAT mobility, QoS management functions, UE measurement reporting and control, radio link failure (RLF) detection and NAS message transfer. The RRC layer uses services from PHY, MAC, RLC and PDCP layers to transmit RRC messages using signaling radio bearers (SRBs). The SRBs are mapped to CCCH logical channel during connection establishment and to DCCH logical channel after connection establishment.

Figure 6:
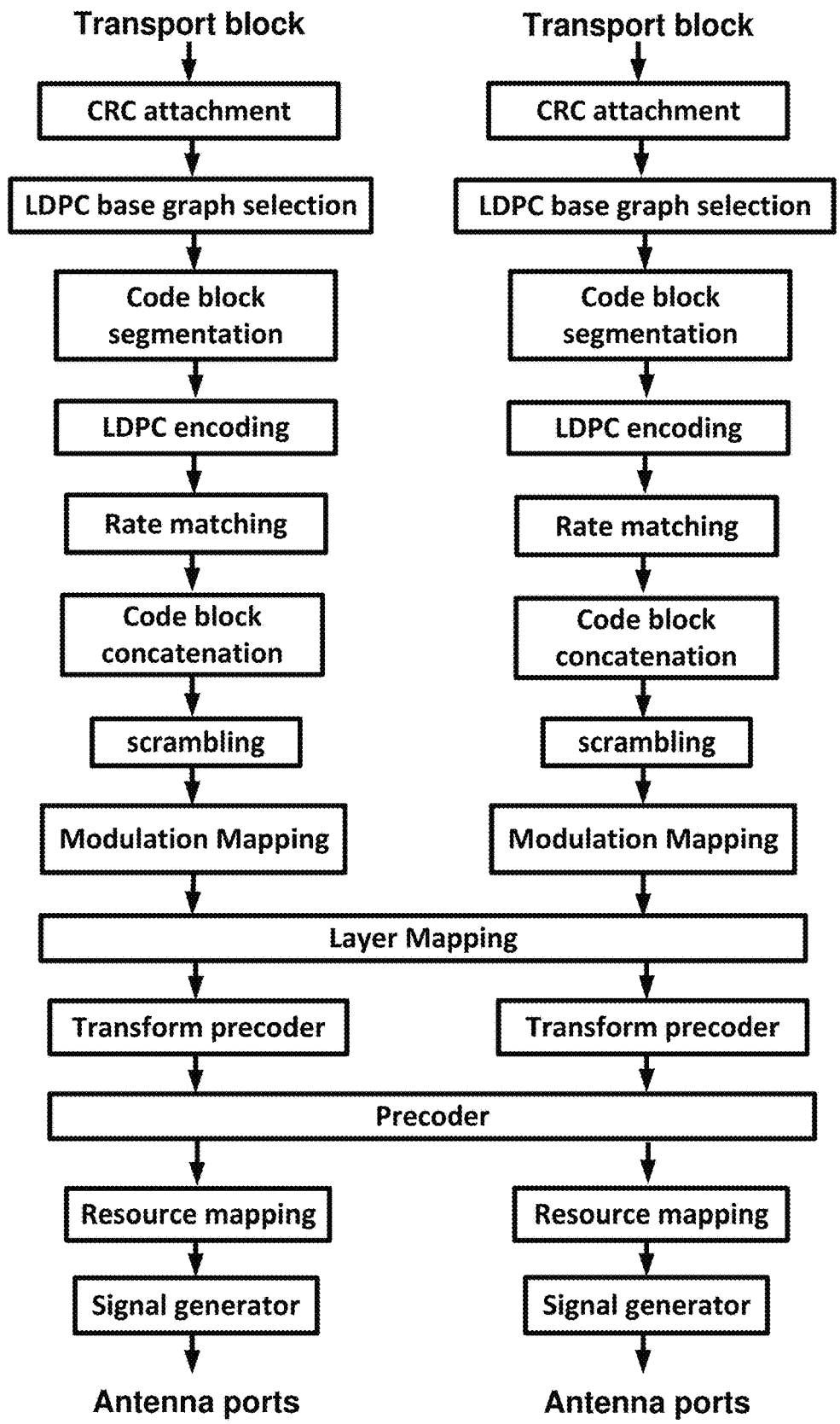
FIG. 6 shows example physical layer processes for signal transmission in accordance with several of various embodiments of the present disclosure.

FIG. 6 shows example physical layer processes for signal transmission in accordance with several of various embodiments of the present disclosure. Data and/or control streams from MAC layer may be encoded/decoded to offer transport and control services over the radio transmission link. For example, one or more (e.g., two as shown in FIG. 6) transport blocks may be received from the MAC layer for transmission via a physical channel (e.g., a physical downlink shared channel or a physical uplink shared channel). A cyclic redundancy check (CRC) may be calculated and attached to a transport block in the physical layer. The CRC calculation may be based on one or more cyclic generator polynomials. The CRC may be used by the receiver for error detection. Following the transport block CRC attachment, a low-density parity check (LDPC) base graph selection may be performed. In example embodiments, two LDPC base graphs may be used wherein a first LDPC base graph may be optimized for small transport blocks and a second LDPC base graph may be optimized for comparatively larger transport blocks.

The transport block may be segmented into code blocks and code block CRC may be calculated and attached to a code block. A code block may be LDPC coded and the LDPC coded blocks may be individually rate matched. The code blocks may be concatenated to create one or more codewords. The contents of a codeword may be scrambled and modulated to generate a block of complex-valued modulation symbols. The modulation symbols may be mapped to a plurality of transmission layers (e.g., multiple-input multiple-output (MIMO) layers) and the transmission layers may be subject to transform precoding and/or precoding. The precoded complex-valued symbols may be mapped to radio resources (e.g., resource elements). The signal generator block may create a baseband signal and up-convert the baseband signal to a carrier frequency for transmission via antenna ports. The signal generator block may employ mixers, filters and/or other radio frequency (RF) components prior to transmission via the antennas. The functions and blocks in FIG. 6 are illustrated as examples and other mechanisms may be implemented in various embodiments.

Figure 7:
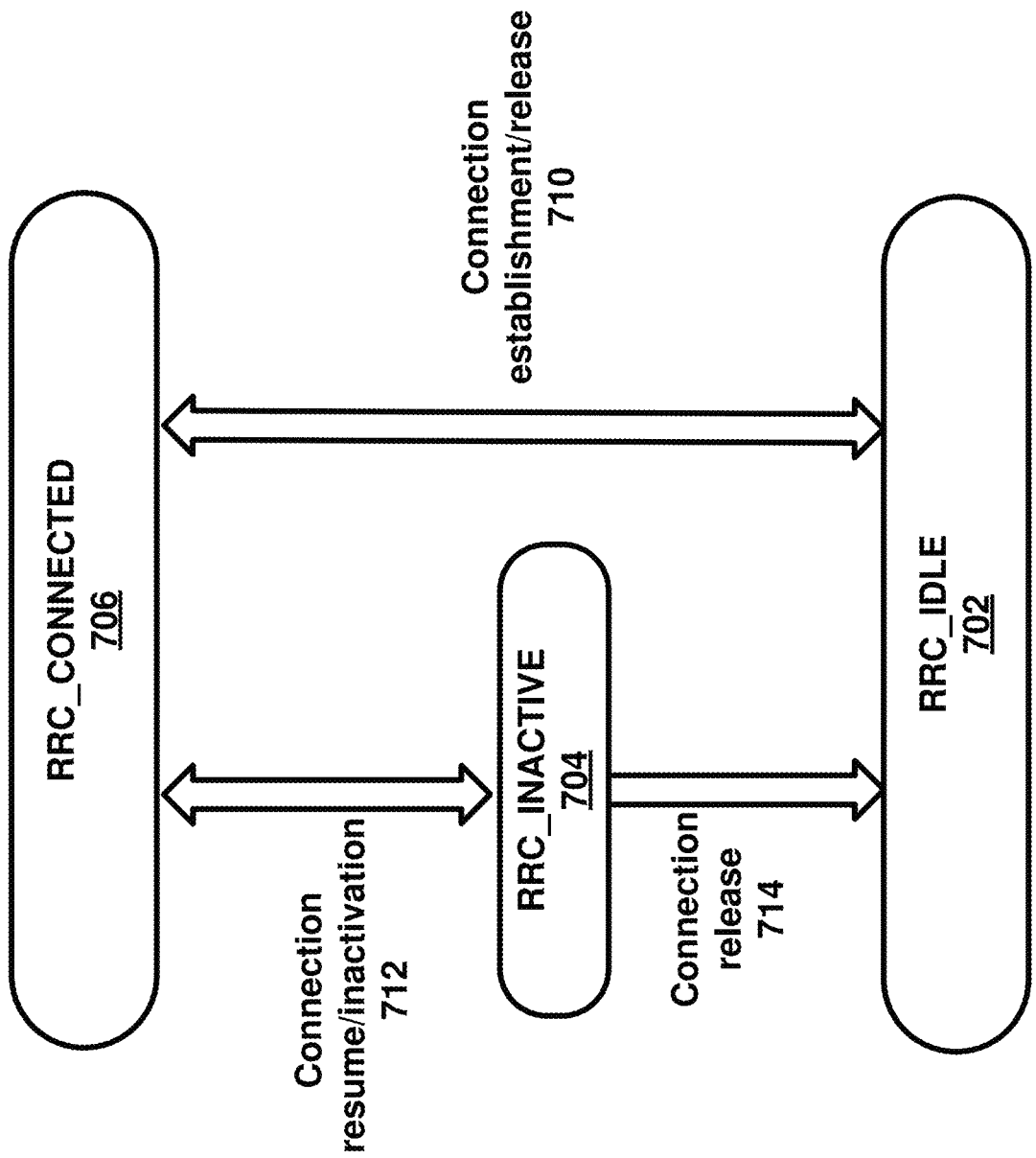
FIG. 7 shows examples of RRC states and RRC state transitions in accordance with several of various embodiments of the present disclosure.

FIG. 7 shows examples of RRC states and RRC state transitions at a UE in accordance with several of various embodiments of the present disclosure. A UE may be in one of three RRC states: RRC_IDLE 702, RRC INACTIVE 704 and RRC_CONNECTED 706. In RRC_IDLE 702 state, no RRC context (e.g., parameters needed for communications between the UE and the network) may be established for the UE in the RAN. In RRC_IDLE 702 state, no data transfer between the UE and the network may take place and uplink synchronization is not maintained. The wireless device may sleep most of the time and may wake up periodically to receive paging messages. The uplink transmission of the UE may be based on a random access process and to enable transition to the RRC_CONNECTED 706 state. The mobility in RRC_IDLE 702 state is through a cell reselection procedure where the UE camps on a cell based on one or more criteria including signal strength that is determined based on the UE measurements.

In RRC_CONNECTED 706 state, the RRC context is established and both the UE and the RAN have necessary parameters to enable communications between the UE and the network. In the RRC_CONNECTED 706 state, the UE is configured with an identity known as a Cell Radio Network Temporary Identifier (C-RNTI) that is used for signaling purposes (e.g., uplink and downlink scheduling, etc.) between the UE and the RAN. The wireless device mobility in the RRC_CONNECTED 706 state is managed by the RAN. The wireless device provides neighboring cells and/or current serving cell measurements to the network and the network may make hand over decisions. Based on the wireless device measurements, the current serving base station may send a handover request message to a neighboring base station and may send a handover command to the wireless device to handover to a cell of the neighboring base station. The transition of the wireless device from the RRC_IDLE 702 state to the RRC_CONNECTED 706 state or from the RRC_CONNECTED 706 state to the RRC_IDLE 702 state may be based on connection establishment and connection release procedures (shown collectively as connection establishment/release 710 in FIG. 7).

To enable a faster transition to the RRC_CONNECTED 706 state (e.g., compared to transition from RRC_IDLE 702 state to RRC_CONNECTED 706 state), an RRC_INACTIVE 704 state is used for an NR UE wherein, the RRC context is kept at the UE and the RAN. The transition from the RRC_INACTIVE 704 state to the RRC_CONNECTED 706 state is handled by RAN without CN signaling. Similar to the RRC_IDLE 702 state, the mobility in RRC_INACTIVE 704 state is based on a cell reselection procedure without involvement from the network. The transition of the wireless device from the RRC_INACTIVE 704 state to the RRC_CONNECTED 706 state or from the RRC_CONNECTED 706 state to the RRC_INACTIVE 704 state may be based on connection resume and connection inactivation procedures (shown collectively as connection resume/inactivation 712 in FIG. 7). The transition of the wireless device from the RRC_INACTIVE 704 state to the RRC_IDLE 702 state may be based on a connection release 714 procedure as shown in FIG. 7.

In NR, Orthogonal Frequency Division Multiplexing (OFDM), also called cyclic prefix OFDM (CP-OFDM), is the baseline transmission scheme in both downlink and uplink of NR and the Discrete Fourier Transform (DFT) spread OFDM (DFT-s-OFDM) is a complementary uplink transmission in addition to the baseline OFDM scheme. OFDM is multi-carrier transmission scheme wherein the transmission bandwidth may be composed of several narrowband sub-carriers. The subcarriers are modulated by the complex valued OFDM modulation symbols resulting in an OFDM signal. The complex valued OFDM modulation symbols are obtained by mapping, by a modulation mapper, the input data (e.g., binary digits) to different points of a modulation constellation diagram. The modulation constellation diagram depends on the modulation scheme. NR may use different types of modulation schemes including Binary Phase Shift Keying (BPSK), π/2-BPSK, Quadrature Phase Shift Keying (QPSK), 16 Quadrature Amplitude Modulation (16QAM), 64QAM and 256QAM. Different and/or higher order modulation schemes (e.g., M-QAM in general) may be used. An OFDM signal with N subcarriers may be generated by processing N subcarriers in parallel for example by using Inverse Fast Fourier Transform (IFFT) processing. The OFDM receiver may use FFT processing to recover the transmitted OFDM modulation symbols. The subcarrier spacing of subcarriers in an OFDM signal is inversely proportional to an OFDM modulation symbol duration. For example, for a 15 KHz subcarrier spacing, duration of an OFDM signal is nearly 66.7 μs. To enhance the robustness of OFDM transmission in time dispersive channels, a cyclic prefix (CP) may be inserted at the beginning of an OFDM symbol. For example, the last part of an OFDM symbol may be copied and inserted at the beginning of an OFDM symbol. The CP insertion enhanced the OFDM transmission scheme by preserving subcarrier orthogonality in time dispersive channels.

In NR, different numerologies may be used for OFDM transmission. A numerology of OFDM transmission may indicate a subcarrier spacing and a CP duration for the OFDM transmission. For example, a subcarrier spacing in NR may generally be a multiple of 15 KHz and expressed as $\Delta f = 2^\mu \cdot 15$ KHz ($\mu = 0, 1, 2, \ldots$). Example subcarrier spacings used in NR include 15 KHz ($\mu=0$), 30 KHz ($\mu=1$), 60 KHz ($\mu=2$), 120 KHz ($\mu=3$) and 240 KHz ($\mu=4$). As discussed before, a duration of OFDM symbol is inversely proportional to the subcarrier spacing and therefor OFDM symbol duration may depend on the numerology (e.g., the μ value).

Figure 8:
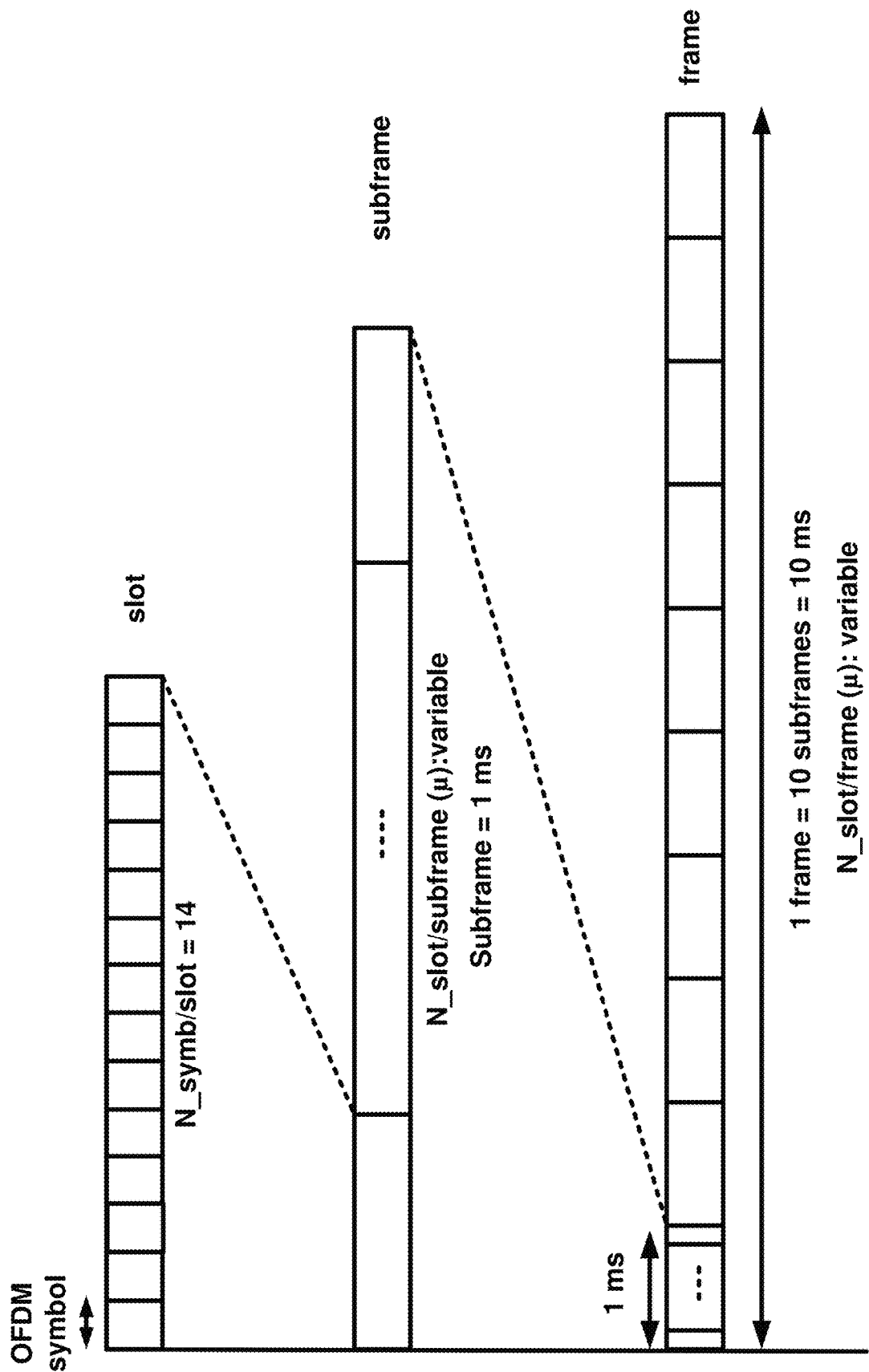
FIG. 8 shows an example time domain transmission structure in NR by grouping OFDM symbols into slots, subframes and frames in accordance with several of various embodiments of the present disclosure.

FIG. 8 shows an example time domain transmission structure in NR wherein OFDM symbols are grouped into slots, subframes and frames in accordance with several of various embodiments of the present disclosure. A slot is a group of $N_{symb}^{slot}$ OFDM symbols, wherein the $N_{symb}^{slot}$ may have a constant value (e.g., 14). Since different numerologies results in different OFDM symbol durations, duration of a slot may also depend on the numerology and may be variable. A subframe may have a duration of 1 ms and may be composed of one or more slots, the number of which may depend on the slot duration. The number of slots per subframe is therefore a subfunction of μ and may generally expressed as $N_{slot}^{subframe,\mu}$ and the number of symbols per subframe may be expressed as $N_{symb}^{subframe,\mu} = N_{symb}^{slot} N_{slot}^{subframe,\mu}$. A frame may have a duration of 10 ms and may consist of 10 subframes. The number of slots per frame may depend on the numerology and therefore may be variable. The number of slots per frame may generally be expressed as $N_{slot}^{subframe,\mu}$.

An antenna port may be defined as a logical entity such that channel characteristics over which a symbol on the antenna port is conveyed may be inferred from the channel characteristics over which another symbol on the same antenna port is conveyed. For example, for DM-RS associated with a PDSCH, the channel over which a PDSCH symbol on an antenna port is conveyed may be inferred from the channel over which a DM-RS symbol on the same antenna port is conveyed, for example, if the two symbols are within the same resource as the scheduled PDSCH and/or in the same slot and/or in the same precoding resource block group (PRG). For example, for DM-RS associated with a PDCCH, the channel over which a PDCCH symbol on an antenna port is conveyed may be inferred from the channel over which a DM-RS symbol on the same antenna port is conveyed if, for example, the two symbols are within resources for which the UE may assume the same precoding being used. For example, for DM-RS associated with a PBCH, the channel over which a PBCH symbol on one antenna port is conveyed may be inferred from the channel over which a DM-RS symbol on the same antenna port is conveyed if, for example, the two symbols are within a SS/PBCH block transmitted within the same slot, and with the same block index. The antenna port may be different from a physical antenna. An antenna port may be associated with an antenna port number and different physical channels may correspond to different ranges of antenna port numbers.

Figure 9:
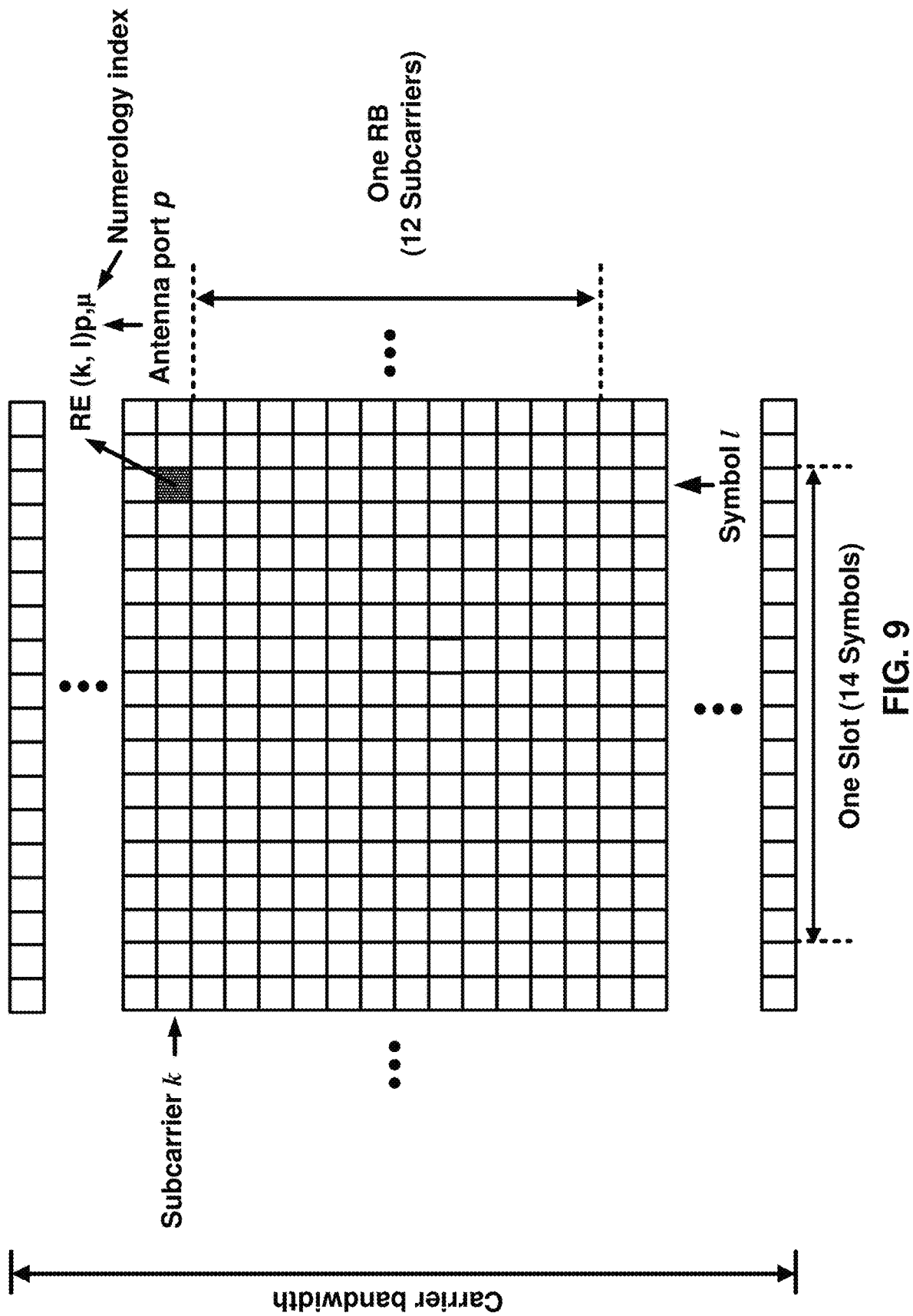
FIG. 9 shows an example of time-frequency resource grid in accordance with several of various embodiments of the present disclosure.

FIG. 9 shows an example of time-frequency resource grid in accordance with several of various embodiments of the present disclosure. The number of subcarriers in a carrier bandwidth may be based on the numerology of OFDM transmissions in the carrier. A resource element, corresponding to one symbol duration and one subcarrier, may be the smallest physical resource in the time-frequency grid. A resource element (RE) for antenna port p and subcarrier spacing configuration μ may be uniquely identified by $(k,l)_{p,\mu}$ where k is the index of a subcarrier in the frequency domain and l may refer to the symbol position in the time domain relative to some reference point. A resource block may be defined as $N_{SC}^{RB} = 12$ subcarriers. Since subcarrier spacing depends on the numerology of OFDM transmission, the frequency domain span of a resource block may be variable and may depend on the numerology. For example, for a subcarrier spacing of 15 KHz (e.g., μ=0), a resource block may be 180 KHz and for a subcarrier spacing of 30 KHz (e.g., µ=1), a resource block may be 360 KHz.

With large carrier bandwidths defined in NR and due to limited capabilities for some UEs (e.g., due to hardware limitations), a UE may not support an entire carrier bandwidth. Receiving on the full carrier bandwidth may imply high energy consumption. For example, transmitting downlink control channels on the full downlink carrier bandwidth may result in high power consumption for wide carrier bandwidths. NR may use a bandwidth adaptation procedure to dynamically adapt the transmit and receive bandwidths. The transmit and receive bandwidth of a UE on a cell may be smaller than the bandwidth of the cell and may be adjusted. For example, the width of the transmit and/or receive bandwidth may change (e.g., shrink during period of low activity to save power); the location of the transmit and/or receive bandwidth may move in the frequency domain (e.g., to increase scheduling flexibility); and the subcarrier spacing of the transmit or receive bandwidth may change (e.g., to allow different services). A subset of the cell bandwidth may be referred to as a Bandwidth Part (BWP) and bandwidth adaptation may be achieved by configuring the UE with one or more BWPs. The base station may configure a UE with a set of downlink BWPs and a set of uplink BWPs. A BWP may be characterized by a numerology (e.g., subcarrier spacing and cyclic prefix) and a set of consecutive resource blocks in the numerology of the BWP. One or more first BWPs of the one or more BWPs of the cell may be active at a time. An active BWP may be an active downlink BWP or an active uplink BWP.

Figure 10:
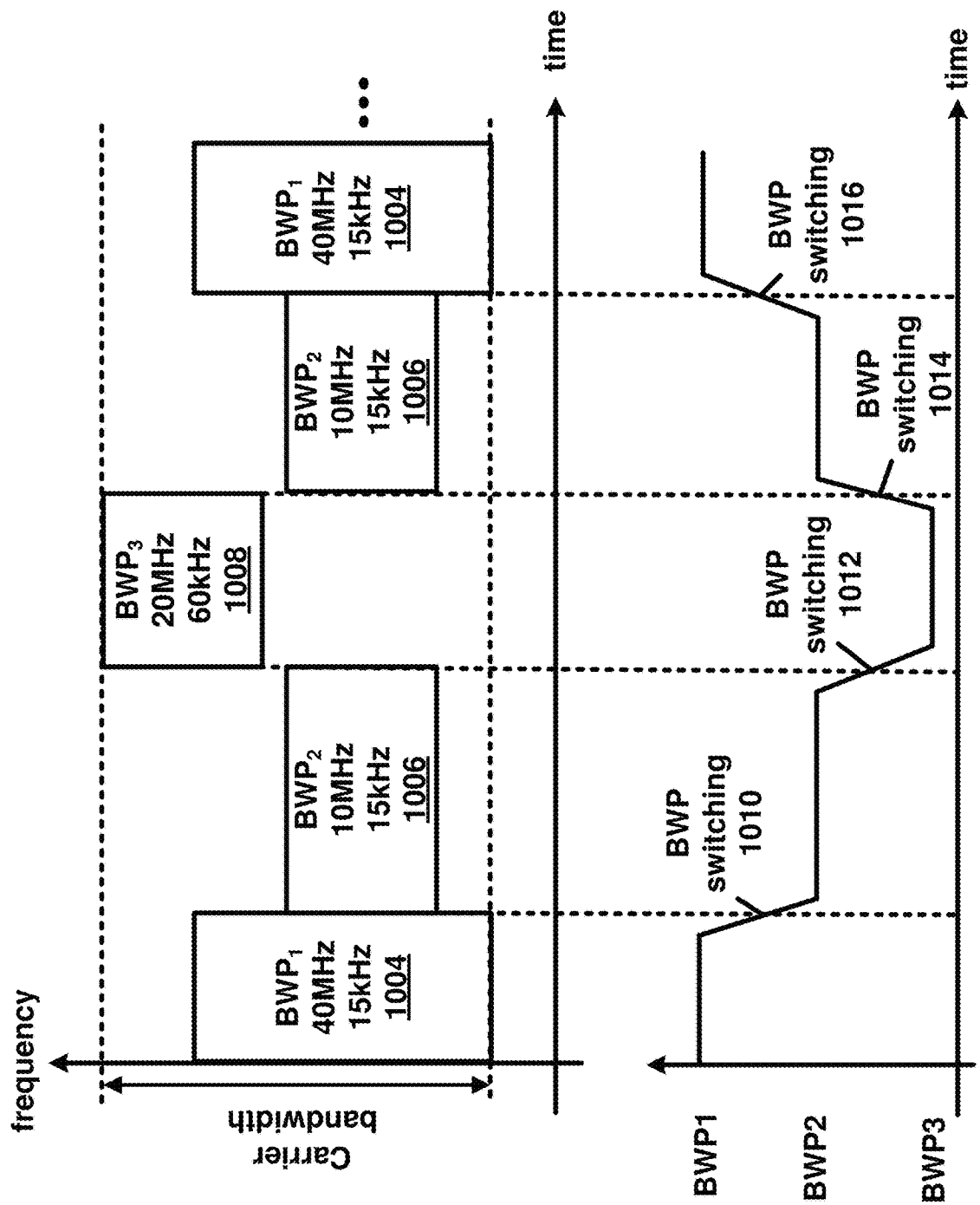
FIG. 10 shows example adaptation and switching of bandwidth parts in accordance with several of various embodiments of the present disclosure.

FIG. 10 shows an example of bandwidth part adaptation and switching. In this example, three BWPs (BWP$_1$ 1004, BWP$_2$ 1006 and BWP$_3$ 1008) are configured for a UE on a carrier bandwidth. The BWP$_1$ is configured with a bandwidth of 40 MHz and a numerology with subcarrier spacing of 15 KHz, the BWP$_2$ is configured with a bandwidth of 10 MHz and a numerology with subcarrier spacing of 15 KHz and the BWP$_3$ is configured with a bandwidth of 20 MHz and a subcarrier spacing of 60 KHz. The wireless device may switch from a first BWP (e.g., BWP$_1$) to a second BWP (e.g., BWP$_2$). An active BWP of the cell may change from the first BWP to the second BWP in response to the BWP switching.

The BWP switching (e.g., BWP switching 1010, BWP switching 1012, BWP switching 1014, or BWP switching 1016 in FIG. 10) may be based on a command from the base station. The command may be a DCI comprising scheduling information for the UE in the second BWP. In case of uplink BWP switching, the first BWP and the second BWP may be uplink BWPs and the scheduling information may be an uplink grant for uplink transmission via the second BWP. In case of downlink BWP switching, the first BWP and the second BWP may be downlink BWPs and the scheduling information may be a downlink assignment for downlink reception via the second BWP.

The BWP switching (e.g., BWP switching 1010, BWP switching 1012, BWP switching 1014, or BWP switching 1016 in FIG. 10) may be based on an expiry of a timer. The base station may configure a wireless device with a BWP inactivity timer and the wireless device may switch to a default BWP (e.g., default downlink BWP) based on the expiry of the BWP inactivity timer. The expiry of the BWP inactivity timer may be an indication of low activity on the current active downlink BWP. The base station may configure the wireless device with the default downlink BWP. If the base station does not configure the wireless device with the default BWP, the default BWP may be an initial downlink BWP. The initial active BWP may be the BWP that the wireless device receives scheduling information for remaining system information upon transition to an RRC_CONNECTED state.

A wireless device may monitor a downlink control channel of a downlink BWP. For example, the UE may monitor a set of PDCCH candidates in configured monitoring occasions in one or more configured COntrol REsource SETs (CORESETs) according to the corresponding search space configurations. A search space configuration may define how/where to search for PDCCH candidates. For example, the search space configuration parameters may comprise a monitoring periodicity and offset parameter indicating the slots for monitoring the PDCCH candidates. The search space configuration parameters may further comprise a parameter indicating a first symbol with a slot within the slots determined for monitoring PDCCH candidates. A search space may be associated with one or more CORESETs and the search space configuration may indicate one or more identifiers of the one or more CORESETs. The search space configuration parameters may further indicate that whether the search space is a common search space or a UE-specific search space. A common search space may be monitored by a plurality of wireless devices and a UE-specific search space may be dedicated to a specific UE.

Figure 11A:
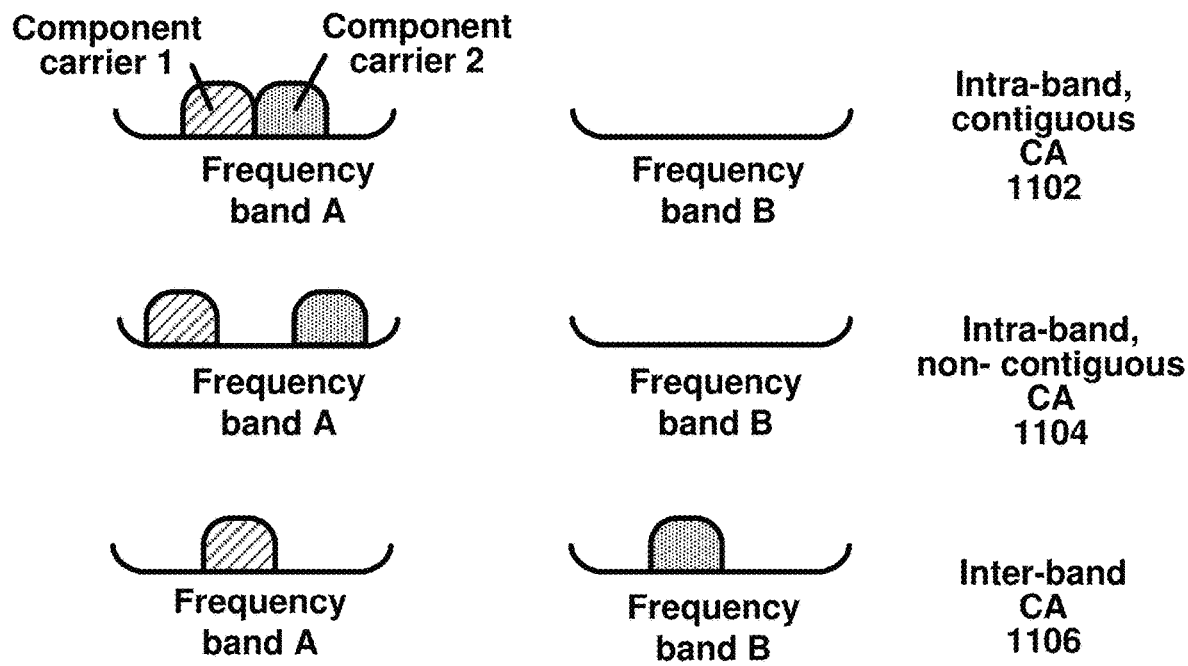
FIG. 11A shows example arrangements of carriers in carrier aggregation in accordance with several of various embodiments of the present disclosure.

FIG. 11A shows example arrangements of carriers in carrier aggregation in accordance with several of various embodiments of the present disclosure. With carrier aggregation, multiple NR component carriers (CCs) may be aggregated. Downlink transmissions to a wireless device may take place simultaneously on the aggregated downlink CCs resulting in higher downlink data rates. Uplink transmissions from a wireless device may take place simultaneously on the aggregated uplink CCs resulting in higher uplink data rates. The component carriers in carrier aggregation may be on the same frequency band (e.g., intra-band carrier aggregation) or on different frequency bands (e.g., inter-band carrier aggregation). The component carriers may also be contiguous or non-contiguous. This results in three possible carrier aggregation scenarios, intra-band contiguous CA 1102, intra-band non-contiguous CA 1104 and inter-band CA 1106 as shown in FIG. 11A. Depending on the UE capability for carrier aggregation, a UE may transmit and/or receive on multiple carriers or for a UE that is not capable of carrier aggregation, the UE may transmit and/or receive on one component carrier at a time. In this disclosure, the carrier aggregation is described using the term cell and a carrier aggregation capable UE may transmit and/or receive via multiple cells.

In carrier aggregation, a UE may be configured with multiple cells. A cell of the multiple cells configured for the UE may be referred to as a Primary Cell (PCell). The PCell may be the first cell that the UE is initially connected to. One or more other cells configured for the UE may be referred to as Secondary Cells (SCells). The base station may configure a UE with multiple SCells. The configured SCells may be deactivated upon configuration and the base station may dynamically activate or deactivate one or more of the configured SCells based on traffic and/or channel conditions. The base station may activate or deactivate configured SCells using a SCell Activation/Deactivation MAC CE. The SCell Activation/Deactivation MAC CE may comprise a bitmap, wherein each bit in the bitmap may correspond to a SCell and the value of the bit indicates an activation status or deactivation status of the SCell.

An SCell may also be deactivated in response to expiry of a SCell deactivation timer of the SCell. The expiry of an SCell deactivation timer of an SCell may be an indication of low activity (e.g., low transmission or reception activity) on the SCell. The base station may configure the SCell with an SCell deactivation timer. The base station may not configure an SCell deactivation timer for an SCell that is configured with PUCCH (also referred to as a PUCCH SCell). The configuration of the SCell deactivation timer may be per configured SCell and different SCells may be configured with different SCell deactivation timer values. The SCell deactivation timer may be restarted based on one or more criteria including reception of downlink control information on the SCell indicating uplink grant or downlink assignment for the SCell or reception of downlink control information on a scheduling cell indicating uplink grant or downlink assignment for the SCell or transmission of a MAC PDU based on a configured uplink grant or reception of a configured downlink assignment.

A PCell for a UE may be an SCell for another UE and a SCell for a UE may be PCell for another UE. The configuration of PCell may be UE-specific. One or more SCells of the multiple SCells configured for a UE may be configured as downlink-only SCells, e.g., may only be used for downlink reception and may not be used for uplink transmission. In case of self-scheduling, the base station may transmit signaling for uplink grants and/or downlink assignments on the same cell that the corresponding uplink or downlink transmission takes place. In case of cross-carrier scheduling, the base station may transmit signaling for uplink grants and/or downlink assignments on a cell different from the cell that the corresponding uplink or downlink transmission takes place.

Figure 11B:
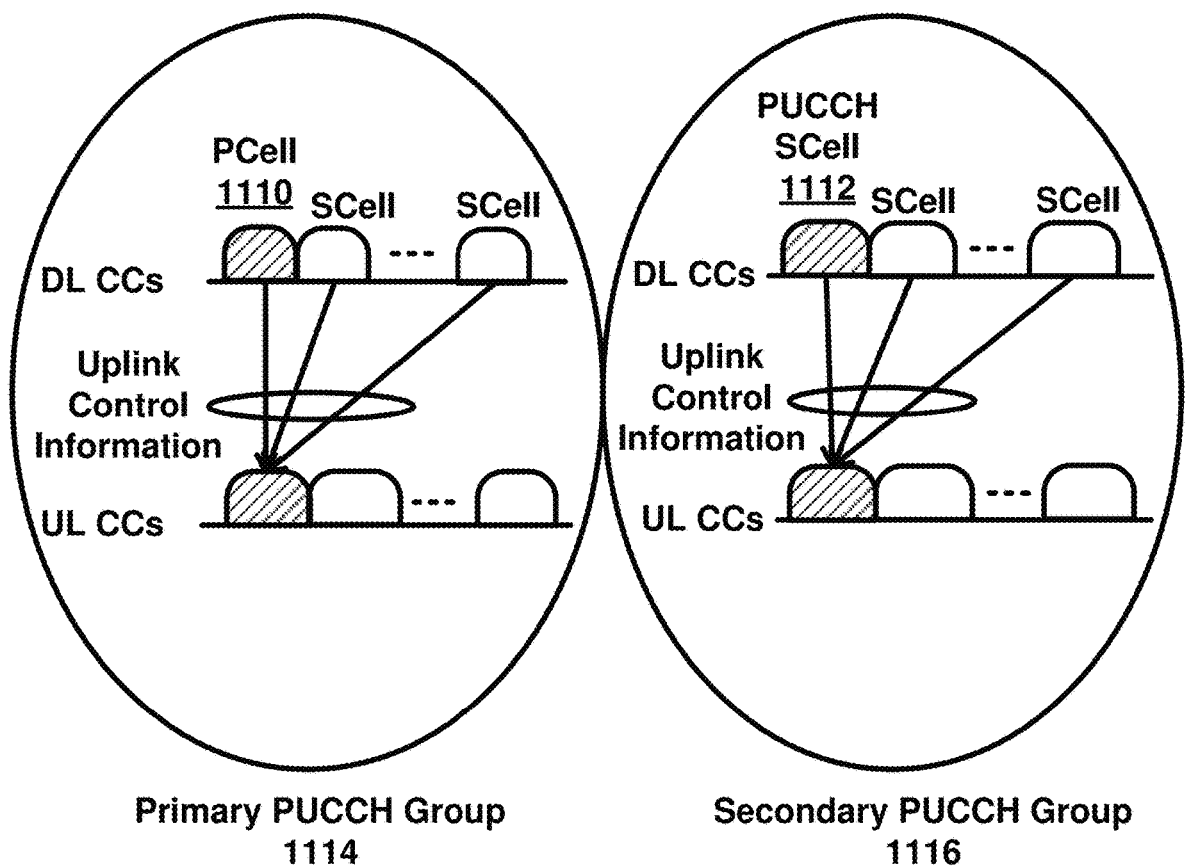
FIG. 11B shows examples of uplink control channel groups in accordance with several of various embodiments of the present disclosure.

FIG. 11B shows examples of uplink control channel groups in accordance with several of various embodiments of the present disclosure. A base station may configure a UE with multiple PUCCH groups wherein a PUCCH group comprises one or more cells. For example, as shown in FIG. 11B, the base station may configure a UE with a primary PUCCH group 1114 and a secondary PUCCH group 1116. The primary PUCCH group may comprise the PCell 1110 and one or more first SCells. First UCI corresponding to the PCell and the one or more first SCells of the primary PUCCH group may be transmitted by the PUCCH of the PCell. The first UCI may be, for example, HARQ feedback for downlink transmissions via downlink CCs of the PCell and the one or more first SCells. The secondary PUCCH group may comprise a PUCCH SCell and one or more second SCells. Second UCI corresponding to the PUCCH SCell and the one or more second SCells of the secondary PUCCH group may be transmitted by the PUCCH of the PUCCH SCell. The second UCI may be, for example, HARQ feedback for downlink transmissions via downlink CCs of the PUCCH SCell and the one or more second SCells.

FIG. 12A, FIG. 12B and FIG. 12C show example random access processes in accordance with several of various embodiments of the present disclosure. FIG. 12A shows an example of four step contention-based random access (CBRA) procedure. The four-step CBRA procedure includes exchanging four messages between a UE and a base station. Msg1 may be for transmission (or retransmission) of a random access preamble by the wireless device to the base station. Msg2 may be the random access response (RAR) by the base station to the wireless device. Msg3 is the scheduled transmission based on an uplink grant indicated in Msg2 and Msg4 may be for contention resolution.

The base station may transmit one or more RRC messages comprising configuration parameters of the random access parameters. The random access parameters may indicate radio resources (e.g., time-frequency resources) for transmission of the random access preamble (e.g., Msg1), configuration index, one or more parameters for determining the power of the random access preamble (e.g., a power ramping parameter, a preamble received target power, etc.), a parameter indicating maximum number of preamble transmission, RAR window for monitoring RAR, cell-specific random access parameters and UE specific random access parameters. The UE-specific random access parameters may indicate one or more PRACH occasions for random access preamble (e.g., Msg1) transmissions. The random access parameters may indicate association between the PRACH occasions and one or more reference signals (e.g., SSB or CSI-RS). The random access parameters may further indicate association between the random access preambles and one or more reference signals (e.g., SBB or CSI-RS). The UE may use one or more reference signals (e.g., SSB(s) or CSI-RS(s)) and may determine a random access preamble to use for Msg1 transmission based on the association between the random access preambles and the one or more reference signals. The UE may use one or more reference signals (e.g., SSB(s) or CSI-RS(s)) and may determine the PRACH occasion to use for Msg1 transmission based on the association between the PRACH occasions and the reference signals. The UE may perform a retransmission of the random access preamble if no response is received with the RAR window following the transmission of the preamble. UE may use a higher transmission power for retransmission of the preamble. UE may determine the higher transmission power of the preamble based on the power ramping parameter.

Msg2 is for transmission of RAR by the base station. Msg2 may comprise a plurality of RARs corresponding to a plurality of random access preambles transmitted by a plurality of UEs. Msg2 may be associated with a random access temporary radio identifier (RA-RNTI) and may be received in a common search space of the UE. The RA-RNTI may be based on the PRACH occasion (e.g., time and frequency resources of a PRACH) in which a random access preamble is transmitted. RAR may comprise a timing advance command for uplink timing adjustment at the UE, an uplink grant for transmission of Msg3 and a temporary C-RNTI. In response to the successful reception of Msg2, the UE may transmit the Msg3. Msg3 and Msg4 may enable contention resolution in case of CBRA. In a CBRA, a plurality of UEs may transmit the same random access preamble and may consider the same RAR as being corresponding to them. UE may include a device identifier in Msg3 (e.g., a C-RNTI, temporary C-RNTI or other UE identity). Base station may transmit the Msg4 with a PDSCH and UE may assume that the contention resolution is successful in response to the PDSCH used for transmission of Msg4 being associated with the UE identifier included in Msg3.

FIG. 12B shows an example of a contention-free random access (CFRA) process. Msg 1 (random access preamble) and Msg 2 (random access response) in FIG. 12B for CFRA may be analogous to Msg 1 and Msg 2 in FIG. 12A for CBRA. In an example, the CFRA procedure may be initiated in response to a PDCCH order from a base station. The PDCCH order for initiating the CFRA procedure by the wireless device may be based on a DCI having a first format (e.g., format 1_0). The DCI for the PDCCH order may comprise a random access preamble index, an UL/SUL indicator indicating an uplink carrier of a cell (e.g., normal uplink carrier or supplementary uplink carrier) for transmission of the random access preamble, a SS/PBCH index indicating the SS/PBCH that may be used to determine a RACH occasion for PRACH transmission, a PRACH mask index indicating the RACH occasion associated with the SS/PBCH indicated by the SS/PBCH index for PRACH transmission, etc. In an example, the CFRA process may be started in response to a beam failure recovery process. The wireless device may start the CFRA for the beam failure recovery without a command (e.g., PDCCH order) from the base station and by using the wireless device dedicated resources.

FIG. 12C shows an example of a two-step random access process comprising two messages exchanged between a wireless device and a base station. Msg A may be transmitted by the wireless device to the base station and may comprise one or more transmissions of a preamble and/or one or more transmissions of a transport block. The transport block in Msg A and Msg 3 in FIG. 12A may have similar and/or equivalent contents. The transport block of Msg A may comprise data and control information (e.g., SR, HARQ feedback, etc.). In response to the transmission of Msg A, the wireless device may receive Msg B from the base station. Msg B in FIG. 12C and Msg 2 (e.g., RAR) illustrated in FIGS. 12A and 12B may have similar and/or equivalent content.

The base station may periodically transmit synchronization signals (SSs), e.g., primary SS (PSS) and secondary SS (SSS) along with PBCH on each NR cell. The PSS/SSS together with PBCH is jointly referred to as a SS/PBCH block. The SS/PBCH block enables a wireless device to find a cell when entering to the mobile communications network or find new cells when moving within the network. The SS/PBCH block spans four OFDM symbols in time domain. The PSS is transmitted in the first symbol and occupies 127 subcarriers in frequency domain. The SSS is transmitted in the third OFDM symbol and occupies the same 127 subcarriers as the PSS. There are eight and nine empty subcarriers on each side of the SSS. The PBCH is transmitted on the second OFDM symbol occupying 240 subcarriers, the third OFDM symbol occupying 48 subcarriers on each side of the SSS, and on the fourth OFDM symbol occupying 240 subcarriers. Some of the PBCH resources indicated above may be used for transmission of the demodulation reference signal (DMRS) for coherent demodulation of the PBCH. The SS/PBCH block is transmitted periodically with a period ranging from 5 ms to 160 ms. For initial cell search or for cell search during inactive/idle state, a wireless device may assume that that the SS/PBCH block is repeated at least every 20 ms.

In NR, transmissions using of antenna arrays, with many antenna elements, and beamforming plays an important role specially in higher frequency bands. Beamforming enables higher capacity by increasing the signal strength (e.g., by focusing the signal energy in a specific direction) and by lowering the amount interference received at the wireless devices. The beamforming techniques may generally be divided to analog beamforming and digital beamforming techniques. With digital beamforming, signal processing for beamforming is carried out in the digital domain before digital-to-analog conversion and detailed control of both amplitude and phase of different antenna elements may be possible. With analog beamforming, the signal processing for beamforming is carried out in the analog domain and after the digital to analog conversion. The beamformed transmissions may be in one direction at a time. For example, the wireless devices that are in different directions relative to the base station may receive their downlink transmissions at different times. For analog receiver-side beamforming, the receiver may focus its receiver beam in one direction at a time.

In NR, the base station may use beam sweeping for transmission of SS/PBCH blocks. The SS/PBCH blocks may be transmitted in different beams using time multiplexing. The set of SS/PBCH blocks that are transmitted in one beam sweep may be referred to as a SS/PBCH block set. The period of PBCH/SSB block transmission may be a time duration between a SS/PBCH block transmission in a beam and the next SS/PBCH block transmission in the same beam. The period of SS/PBCH block is, therefore, also the period of the SS/PBCH block set.

Figure 13A:
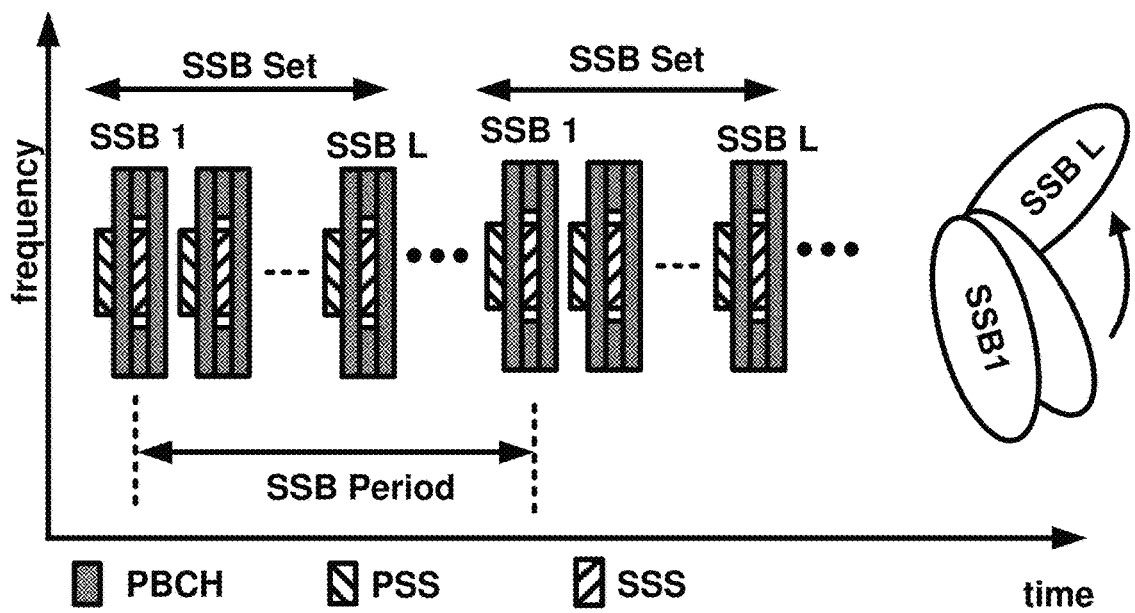
FIG. 13A shows example time and frequency structure of SSBs and their associations with beams in accordance with several of various embodiments of the present disclosure.

FIG. 13A shows example time and frequency structure of SS/PBCH blocks and their associations with beams in accordance with several of various embodiments of the present disclosure. In this example, a SS/PBCH block (also referred to as SSB) set comprise L SSBs wherein an SSB in the SSB set is associated with (e.g., transmitted in) one of L beams of a cell. The transmission of SBBs of an SSB set may be confined within a 5 ms interval, either in a first half-frame or a second half-frame of a 10 ms frame. The number of SSBs in an SSB set may depend on the frequency band of operation. For example, the number of SSBs in a SSB set may be up to four SSBs in frequency bands below 3 GHz enabling beam sweeping of up to four beams, up to eight SSBs in frequency bands between 3 GHz and 6 GHz enabling beam sweeping of up to eight beams, and up to sixty four SSBs in higher frequency bands enabling beam sweeping of up to sixty four beams. The SSs of an SSB may depend on a physical cell identity (PCI) of the cell and may be independent of which beam of the cell is used for transmission of the SSB. The PBCH of an SSB may indicate a time index parameter and the wireless device may determine the relative position of the SSB within the SSB set using the time index parameter. The wireless device may use the relative position of the SSB within an SSB set for determining the frame timing and/or determining RACH occasions for a random access process.

A wireless device entering the mobile communications network may first search for the PSS. After detecting the PSS, the wireless device may determine the synchronization up to the periodicity of the PSS. By detecting the PSS, the wireless device may determine the transmission timing of the SSS. The wireless device may determine the PCI of the cell after detecting the SSS. The PBCH of a SS/PBCH block is a downlink physical channel that carries the MIB. The MIB may be used by the wireless device to obtain remaining system information (RMSI) that is broadcast by the network. The RMSI may include System Information Block 1 (SIB1) that contains information required for the wireless device to access the cell.

As discussed earlier, the wireless device may determine a time index parameter from the SSB. The PBCH comprises a half-frame parameter indicating whether the SSB is in the first 5 ms half or the second 5 ms half of a 10 ms frame. The wireless device may determine the frame boundary using the time index parameter and the half-frame parameter. In addition, the PBCH may comprise a parameter indicating the system frame number (SFN) of the cell.

The base station may transmit CSI-RS and a UE may measure the CSI-RS to obtain channel state information (CSI). The base station may configure the CSI-RS in a UE-specific manner. In some scenarios, same set of CSI-RS resources may be configured for multiple UEs and one or more resource elements of a CSI-RS resource may be shared among multiple UEs. A CSI-RS resource may be configured such that it does not collide with a CORESET configured for the wireless device and/or with a DMRS of a PDSCH scheduled for the wireless device and/or transmitted SSBs. The UE may measure one or more CSI-RSs configured for the UE and may generate a CSI report based on the CSI-RS measurements and may transmit the CSI report to the base station for scheduling, link adaptation and/or other purposes.

NR supports flexible CSI-RS configurations. A CSI-RS resource may be configured with single or multiple antenna ports and with configurable density. Based on the number of configured antenna ports, a CSI-RS resource may span different number of OFDM symbols (e.g., 1, 2, and 4 symbols). The CSI-RS may be configured for a downlink BWP and may use the numerology of the downlink BWP. The CSI-RS may be configured to cover the full bandwidth of the downlink BWP or a portion of the downlink BWP. In some case, the CSI-RS may be repeated in every resource block of the CSI-RS bandwidth, referred to as CSI-RS with density equal to one. In some cases, the CSI-RS may be configured to be repeated in every other resource block of the CSI-RS bandwidth. CSI-RS may be non-zero power (NZP) CSI-RS or zero-power (ZP) CSI-RS.

The base station may configure a wireless device with one or more sets of NZP CSI-RS resources. The base station may configure the wireless device with a NZP CSI-RS resource set using an RRC information element (IE) NZP-CSI-RS-ResourceSet indicating a NZP CSI-RS resource set identifier (ID) and parameters specific to the NZP CSI-RS resource set. An NZP CSI-RS resource set may comprise one or more CSI-RS resources. An NZP CSI-RS resource set may be configured as part of the CSI measurement configuration.

The CSI-RS may be configured for periodic, semi-persistent or aperiodic transmission. In case of the periodic and semi-persistent CSI-RS configurations, the wireless device may be configured with a CSI resource periodicity and offset parameter that indicate a periodicity and corresponding offset in terms of number of slots. The wireless device may determine the slots that the CSI-RSs are transmitted. For semi-persistent CSI-RS, the CSI-RS resources for CSI-RS transmissions may be activated and deactivated by using a semi-persistent (SP) CSI-CSI Resource Set Activation/Deactivation MAC CE. In response to receiving a MAC CE indicating activation of semi-persistent CSI-RS resources, the wireless device may assume that the CSI-RS transmissions will continue until the CSI-RS resources for CSI-RS transmissions are activated.

As discussed before, CSI-RS may be configured for a wireless device as NZP CSI-RS or ZP CSI-RS. The configuration of the ZP CSI-RS may be similar to the NZP CSI-RS with the difference that the wireless device may not carry out measurements for the ZP CSI-RS. By configuring ZP CSI-RS, the wireless device may assume that a scheduled PDSCH that includes resource elements from the ZP CSI-RS is rate matched around those ZP CSI-RS resources. For example, a ZP CSI-RS resource configured for a wireless device may be an NZP CSI-RS resource for another wireless device. For example, by configuring ZP CSI-RS resources for the wireless device, the base station may indicate to the wireless device that the PDSCH scheduled for the wireless device is rate matched around the ZP CSI-RS resources.

A base station may configure a wireless device with channel state information interference measurement (CSI-IM) resources. Similar to the CSI-RS configuration, configuration of locations and density of CSI-IM resources may be flexible. The CSI-IM resources may be periodic (configured with a periodicity), semi-persistent (configured with a periodicity and activated and deactivated by MAC CE) or aperiodic (triggered by a DCI).

Tracking reference signals (TRSs) may be configured for a wireless device as a set of sparse reference signals to assist the wireless in time and frequency tracking and compensating time and frequency variations in its local oscillator. The wireless device may further use the TRSs for estimating channel characteristics such as delay spread or doppler frequency. The base station may use a CSI-RS configuration for configuring TRS for the wireless device. The TRS may be configured as a resource set comprising multiple periodic NZP CSI-RS resources.

A base station may configure a UE and the UE may transmit sounding reference signals (SRSs) to enable uplink channel sounding/estimation at the base station. The SRS may support up to four antenna ports and may be designed with low cubic metric enabling efficient operation of the wireless device amplifier. The SRS may span one or more (e.g., one, two or four) consecutive OFDM symbols in time domain and may be located within the last n (e.g., six) symbols of a slot. In the frequency domain, the SRS may have a structure that is referred to as a comb structure and may be transmitted on every Nth subcarrier. Different SRS transmissions from different wireless devices may have different comb structures and may be multiplexed in frequency domain.

A base station may configure a wireless device with one or more SRS resource sets and an SRS resource set may comprise one or more SRS resources. The SRS resources in an SRS resources set may be configured for periodic, semi-persistent or aperiodic transmission. The periodic SRS and the semi-persistent SRS resources may be configured with periodicity and offset parameters. The Semi-persistent SRS resources of a configured semi-persistent SRS resource set may be activated or deactivated by a semi-persistent (SP) SRS Activation/Deactivation MAC CE. The set of SRS resources included in an aperiodic SRS resource set may be activated by a DCI. A value of a field (e.g., an SRS request field) in the DCI may indicate activation of resources in an aperiodic SRS resource set from a plurality of SRS resource sets configured for the wireless device.

An antenna port may be associated with one or more reference signals. The receiver may assume that the one or more reference signals, associated with the antenna port, may be used for estimating channel corresponding to the antenna port. The reference signals may be used to derive channel state information related to the antenna port. Two antenna ports may be referred to as quasi co-located if characteristics (e.g., large-scale properties) of the channel over which a symbol is conveyed on one antenna port may be inferred from the channel over which a symbol is conveyed from another antenna port. For example, a UE may assume that radio channels corresponding to two different antenna ports have the same large-scale properties if the antenna ports are specified as quasi co-located. In some cases, the UE may assume that two antenna ports are quasi co-located based on signaling received from the base station. Spatial quasi-colocation (QCL) between two signals may be, for example, due to the two signals being transmitted from the same location and in the same beam. If a receive beam is good for a signal in a group of signals that are spatially quasi co-located, it may be assumed also be good for the other signals in the group of signals.

The CSI-RS in the downlink and the SRS in uplink may serve as quasi-location (QCL) reference for other physical downlink channels and physical uplink channels, respectively. For example, a downlink physical channel (e.g., PDSCH or PDCCH) may be spatially quasi co-located with a downlink reference signal (e.g., CSI-RS or SSB). The wireless device may determine a receive beam based on measurement on the downlink reference signal and may assume that the determined received beam is also good for reception of the physical channels (e.g., PDSCH or PDCCH) that are spatially quasi co-located with the downlink reference signal. Similarly, an uplink physical channel (e.g., PUSCH or PUCCH) may be spatially quasi co-located with an uplink reference signal (e.g., SRS). The base station may determine a receive beam based on measurement on the uplink reference signal and may assume that the determined received beam is also good for reception of the physical channels (e.g., PUSCH or PUCCH) that are spatially quasi co-located with the uplink reference signal.

The Demodulation Reference Signals (DM-RSs) enables channel estimation for coherent demodulation of downlink physical channels (e.g., PDSCH, PDCCH and PBH) and uplink physical channels (e.g., PUSCH and PUCCH). The DM-RS may be located early in the transmission (e.g., front-loaded DM-RS) and may enable the receiver to obtain the channel estimate early and reduce the latency. The time-domain structure of the DM-RS (e.g., symbols wherein the DM-RS are located in a slot) may be based on different mapping types.

The Phase Tracking Reference Signals (PT-RSs) enables tracking and compensation of phase variations across the transmission duration. The phase variations may be, for example, due to oscillator phase noise. The oscillator phase noise may become more sever in higher frequencies (e.g., mmWave frequency bands). The base station may configure the PT-RS for uplink and/or downlink. The PT-RS configuration parameters may indicate frequency and time density of PT-RS, maximum number of ports (e.g., uplink ports), resource element offset, configuration of uplink PT-RS without transform precoder (e.g., CP-OFDM) or with transform precoder (e.g., DFT-s-OFDM), etc. The subcarrier number and/or resource blocks used for PT-RS transmission may be based on the C-RNTI of the wireless device to reduce risk of collisions between PT-RSs of wireless devices scheduled on overlapping frequency domain resources.

Figure 13B:
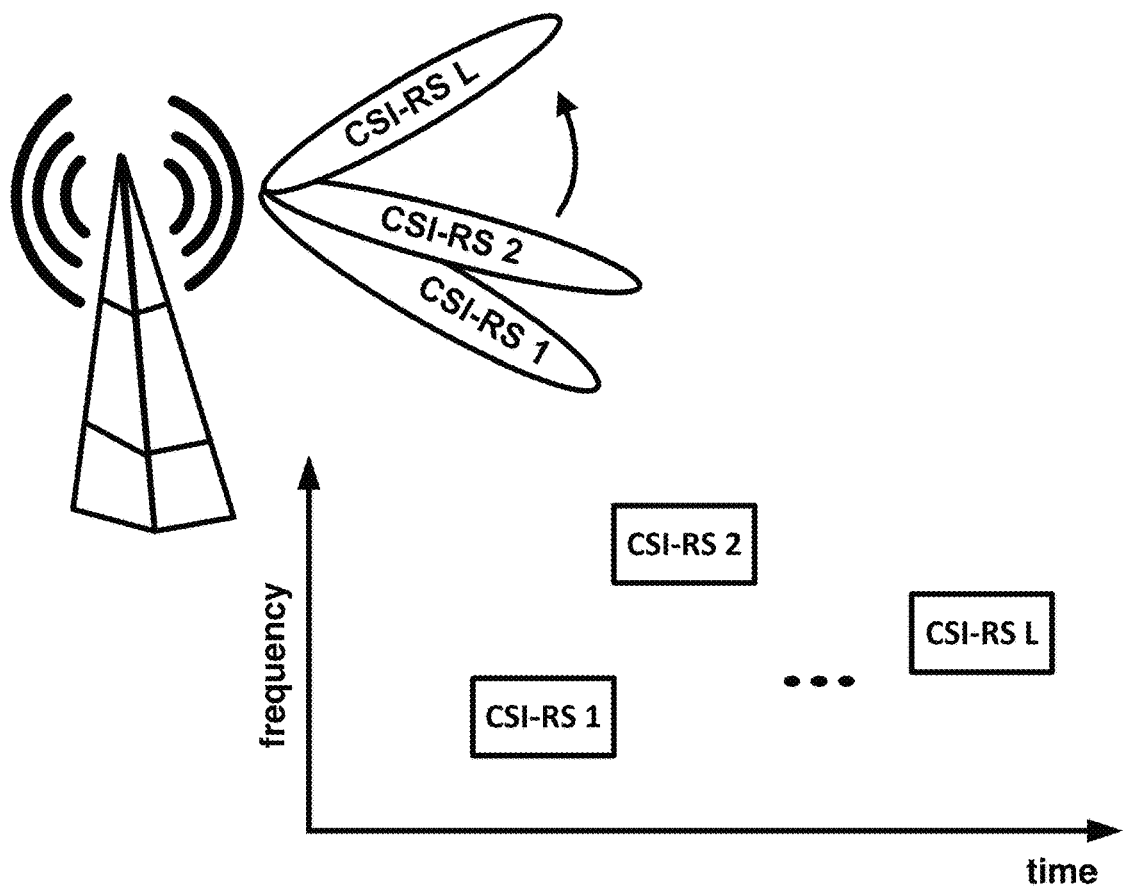
FIG. 13B shows example time and frequency structure of CSI-RSs and their association with beams in accordance with several of various embodiments of the present disclosure.

FIG. 13B shows example time and frequency structure of CSI-RSs and their association with beams in accordance with several of various embodiments of the present disclosure. A beam of the L beams shown in FIG. 13B may be associated with a corresponding CSI-RS resource. The base station may transmit the CSI-RSs using the configured CSI-RS resources and a UE may measure the CSI-RSs (e.g., received signal received power (RSRP) of the CSI-RSs) and report the CSI-RS measurements to the base station based on a reporting configuration. For example, the base station may determine one or more transmission configuration indication (TCI) states and may indicate the one or more TCI states to the UE (e.g., using RRC signaling, a MAC CE and/or a DCI). Based on the one or more TCI states indicated to the UE, the UE may determine a downlink receive beam and receive downlink transmissions using the receive beam. In case of a beam correspondence, the UE may determine a spatial domain filter of a transmit beam based on spatial domain filter of a corresponding receive beam. Otherwise, the UE may perform an uplink beam selection procedure to determine the spatial domain filter of the transmit beam. The UE may transmit one or more SRSs using the SRS resources configured for the UE and the base station may measure the SRSs and determine/select the transmit beam for the UE based the SRS measurements. The base station may indicate the selected beam to the UE. The CSI-RS resources shown in FIG. 13B may be for one UE. The base station may configure different CSI-RS resources associated with a given beam for different UEs by using frequency division multiplexing.

A base station and a wireless device may perform beam management procedures to establish beam pairs (e.g., transmit and receive beams) that jointly provide good connectivity. For example, in the downlink direction, the UE may perform measurements for a beam pair and estimate channel quality for a transmit beam by the base station (or a transmission reception point (TRP) more generally) and the receive beam by the UE. The UE may transmit a report indicating beam pair quality parameters. The report may comprise one or more parameters indicating one or more beams (e.g., a beam index, an identifier of reference signal associated with a beam, etc.), one or more measurement parameters (e.g., RSRP), a precoding matrix indicator (PMI), a channel quality indicator (CQI), and/or a rank indicator (RI).

Figure 14A:
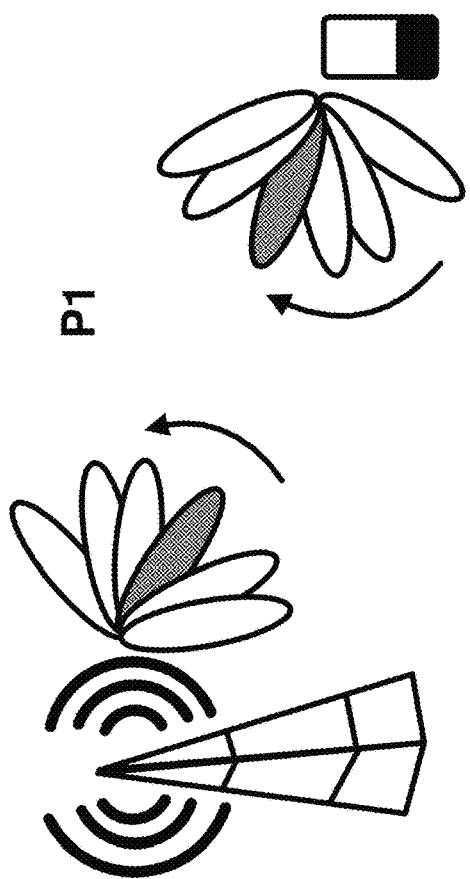
FIG. 14A, FIG. 14B and FIG. 14C show example beam management processes in accordance with several of various embodiments of the present disclosure.
Figure 14C:
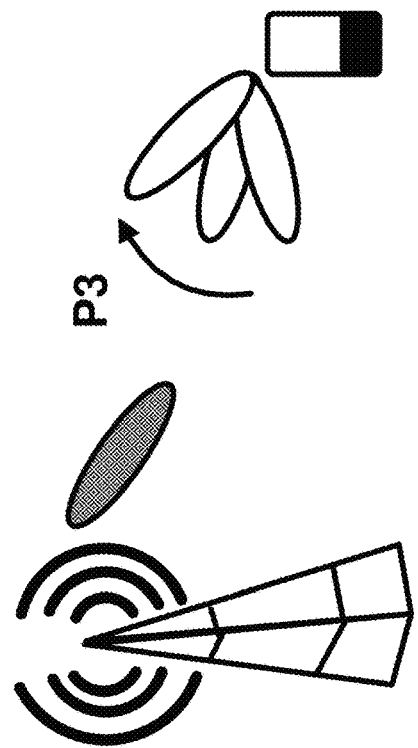
Figure 14B:
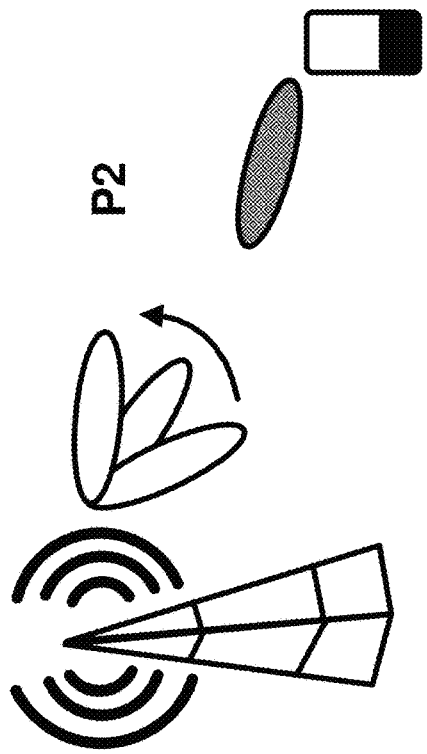

FIG. 14A, FIG. 14B and FIG. 14C show example beam management processes (referred to as P1, P2 and P3, respectively) in accordance with several of various embodiments of the present disclosure. The P1 process shown in FIG. 14A may enable, based on UE measurements, selection of a base station (or TRP more generally) transmit beam and/or a wireless device receive beam. The TRP may perform a beam sweeping procedure where the TRP may sequentially transmit reference signals (e.g., SSB and/or CSI-RS) on a set of beams and the UE may select a beam from the set of beams and may report the selected beam to the TRP. The P2 procedure as shown in FIG. 14B may be a beam refinement procedure. The selection of the TRP transmit beam and the UE receive beam may be regularly reevaluated due to movements and/or rotations of the UE or movement of other objects. In an example, the base station may perform the beam sweeping procedure over a smaller set of beams and the UE may select the best beam over the smaller set. In an example, the beam shape may be narrower compared to beam selected based on the P1 procedure. Using the P3 procedure as shown in FIG. 14C, the TRP may fix its transmit beam and the UE may refine its receive beam.

A wireless device may receive one or more messages from a base station. The one or more messages may comprise one or more RRC messages. The one or more messages may comprise configuration parameters of a plurality of cells for the wireless device. The plurality of cells may comprise a primary cell and one or more secondary cells. For example, the plurality of cells may be provided by a base station and the wireless device may communicate with the base station using the plurality of cells. For example, the plurality of cells may be provided by multiple base station (e.g., in case of dual and/or multi-connectivity). The wireless device may communicate with a first base station, of the multiple base stations, using one or more first cells of the plurality of cells. The wireless device may communicate with a second base station of the multiple base stations using one or more second cells of the plurality of cells.

The one or more messages may comprise configuration parameters used for processes in physical, MAC, RLC, PCDP, SDAP, and/or RRC layers of the wireless device. For example, the configuration parameters may include values of timers used in physical, MAC, RLC, PCDP, SDAP, and/or RRC layers. For example, the configuration parameters may include parameters for configurating different channels (e.g., physical layer channel, logical channels, RLC channels, etc.) and/or signals (e.g., CSI-RS, SRS, etc.).

Upon starting a timer, the timer may start running until the timer is stopped or until the timer expires. A timer may be restarted if it is running. A timer may be started if it is not running (e.g., after the timer is stopped or after the timer expires). A timer may be configured with or may be associated with a value (e.g., an initial value). The timer may be started or restarted with the value of the timer. The value of the timer may indicate a time duration that the timer may be running upon being started or restarted and until the timer expires. The duration of a timer may not be updated until the timer is stopped or expires (e.g., due to BWP switching). This specification may disclose a process that includes one or more timers. The one or more timers may be implemented in multiple ways. For example, a timer may be used by the wireless device and/or base station to determine a time window [t1, t2], wherein the timer is started at time t1 and expires at time t2 and the wireless device and/or the base station may be interested in and/or monitor the time window [t1, t2], for example to receive a specific signaling. Other examples of implementation of a timer may be provided.

Figure 15:
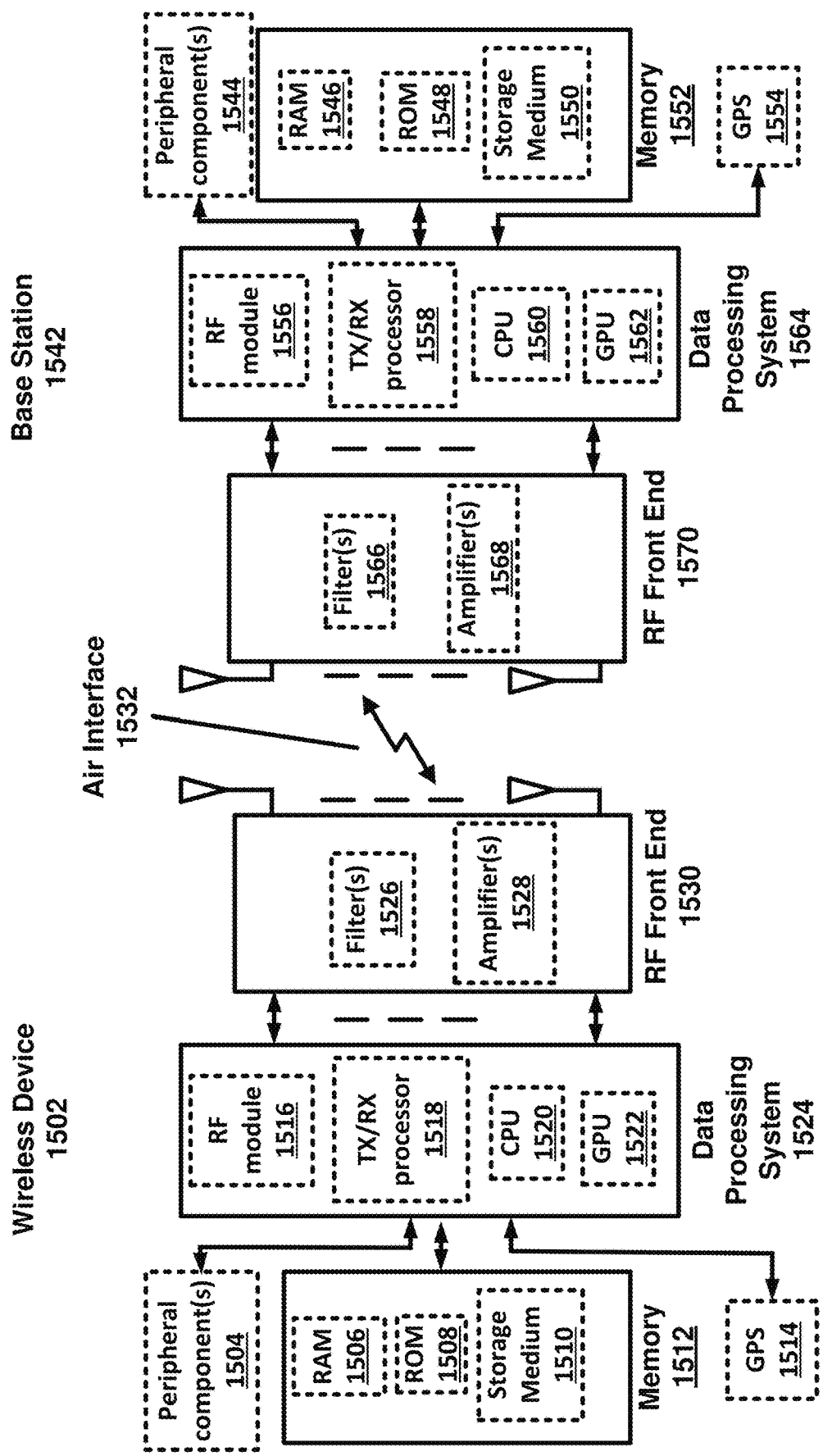
FIG. 15 shows example components of a wireless device and a base station that are in communication via an air interface in accordance with several of various embodiments of the present disclosure.

FIG. 15 shows example components of a wireless device and a base station that are in communication via an air interface in accordance with several of various embodiments of the present disclosure. The wireless device 1502 may communicate with the base station 1542 over the air interface 1532. The wireless device 1502 may include a plurality of antennas. The base station 1542 may include a plurality of antennas. The plurality of antennas at the wireless device 1502 and/or the base station 1542 enables different types of multiple antenna techniques such as beamforming, single-user and/or multi-user MIMO, etc.

The wireless device 1502 and the base station 1542 may have one or more of a plurality of modules/blocks, for example RF front end (e.g., RF front end 1530 at the wireless device 1502 and RF front end 1570 at the base station 1542), Data Processing System (e.g., Data Processing System 1524 at the wireless device 1502 and Data Processing System 1564 at the base station 1542), Memory (e.g., Memory 1512 at the wireless device 1502 and Memory 1542 at the base station 1542). Additionally, the wireless device 1502 and the base station 1542 may have other modules/blocks such as GPS (e.g., GPS 1514 at the wireless device 1502 and GPS 1554 at the base station 1542).

An RF front end module/block may include circuitry between antennas and a Data Processing System for proper conversion of signals between these two modules/blocks. An RF front end may include one or more filters (e.g., Filter(s) 1526 at RF front end 1530 or Filter(s) 1566 at the RF front end 1570), one or more amplifiers (e.g., Amplifier(s) 1528 at the RF front end 1530 and Amplifier(s) 1568 at the RF front end 1570). The Amplifier(s) may comprise power amplifier(s) for transmission and low-noise amplifier(s) (LNA(s)) for reception.

The Data Processing System 1524 and the Data Processing System 1564 may process the data to be transmitted or the received signals by implementing functions at different layers of the protocol stack such as PHY, MAC, RLC, etc. Example PHY layer functions that may be implemented by the Data Processing System 1524 and/or 1564 may include forward error correction, interleaving, rate matching, modulation, precoding, resource mapping, MIMO processing, etc. Similarly, one or more functions of the MAC layer, RLC layer and/or other layers may be implemented by the Data Processing System 1524 and/or the Data Processing System 1564. One or more processes described in the present disclosure may be implemented by the Data Processing System 1524 and/or the Data Processing System 1564. A Data Processing System may include an RF module (RF module 1516 at the Data Processing System 1524 and RF module 1556 at the Data Processing System 1564) and/or a TX/RX processor (e.g., TX/RX processor 1518 at the Data Processing System 1524 and TX/RX processor 1558 at the Data Processing System 1566) and/or a central processing unit (CPU) (e.g., CPU 1520 at the Data Processing System 1524 and CPU 1560 at the Data Processing System 1564) and/or a graphical processing unit (GPU) (e.g., GPU 1522 at the Data Processing System 1524 and GPU 1562 at the Data Processing System 1564).

The Memory 1512 may have interfaces with the Data Processing System 1524 and the Memory 1552 may have interfaces with Data Processing System 1564, respectively. The Memory 1512 or the Memory 1552 may include non-transitory computer readable mediums (e.g., Storage Medium 1510 at the Memory 1512 and Storage Medium 1550 at the Memory 1552) that may store software code or instructions that may be executed by the Data Processing System 1524 and Data Processing System 1564, respectively, to implement the processes described in the present disclosure. The Memory 1512 or the Memory 1552 may include random-access memory (RAM) (e.g., RAM 1506 at the Memory 1512 or RAM 1546 at the Memory 1552) or read-only memory (ROM) (e.g., ROM 1508 at the Memory 1512 or ROM 1548 at the Memory 1552) to store data and/or software codes.

The Data Processing System 1524 and/or the Data Processing System 1564 may be connected to other components such as a GPS module 1514 and a GPS module 1554, respectively, wherein the GPS module 1514 and a GPS module 1554 may enable delivery of location information of the wireless device 1502 to the Data Processing System 1524 and location information of the base station 1542 to the Data Processing System 1564. One or more other peripheral components (e.g., Peripheral Component(s) 1504 or Peripheral Component(s) 1544) may be configured and connected to the data Processing System 1524 and data Processing System 1564, respectively.

In example embodiments, a wireless device may be configured with parameters and/or configuration arrangements. For example, the configuration of the wireless device with parameters and/or configuration arrangements may be based on one or more control messages that may be used to configure the wireless device to implement processes and/or actions. The wireless device may be configured with the parameters and/or the configuration arrangements regardless of the wireless device being in operation or not in operation. For example, software, firmware, memory, hardware and/or a combination thereof and/or alike may be configured in a wireless device regardless of the wireless device being in operation or not operation. The configured parameters and/or settings may influence the actions and/or processes performed by the wireless device when in operation.

In example embodiments, a wireless device may receive one or more message comprising configuration parameters. For example, the one or more messages may comprise radio resource control (RRC) messages. A parameter of the configuration parameters may be in at least one of the one or more messages. The one or more messages may comprise information element (IEs). An information element may be a structural element that includes single or multiple fields. The fields in an IE may be individual contents of the IE. The terms configuration parameter, IE and field may be used equally in this disclosure. The IEs may be implemented using a nested structure, wherein an IE may include one or more other IEs and an IE of the one or more other IEs may include one or more additional IEs. With this structure, a parent IE contains all the offspring IEs as well. For example, a first IE containing a second IE, the second IE containing a third IE, and the third IE containing a fourth IE may imply that the first IE contains the third IE and the fourth IE.

In an example, in PUCCH carrier switching (e.g., for HARQ-ACK), PUCCH carrier switching for different cells operated may be considered for cells that are part of the active UL carrier aggregation (CA) configuration.

In an example, PUCCH carrier switching may be based dynamic indication in DCI.

In an example, PUCCH carrier switching may be based on one or more rules (e.g., semi-static rules).

In an example, PUCCH carrier switching may be based on an RRC configured PUCCH cell timing pattern of applicable/candidate PUCCH cells.

In an example, PUCCH carrier switching may be based on dynamic indication in a DCI scheduling a PUCCH and/or based on semi-static configuration. In an example, dynamic indication and/or semi-static configuration may be subject to separate wireless device capabilities (e.g., separate capability information elements may indicate whether the wireless device is capable of PUCCH carrier switching based on dynamic indication and whether the wireless device is capable of PUCCH carrier switching based on semi-static configuration). In an example, the semi-static PUCCH carrier switching configuration operation may be based on RRC configured PUCCH cell timing pattern of applicable/candidate PUCCH cells. In an example, PUCCH carrier switching may be across cells with different numerologies.

In an example, a maximum number of candidate PUCCH cells/carriers for PUCCH carrier switching may be configured or may be pre-configured. In an example, the maximum number of candidate PUCCH cells/carriers for PUCCH carrier switching may be based on wireless device capability. In an example, the wireless device may transmit one or more capability messages comprising one or more information elements indicating the wireless device capability in terms of the maximum number of candidate PUCCH cells/carriers for PUCCH carrier switching. The wireless device may receive configuration parameters of the candidate PUCCH cells/carriers for PUCCH carrier switching based on the wireless device capability.

In an example, for PUCCH carrier switching, the PUCCH resource configuration may be per UL BWP (e.g., per candidate cell and UL BWP of that specific candidate cell).

In an example for PUCCH carrier switching based on dynamic indication in DCI scheduling a PUCCH, the PDSCH to HARQ feedback timing/offset (e.g., k1 value) may be based on the numerology of the dynamically indicated target PUCCH cell.

In an example, a wireless device may not expect overlapping PUCCH slots with dynamic PUCCH cell indication on more than one carrier. The gNB may dynamically indicate a single PUCCH cell for a final PUCCH slot.

In an example, for semi-static PUCCH carrier switching, the time-domain pattern configuration may be based on the following properties: a single time-domain pattern may be configured per PUCCH cell group; the granularity of the time-domain pattern may be one slot of a reference cell. In an example, the time-domain pattern may be applied periodically. In an example, the period may be one frame (10 ms). In an example, the period may be RRC configured (e.g., the wireless device may receive one or more configuration parameters indicating the period). In an example, the timing pattern may define, for each slot of the reference cell, at least the applicable PUCCH cell.

In an example, for semi-static PUCCH carrier switching, the PDSCH to HARQ feedback timing/offset (e.g., k1 value) may be interpreted based on the numerology and PUCCH configuration of a reference cell to be able to apply the time-domain PUCCH carrier switching pattern.

In an example, for semi-static PUCCH carrier switching, the PUCCH resource indicator (PRI) of a DCI (e.g., the DCI used for dynamic indication of PUCCH carrier/cell) may be interpreted based on the PUCCH configuration of determined target PUCCH cell.

In an example, in addition to HARQ feedback of PDSCH dynamically scheduled by a DCI indicating a PUCCH carrier, the dynamic target carrier indication also applies to: HARQ feedback corresponding to the first SPS PDSCH activated by activation DCI based on the indication in the activation DCI; HARQ feedback corresponding to the SPS Release DCI based on the indication in the release DCI; triggered PUCCH for Type 3 codebook (CB) and one-shot triggering for HARQ feedback retransmission based on the indication in the triggering DCI.

In an example, for semi-static PUCCH carrier switching, the time-domain pattern periodicity may be RRC configured, using candidate values of applicable periodicities from dl-UL-TransmissionPeriodicity and dl-UL-TransmissionPeriodicity-v1530 (e.g., {ms0p5, ms0p625, ms1, ms1p25, ms2, ms2p5, ms3, ms4, ms5, ms10}).

In an example, for PUCCH carrier switching, the PUCCH configuration (e.g., pucch-Config/PUCCH-ConfigurationList) may be per UL BWP (e.g., per candidate cell and UL BWP of that specific candidate cell).

In an example, semi-static PUCCH carrier switching may be applicable to UCI types including HARQ feedback, scheduling request (SR) and channel state information (CSI).

In an example, an IE PUCCH-Config may be used to configure UE specific PUCCH parameters (per BWP).

In an example, a field dl-DataToUL-ACK, dl-DataToUL-ACK-DCI-1-2 may indicate list of timing for given PDSCH to the DL ACK. The field dl-DataToUL-ACK may apply to DCI format 1_1 and the field dl-DataToUL-ACK-DCI-1-2 may apply to DCI format 1_2. If dl-DataToUL-ACK-r16 is signaled, UE may ignore the dl-DataToUL-ACK (without suffix). The value −1 may correspond to non-numerical value for the case where the A/N feedback timing is not explicitly included at the time of scheduling PDSCH.

In an example, a field format1 may indicate parameters that are common for all PUCCH resources of format 1.

In an example, a field format2 may indicate parameters that are common for all PUCCH resources of format 2.

In an example, a field format3 may indicate parameters that are common for all PUCCH resources of format 3.

In an example, a field format4 may indicate parameters that are common for all PUCCH resources of format 4.

In an example, resourceSetToAddModList, resourceSetToReleaseList may indicate lists for adding and releasing PUCCH resource sets.

In an example, resourceToAddModList, resourceToAddModListExt, resourceToReleaseList may indicate lists for adding and releasing PUCCH resources applicable for the UL BWP and serving cell in which the PUCCH-Config is defined. The resources defined herein may be referred to from other parts of the configuration to determine which resource the UE may use for which report. If the network includes of resourceToAddModListExt, it may include the same number of entries, and listed in the same order, as in resourceToAddModList.

In an example, a field sps-PUCCH-AN-List may indicate a list of PUCCH resources for DL SPS HARQ ACK. The field maxPayloadSize may be absent for the first and the last SPS-PUCCH-AN in the list. If configured, this may override n1PUCCH-AN in SPS-config.

In an example, subslotLengthForPUCCH may indicate the sub-slot length for sub-slot based PUCCH feedback in number of symbols.

In an example, a field nrofSlots may indicate number of slots with the same PUCCH F1, F3 or F4.

In an example, an rb-SetIndex field may indicate the RB set where PUCCH resource is allocated.

In an example, a field pucch-ResourceId may indicate an identifier of the PUCCH resource.

In an example, a field resourceList may indicate PUCCH resources of format0 and format1 are only allowed in the first PUCCH resource set, i.e., in a PUCCH-ResourceSet with pucch-ResourceSetId=0. This set may contain between 1 and 32 resources. PUCCH resources of format2, format3 and format4 may be only allowed in a PUCCH-ResourceSet with pucch-ResourceSetId>0. If present, these sets contain between 1 and 8 resources each. The UE may choose a PUCCH-Resource from this list. Note that this list contains only a list of resource IDs. The actual resources may be configured in PUCCH-Config.

In an example, an IE PUCCH-ConfigCommon may be used to configure the cell specific PUCCH parameters.

In an example, a MAC entity may be configured with one or more SCells. The network may activate and deactivate the configured SCells. In an example, upon configuration of an SCell, the SCell may be deactivated unless the parameter sCellState is set to activated for the SCell by upper layers.

In an example, the configured SCell(s) may be activated and deactivated based on receiving the SCell Activation/Deactivation MAC CE. In an example, the configured SCell(s) may be activated and deactivated based on configuring sCellDeactivationTimer timer per configured SCell (except, for example, an SCell configured with PUCCH), wherein the associated SCell may deactivated upon expiry of the timer. In an example, the configured SCell(s) may be activated and deactivated based on configuring sCellState per configured SCell: if configured, the associated SCell may be activated upon SCell configuration.

In an example, an SCell may be configured with sCellState set to activated upon SCell configuration, or an SCell Activation/Deactivation MAC CE may be received activating the SCell. The SCell may have been deactivated prior to receiving this SCell Activation/Deactivation MAC CE; or the SCell may be configured with sCellState set to activated upon SCell configuration.

In an example, if firstActiveDownlinkBWP-Id is not set to dormant BWP: the wireless device may activate the SCell according to a timing for MAC CE activation and according to the timing direct SCell activation; i.e. apply normal SCell operation including: SRS transmissions on the SCell; CSI reporting for the SCell; PDCCH monitoring on the SCell; PDCCH monitoring for the SCell; PUCCH transmissions on the SCell, if configured.

In an example, if firstActiveDownlinkBWP-Id is set to dormant BWP, the wireless device may stop the bwp-InactivityTimer of this Serving Cell, if running.

The wireless device may activate the DL BWP and UL BWP indicated by firstActiveDownlinkBWP-Id and firstActiveUplinkBWP-Id respectively.

In an example, an SCell may be configured with sCellState set to activated upon SCell configuration, or an SCell Activation/Deactivation MAC CE may be received activating the SCell. The wireless device may start or restart the sCellDeactivationTimer associated with the SCell according to a timing for MAC CE activation and according to a timing defined for direct SCell activation.

In an example, an SCell may be configured with sCellState set to activated upon SCell configuration, or an SCell Activation/Deactivation MAC CE may be received activating the SCell. if the active DL BWP is not the dormant BWP: the wireless device may (re-)initialize any suspended configured uplink grants of configured grant Type 1 associated with this SCell according to the stored configuration, if any, and to start in the symbol according to one or more rules. The wireless device may trigger PHR.

In an example, an SCell Activation/Deactivation MAC CE is received deactivating the SCell; or the sCellDeactivationTimer associated with the activated SCell may expire. The wireless device may deactivate the SCell according to a timing; stop the sCellDeactivationTimer associated with the SCell; stop the bwp-InactivityTimer associated with the SCell; deactivate any active BWP associated with the SCell; clear any configured downlink assignment and any configured uplink grant Type 2 associated with the SCell respectively; clear any PUSCH resource for semi-persistent CSI reporting associated with the SCell; suspend any configured uplink grant Type 1 associated with the SCell; flush HARQ buffers associated with the SCell; and cancel, if any, triggered consistent LBT failure for the SCell.

In an example, PDCCH on the activated SCell may indicate an uplink grant or downlink assignment; or PDCCH on the Serving Cell scheduling the activated SCell may indicate an uplink grant or a downlink assignment for the activated SCell; or a MAC PDU may be transmitted in a configured uplink grant and LBT failure indication may not be received from lower layers; or a MAC PDU may be received in a configured downlink assignment. The wireless device may restart the sCellDeactivationTimer associated with the SCell.

In an example, if the SCell is deactivated: the wireless device may not transmit SRS on the SCell; not report CSI for the SCell; not transmit on UL-SCH on the SCell; not transmit on RACH on the SCell; not monitor the PDCCH on the SCell; not monitor the PDCCH for the SCell; and not transmit PUCCH on the SCell.

In an example, HARQ feedback for the MAC PDU containing SCell Activation/Deactivation MAC CE may not be impacted by PCell, PSCell and PUCCH SCell interruptions due to SCell activation/deactivation.

In an example, when SCell is deactivated, the ongoing Random Access procedure on the SCell, if any, may be aborted.

Figure 16:
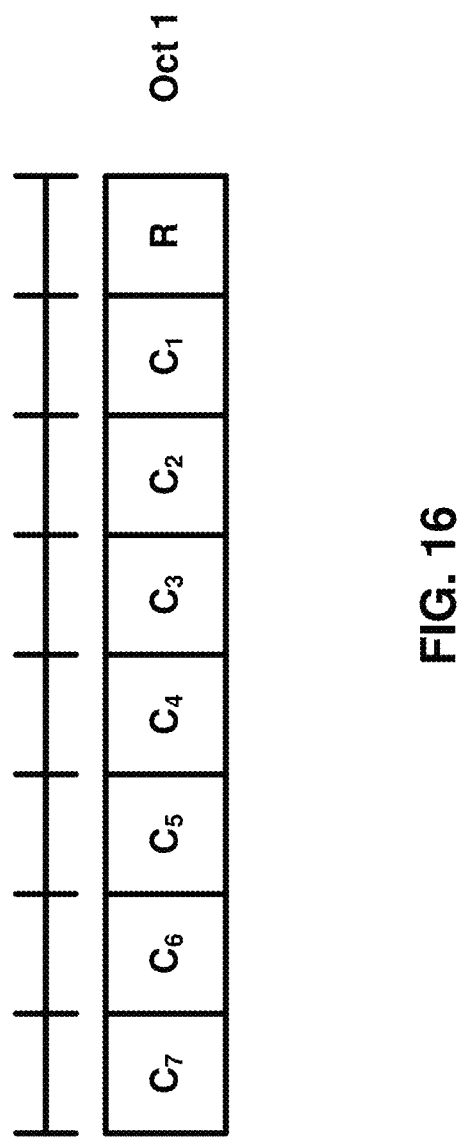
FIG. 16 shows an example medium access control (MAC) control element (CE) in accordance with several of various embodiments of the present disclosure.

In an example, a SCell Activation/Deactivation MAC CE of one octet may be identified by a MAC subheader with associated LCID. It may have a fixed size and may consist of a single octet containing seven C-fields and one R-field. The SCell Activation/Deactivation MAC CE with one octet is defined as shown in FIG. 16.

In an example, the SCell Activation/Deactivation MAC CE of four octets may be identified by a MAC subheader with associated LCID. It may have a fixed size and may consist of four octets containing 31 C-fields and one R-field. The SCell Activation/Deactivation MAC CE of four octets is defined as shown in FIG. 17.

In an example, if there is an SCell configured for the MAC entity with SCellIndex i, the $C_i$ field may indicate the activation/deactivation status of the SCell with SCellIndex i, otherwise the MAC entity may ignore the $C_i$ field. The $C_i$ field may be set to 1 to indicate that the SCell with SCellIndex i may be activated. The $C_i$ field may be set to 0 to indicate that the SCell with SCellIndex i may be deactivated. The R field may be Reserved bit, set to 0.

In an example, to enable reasonable UE battery consumption when carrier aggregation (CA) may be configured, an activation/deactivation mechanism of Cells may be supported. When an SCell is deactivated, the UE may not need to receive the corresponding PDCCH or PDSCH, may not transmit in the corresponding uplink, nor it may be required to perform CQI measurements. Conversely, when an SCell is active, the UE may receive PDSCH and PDCCH (if the UE is configured to monitor PDCCH from this SCell) and may be expected to be able to perform CQI measurements.

In an example, the network may ensure that while a PUCCH SCell (e.g., a Secondary Cell configured with PUCCH) is deactivated, SCells of secondary PUCCH group (a group of SCells whose PUCCH signaling is associated with the PUCCH on the PUCCH SCell) may not be activated. In an example, the network may ensure that SCells mapped to PUCCH SCell are deactivated before the PUCCH SCell is changed or removed. Example embodiments may enhance activation/deactivation requirements of candidate PUCCH cells and/or other cells in a cell group (e.g., PUCCH group).

In an example, when reconfiguring the set of serving cells: SCells added to the set may initially be activated or deactivated. In an example, SCells which remain in the set (either unchanged or reconfigured) may not change their activation status (activated or deactivated).

In an example, at handover or connection resume from RRC_INACTIVE: the SCells may be activated or deactivated.

In an example, to enable reasonable UE battery consumption when bandwidth adaptation (BA) is configured, only one UL BWP for each uplink carrier and one DL BWP or only one DL/UL BWP pair may be active at a time in an active serving cell, all other BWPs that the UE is configured with being deactivated. On deactivated BWPs, the UE may not monitor the PDCCH, may not transmit on PUCCH, PRACH and UL-SCH.

In an example, to enable fast SCell activation when CA is configured, one dormant BWP may be configured for an SCell. If the active BWP of the activated SCell is a dormant BWP, the UE may stop monitoring PDCCH and transmitting SRS/PUSCH/PUCCH on the SCell but may continue performing CSI measurements, AGC and beam management, if configured. A DCI may be used to control entering/leaving the dormant BWP for one or more SCell(s) or one or more SCell group(s).

In an example, the dormant BWP may be one of the UE's dedicated BWPs configured by network via dedicated RRC signaling. In an example, the SpCell and a PUCCH SCell may not be configured with a dormant BWP.

In an example, a downlink scheduling DCI (e.g., DCI format 1_0, 1_1 and 1_2) may be used for the scheduling of PDSCH. The downlink scheduling DCI may comprise a PDSCH-to-HARQ_feedback timing indicator field. A value of the PDSCH-to-HARQ_feedback timing indicator field may indicate a timing between the PDSCH used for reception of a downlink TB and a corresponding HARQ_feedback.

A wireless device may be configured with PUCCH carrier switching for transmission of uplink control information. The wireless device may receive configuration parameter(s) indicating a semi-static time/timing pattern. The time/timing pattern may indicate timings that a candidate PUCCH cell, in a plurality of candidate PUCCH cells of a PUCCH group, is configured as a PUCCH cell. A cell in a group of candidate PUCCH cells may be dynamically activated or deactivated or may be deactivated based on expiry of a corresponding deactivation timer. Existing PUCCH carrier switching mechanisms may result in efficient uplink control information transmission and degraded wireless device and wireless network performance when one or more cells of the candidate PUCCH cells are activated or deactivated. There is a need to enhance the existing mechanisms in case of activation and/or deactivation of candidate PUCCH cells. Example embodiments enhance the existing mechanisms in case of activation and/or deactivation of candidate PUCCH cells.

In an example embodiment, a wireless device may receive one or more messages (e.g., one or more RRC messages) comprising configuration parameters. The configuration parameters may comprise first configuration parameters of a plurality of cells. The plurality of cells may be associated with (e.g., provided by) one or more base stations. In an example, a first plurality of cells (e.g., grouped into a first cell group, e.g., a master cell group (MCG)) of the plurality of cells may be provided by a first base station (e.g., a master base station) and a second plurality of cells (e.g., grouped into a second cell group, e.g., a secondary cell group (SCG)) of the plurality of cells may be provided by a second base station (e.g., a secondary base station).

In an example, the plurality of cells may be grouped into one or more PUCCH groups. Each PUCCH group, in the one or more PUCCH groups, may comprise one or more cells configured with PUCCH resources. Uplink control information (e.g., HARQ_feedback, SR, CSI reports, etc.) associated with a PUCCH group (e.g., associated with the cells of the PUCCH group, e.g., HARQ feedbacks associated with downlink TBs received via cells of the PUCCH group, etc.) may be transmitted via PUCCH resources configured for the one or more cells.

In an example, the one or more PUCCH groups may comprise a first PUCCH group and a second PUCCH group. The first PUCCH group may comprise one or more first cells configured with PUCCH and the second PUCCH group may comprise one or more second cells configured PUCCH. The one or more first cells, in the first PUCCH group, configured with PUCCH may comprise a SpCell (e.g., primary cell (PCell) or a primary secondary cell (PSCell)). The first PUCCH group may be referred to as a primary PUCCH group. The second PUCCH group may be referred to as a secondary PUCCH group. A first secondary cell in one or more second cells of the second PUCCH group (e.g., secondary PUCCH group), configured with PUCCH, may be referred to a PUCCH SCell. In an example, the SpCell (e.g., PCell or PSCell) of the primary PUCCH group may be an anchor cell for transmission of uplink control associated with the primary PUCCH group. In an example, the PUCCH SCell of the secondary PUCCH group may be an anchor cell for transmission of uplink control associated with the secondary PUCCH group.

Figure 18:
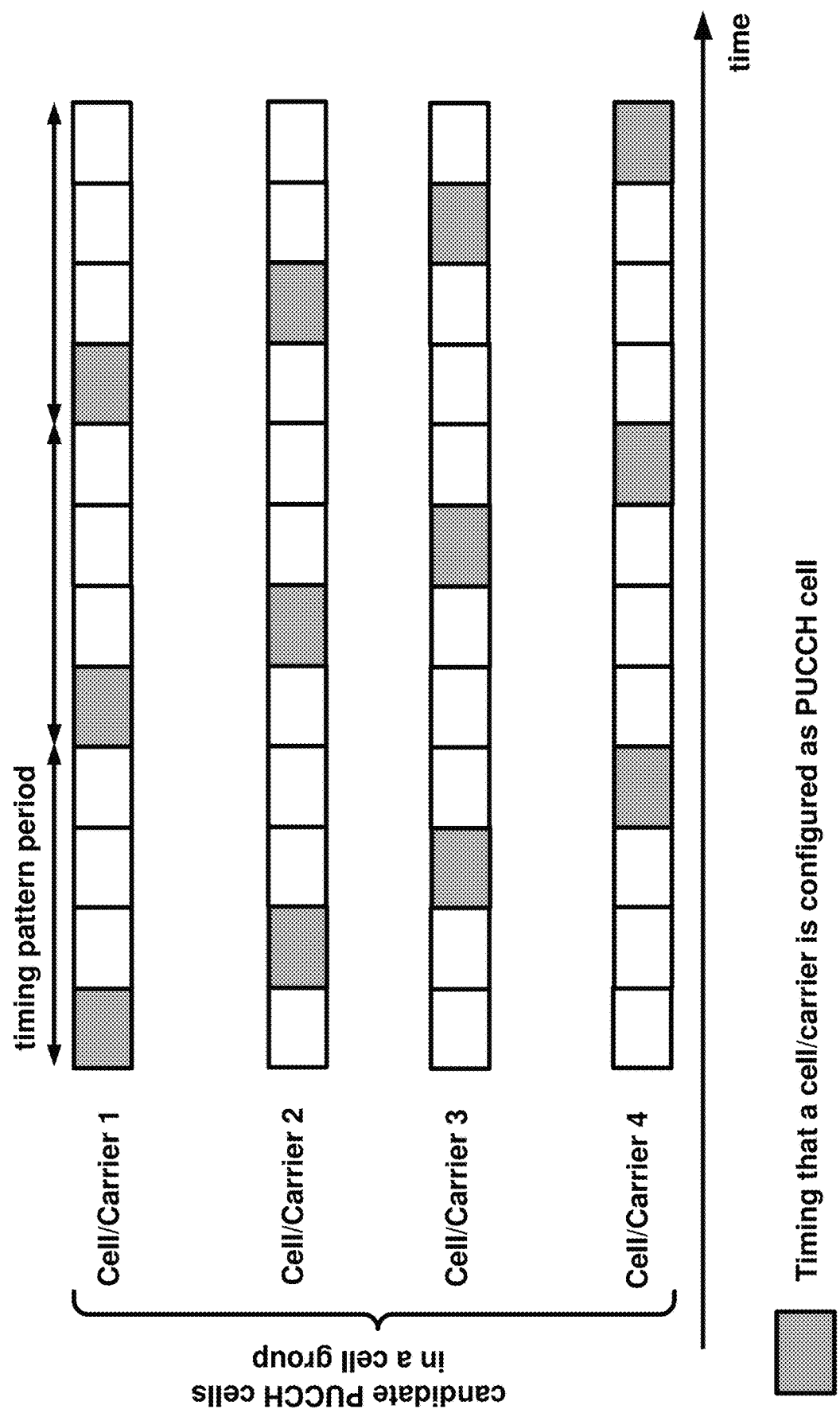
FIG. 18 shows an example time/timing pattern for physical uplink control channel (PUCCH) carrier switching in accordance with several of various embodiments of the present disclosure.

In an example as shown in FIG. 18, a PUCCH group may comprise a plurality of cells/carriers configured with PUCCH. The plurality of cells/carriers configured with PUCCH may be referred to as candidate PUCCH cells/carriers. The wireless device may determine timings that a candidate PUCCH cell/carrier, in the candidate PUCCH cells/carriers, is configured as PUCCH cell based on a time/timing pattern. The wireless device may receive one or more configuration parameters (e.g., RRC parameters) indicating the time/timing pattern. The time/timing pattern may indicate/define timings that a candidate PUCCH cell, in the candidate PUCCH cells, is configured as PUCCH cell. In an example, a wireless device capability parameter may indicate a transitioning time (e.g., a minimum required transitioning time) from a first candidate PUCCH cell to a second candidate PUCCH cell. In an example, the timing/time pattern configured for the wireless device may be based on the wireless device capability. The wireless device may transmit uplink control information (e.g., HARQ_feedback, SR, CSI report, etc.) based on radio resources of a PUCCH cell. The timing pattern may be periodically repeated based on a periodicity. In an example, the periodicity may be in a first number of slots. In an example, the periodicity may be based on a first number of slots associated with a numerology of the reference cell/carrier. In an example, the periodicity may be pre-configured and/or fixed (e.g., one frame/10 ms) or may be configurable (e.g., based on receiving an RRC configuration parameter indicating the periodicity).

Figure 19:
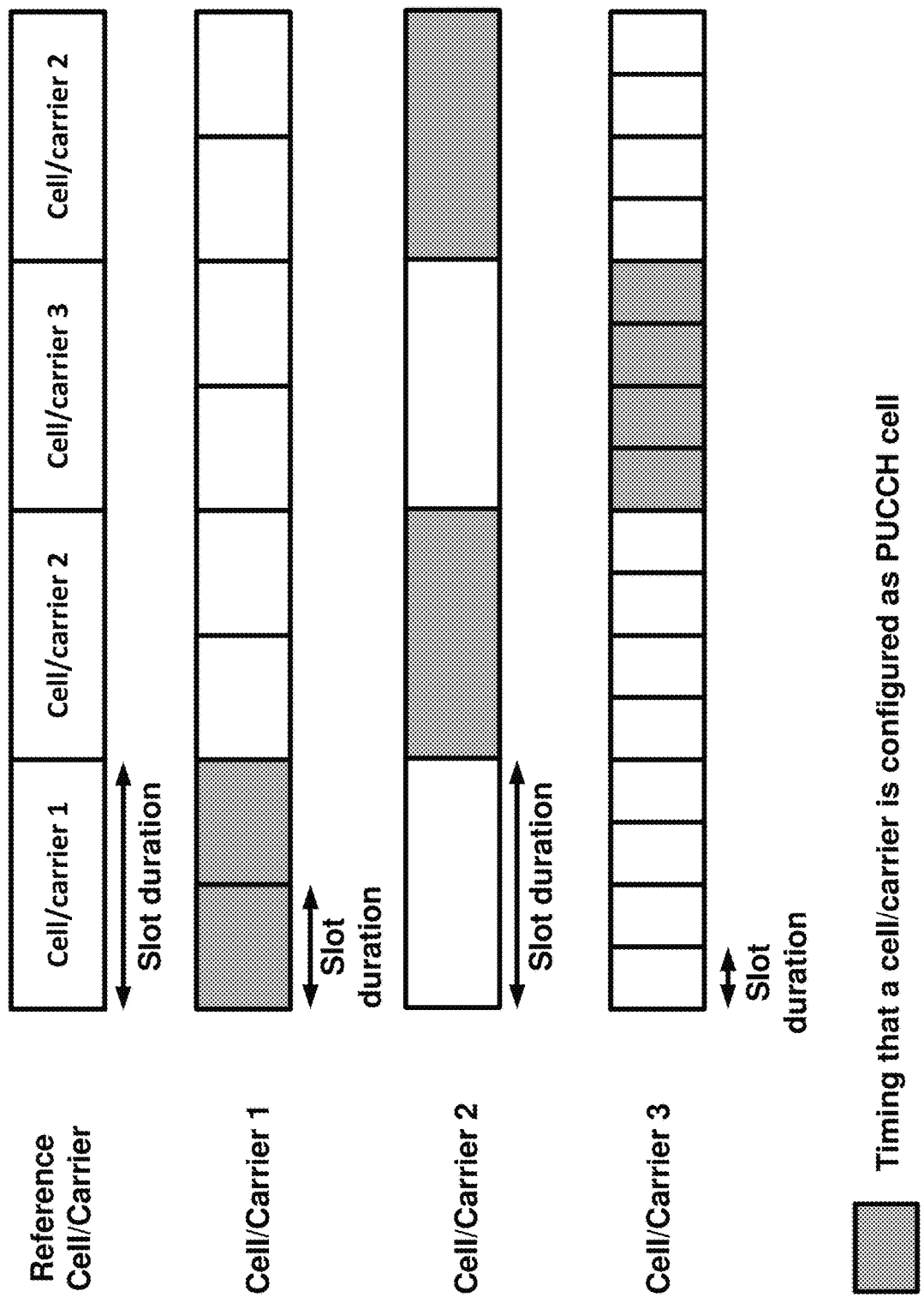
FIG. 19 shows an example time/timing pattern for physical uplink control channel (PUCCH) carrier switching in accordance with several of various embodiments of the present disclosure.

In an example, a cell in the PUCCH group may be referred to the reference cell. For example, the reference cell may be a SpCell (e.g., PCell or SPCell) for a primary PUCCH group. In an example, the reference cell may be a PUCCH SCell for a secondary PUCCH group. In an example as shown in FIG. 19, the time/timing pattern may indicate that a corresponding candidate PUCCH cell, in the candidate PUCCH cells of a PUCCH group, is a configured PUCCH cell for each slot of the reference cell. The time/timing pattern of a PUCCH group may be based on a numerology (e.g., a slot duration) of the reference cell. Each slot of the reference cell/carrier may be associated with a candidate PUCCH cell (e.g., a candidate PUCCH cell in a PUCCH group) and the wireless may determine the number of slots that a candidate PUCCH cell is configured as a PUCCH cell based on the slot duration of the reference cell/carrier and the slot duration of the candidate PUCCH cell/carrier. In the example shown in FIG. 19, a slot duration of a reference cell/carrier may be two times the slot duration of cell/carrier 1 (e.g., based on a numerology of the reference cell/carrier and a numerology of the cell/carrier 1), may be the same as the slot duration of the cell/carrier 2 (e.g., based on the numerology of the reference cell/carrier and a numerology of the cell/carrier 2), and may be four times the slot duration of cell/carrier 3 (e.g., based on the numerology of the reference cell/carrier and a numerology of the cell/carrier 3). In the example shown in FIG. 19, cell/carrier 1 is the configured PUCCH cell for two slots of cell/carrier 1, cell/carrier 2 is the configured PUCCH cell for one slot of cell/carrier 2, cell/carrier 3 is the configured PUCCH cell for four slots of cell/carrier 3, and so on.

Figure 20:
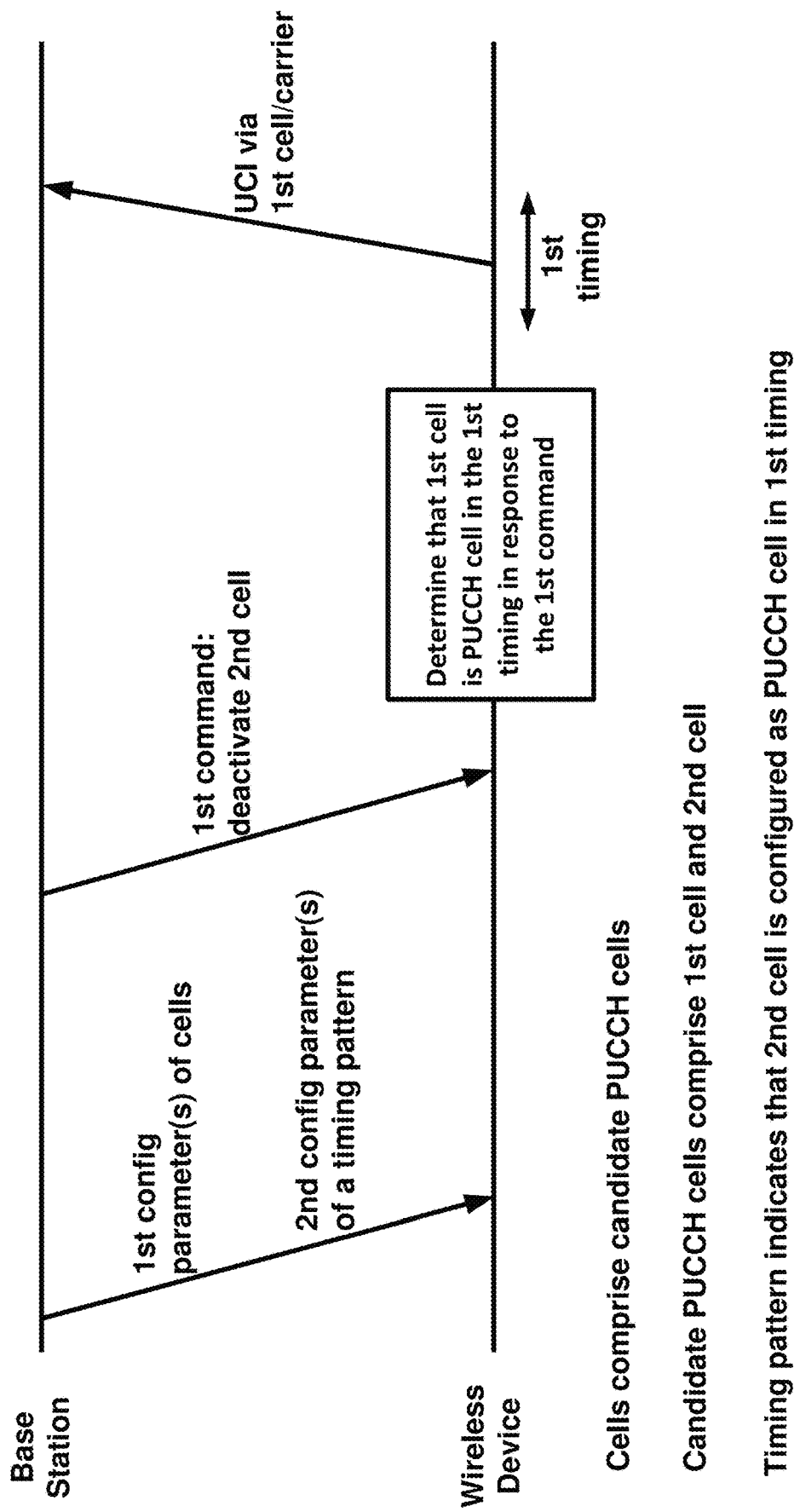
FIG. 20 shows an example process in accordance with several of various embodiments of the present disclosure.

In an example as shown in FIG. 20, a wireless device may receive one or more messages (e.g., one or more RRC messages) comprising one or more first configuration parameters and one or more second configuration parameters. The one or more first configuration parameters may be of/associated with a plurality of cells. In an example, the plurality of cells may be grouped into a cell group (e.g., a PUCCH group, e.g., a primary PUCCH group or a secondary PUCCH group). The plurality of cells may comprise a first plurality of cells that are candidate PUCCH cells. The candidate PUCCH cells may comprise a first cell and a second cell. The second cell may be a secondary cell.

In an example, the one or more first configuration parameters may indicate that the first plurality of cells, in the plurality of cells, are candidate PUCCH cells. In an example, the one or more first configuration parameters may comprise PUCCH configuration parameters indicating PUCCH resources for the first plurality of cell. The configuration of PUCCH resources for the first plurality of cells may indicate that the first plurality of cells are candidate PUCCH cells. The one or more second configuration parameters may indicate a time/timing pattern. The time/timing pattern may indicate corresponding timings that a candidate PUCCH cell, in the candidate PUCCH cells, is configured as a PUCCH cell. Example time/timing patterns and timings that candidate PUCCH cells, in a PUCCH group, are configured as PUCCH cell are shown in FIG. 18 and FIG. 19. The time/timing pattern may indicate that the second cell is configured as a PUCCH cell in a first timing. The wireless device may receive a command (e.g., a cell activation/deactivation MAC CE) indicating deactivation of the second cell. The wireless device may receive the command before the first timing. In an example, the first timing may be after deactivation of the second cell and/or after reception of the command indicating deactivation of the second cell. In response to receiving the command and/or in response to determining to deactivate the second cell and/or in response to deactivation of the second cell, the wireless device may determine that the first cell/carrier is the PUCCH cell/carrier during the first timing. In response to receiving the command and/or in response to determining to deactivate the second cell and/or in response to deactivation of the second cell, the wireless device may determine that the first cell/carrier, and not the second cell/carrier configured by the timing pattern, is the PUCCH cell/carrier in the first timing.

Figure 21:
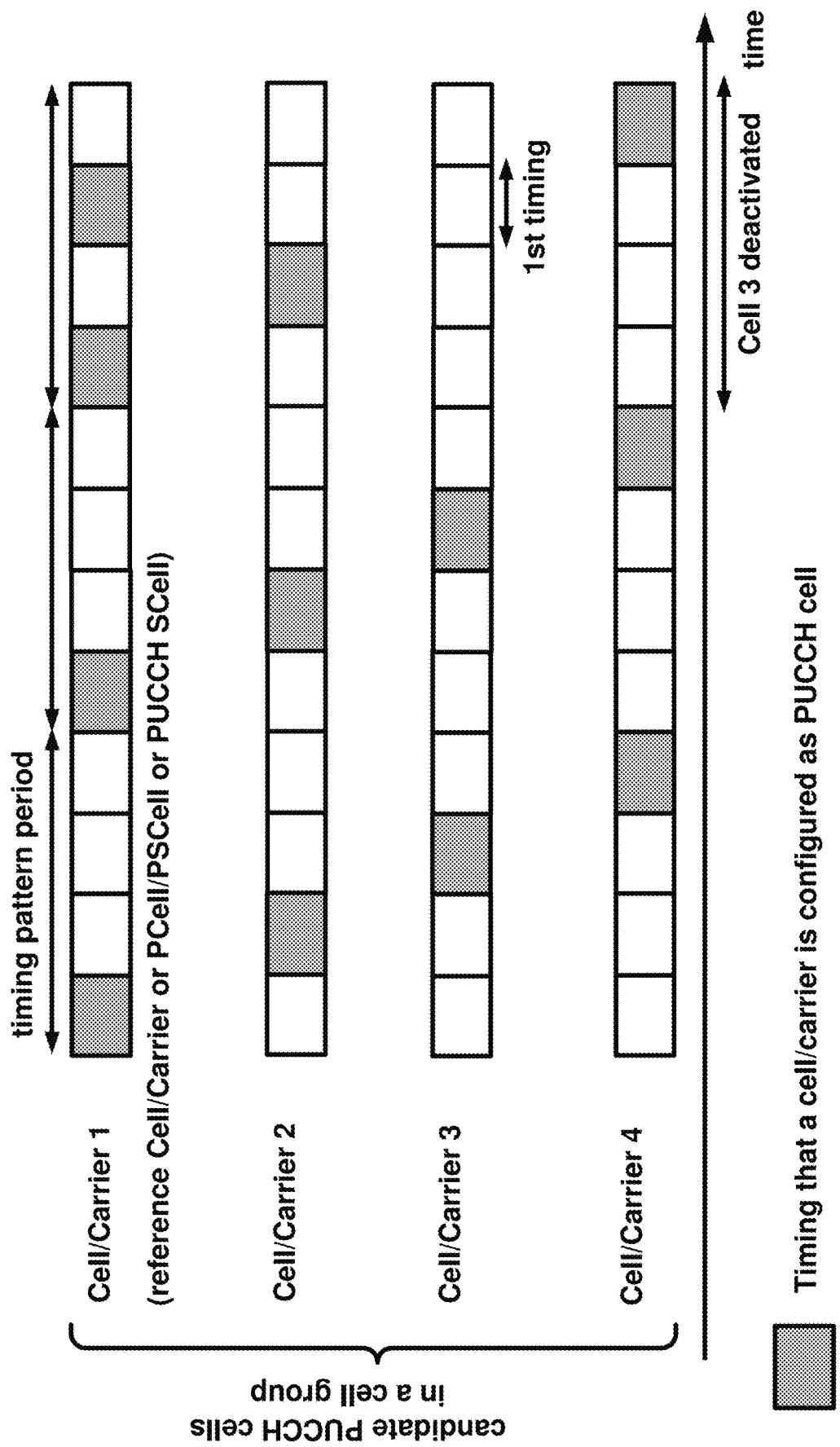
FIG. 21 shows an example process in accordance with several of various embodiments of the present disclosure.

In an example embodiment as shown in FIG. 21, the PUCCH group may be a primary PUCCH group and may comprise a SpCell (e.g., a PCell or a PSCell). The first cell may be the SpCell (e.g., the PCell or the PSCell). The wireless device may determine the SpCell (e.g., the PCell or the PSCell) as the PUCCH cell during the first timing.

In an example embodiment as shown in FIG. 21, the PUCCH group may be a secondary PUCCH group and may comprise a PUCCH SCell. The first cell may be the PUCCH SCell. The wireless device may determine the PUCCH SCell as the PUCCH cell during the first timing.

In an example embodiment as shown in FIG. 21, the first cell/carrier may be the reference cell/carrier. The PUCCH group may comprise the reference cell/carrier. The reference cell/carrier may be used, for example, to determine slot durations in the timing pattern based on numerology of the reference cell/carrier. The wireless device may determine the reference cell/carrier as the PUCCH cell during the first timing.

Figure 22:
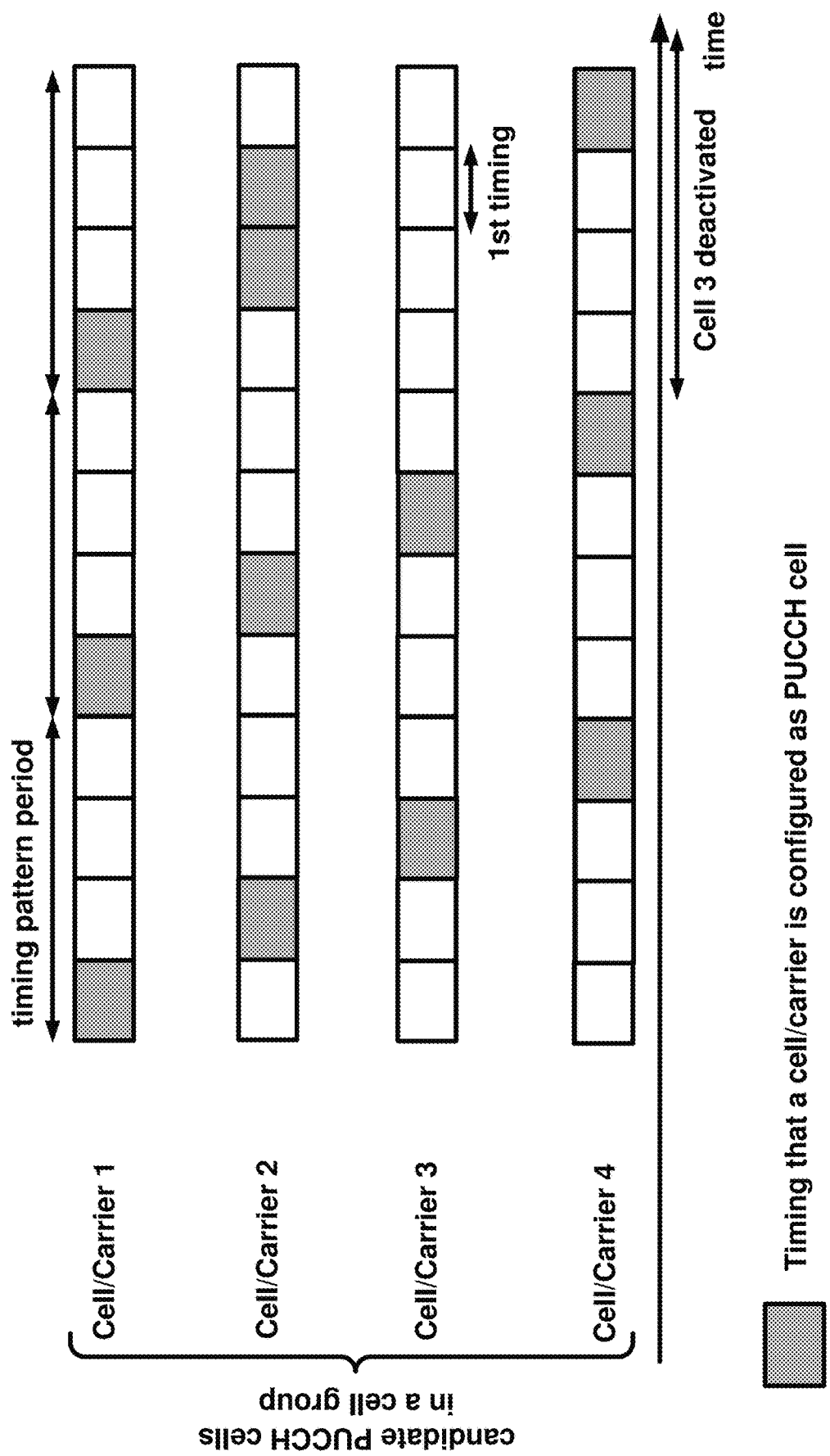
FIG. 22 shows an example process in accordance with several of various embodiments of the present disclosure.
Figure 23:
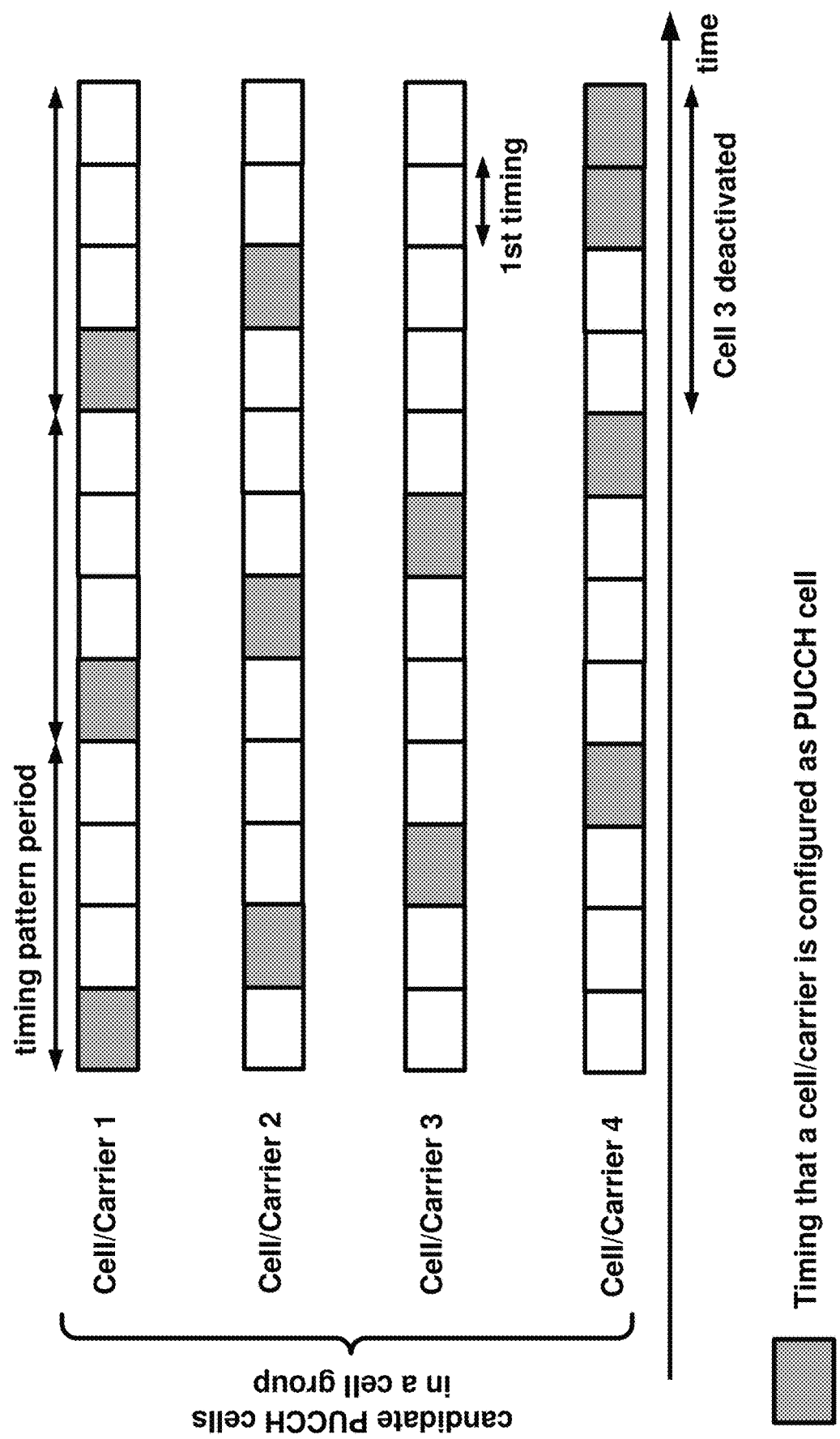
FIG. 23 shows an example process in accordance with several of various embodiments of the present disclosure.

In example embodiments as shown in FIG. 22 and FIG. 23, the first cell may an adjacent cell to the second cell in the time/timing pattern. For example, as shown in FIG. 22, the first cell may be a cell prior to the second cell in the timing/time pattern. For example, the first cell may be a latest activated cell prior to the second cell in the timing/time pattern. For example, as shown in FIG. 23, the first cell may be a cell after the second cell in the timing/time pattern. For example, the first cell may be an earliest activated cell after the second cell in the timing/time pattern.

In an example, the wireless device may determine that the second cell is configured as a PUCCH cell during a second timing. The second cell may be in an activated state during the second time (e.g., in response to a command (e.g., cell activation/deactivation MAC CE) indicating activation of the second cell). The wireless device may determine (e.g., based on the second cell being activated in the second timing) that the second cell is a PUCCH cell during the second timing. The wireless device may transmit uplink control information via the second cell in the second timing.

The wireless device may transmit uplink control information (e.g., HARQ feedback and/or SR and/or CSI report, etc.) via PUCCH resources of the first cell during the first timing.

Figure 24:
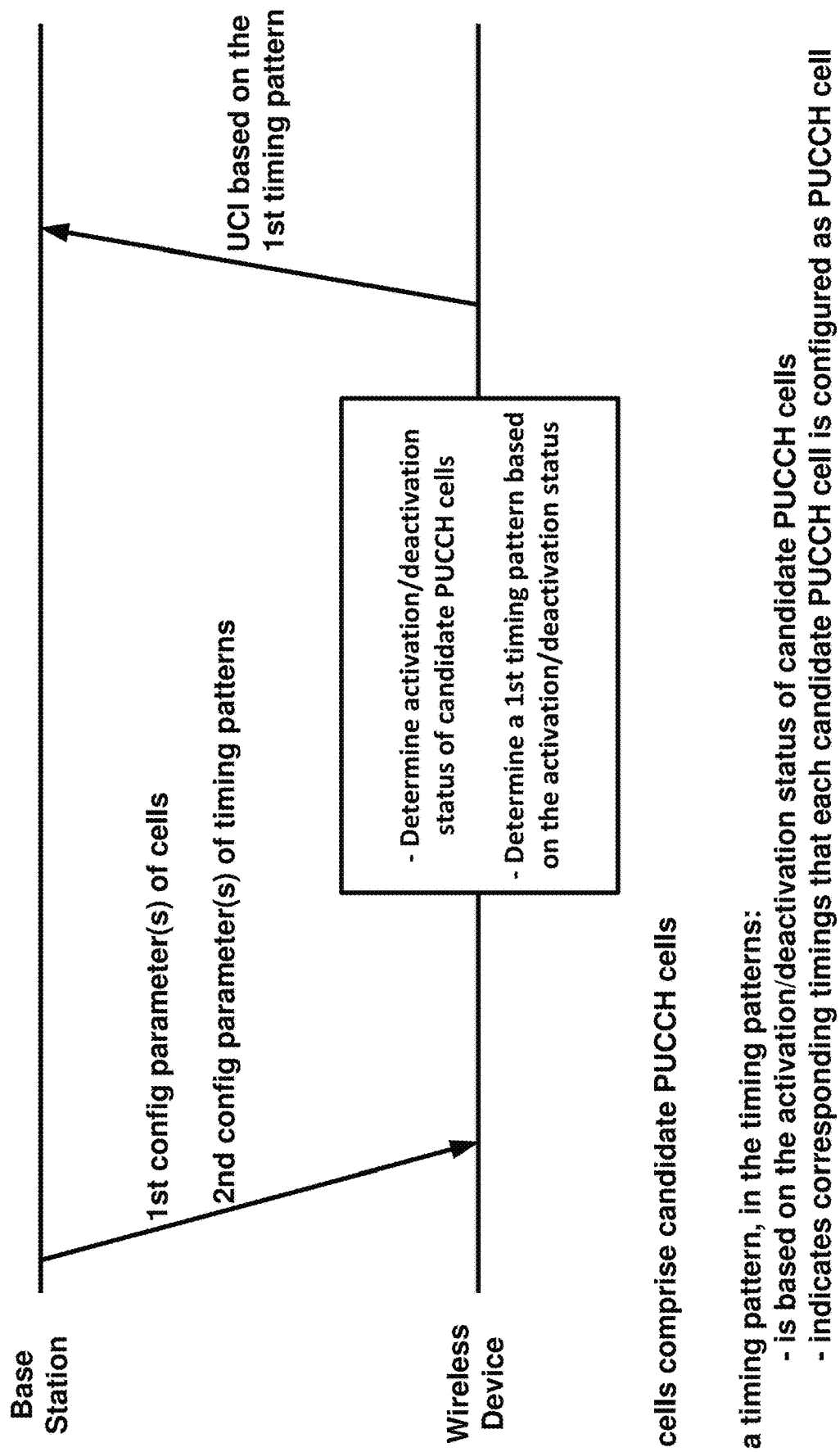
FIG. 24 shows an example process in accordance with several of various embodiments of the present disclosure.

In an example embodiment as shown in FIG. 24, a wireless device may receive one or more messages (e.g., one or more RRC messages) comprising one or more first configuration parameters and one or more second configuration parameters. The one or more first configuration parameters may be of/associated with a plurality of cells. In an example, the plurality of cells may be grouped into a cell group (e.g., a PUCCH group, e.g., a primary PUCCH group or a secondary PUCCH group). The plurality of cells may comprise a plurality of candidate PUCCH cells. In an example, one or more candidate PUCCH cells, in the plurality of candidate PUCCH cells, may be secondary cells.

In an example, the one or more first configuration parameters may comprise PUCCH configuration parameters indicating PUCCH resources for the plurality of candidate PUCCH cells. The configuration of PUCCH resources for the plurality of candidate PUCCH cells may indicate that the plurality of candidate PUCCH cells are candidate PUCCH cells for the PUCCH group. The one or more second configuration parameters may indicate a plurality of time/ timing patterns. A time/timing pattern, in the plurality of time/timing patterns, may be based on activation/deactivation status of the plurality of candidate PUCCH cells. In an example, the number of the plurality of time/timing patterns may be based on a number of combinations of activation/ deactivation status of the plurality of candidate PUCCH cells. The time/timing pattern may indicate corresponding timings that a candidate PUCCH cell, in the candidate PUCCH cells, is configured as a PUCCH cell. Example timing patterns and timings that candidate PUCCH cells, in a PUCCH group, are configured as PUCCH cell are shown in FIG. 18 and FIG. 19.

The wireless device may determine the activation and/or the deactivation status of the plurality of candidate PUCCH cells. In an example, a cell, in the candidate PUCCH cells, may be a SCell and may be deactivated in response to its corresponding deactivation timer being expired. In an example, a cell in the candidate PUCCH cells may be a SCell and may activated or deactivated based on/in response to a SCell Activation/Deactivation MAC CE. In an example, the wireless device may determine which one or more first candidate PUCCH cells, of the candidate PUCCH cells, are activated. The wireless device may determine which zero or more second candidate PUCCH cells, of the candidate PUCCH cells, are deactivated. The wireless device may determine the activation and/or deactivation status of the plurality of candidate PUCCH cells based on the one or more first candidate PUCCH cells and/or the zero or more second candidate PUCCH cells. The wireless device may determine a first time/timing pattern, in the plurality of time/timing patterns, based on the activation and/or the deactivation status of the plurality of candidate PUCCH cells.

The wireless device may transmit uplink control information based on the first timing pattern. For example, the first timing pattern may indicate which candidate PUCCH cell is the PUCCH cell in a timing wherein the uplink control information is scheduled to be transmitted and may transmit the uplink control information in the timing via the corresponding candidate PUCCH cell. The uplink control information may be one or more of HARQ feedback, SR, CSI report, etc.

In an example embodiment, the wireless device may receive configuration parameters of plurality of secondary cells. The plurality of secondary cells may comprise first plurality of candidate PUCCH cells. A first cell in the plurality of candidate PUCCH cells may be a reference cell/carrier and/or a PUCCH SCell. The wireless device may determine to deactivate the first cell. In an example, the wireless device may determine to deactivate the first cell based on receiving a command indicating deactivation of the first cell. In an example, the wireless device may determine to deactivate the first cell based on a deactivation timer associated with the first cell being expired. The wireless device may deactivate the first cell. In response to deactivation of the first cell, the wireless device may determine a second cell, in the plurality of candidate PUCCH cells, as he reference cell and/or as the PUCCH SCell.

Figure 25:
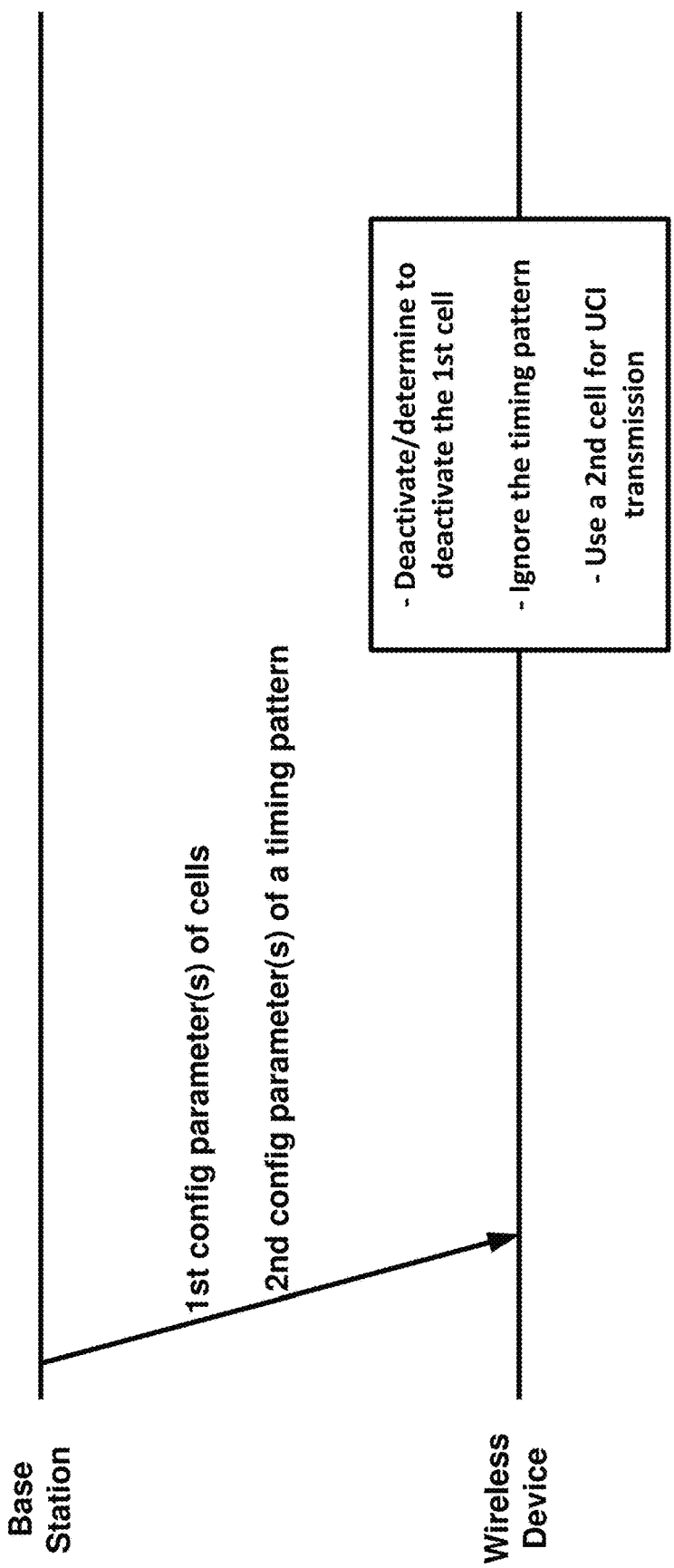
FIG. 25 shows an example process in accordance with several of various embodiments of the present disclosure.

In an example embodiment as shown in FIG. 25, a wireless device may receive one or more messages (e.g., one or more RRC messages) comprising one or more first configuration parameters and one or more second configuration parameters. The one or more first configuration parameters may be of/associated with a plurality of cells. In an example, the plurality of cells may be grouped into a cell group (e.g., a PUCCH group, e.g., a primary PUCCH group or a secondary PUCCH group). The plurality of cells may comprise a first plurality of cells that are candidate PUCCH cells. The candidate PUCCH cells may comprise a first cell.

In an example, the one or more first configuration parameters may indicate that the first plurality of cells, in the plurality of cells, are candidate PUCCH cells. In an example, the one or more first configuration parameters may comprise PUCCH configuration parameters indicating PUCCH resources for the first plurality of cell. The configuration of PUCCH resources for the first plurality of cells may indicate that the first plurality of cells are candidate PUCCH cells. The one or more second configuration parameters may indicate a first time/timing pattern. The first time/timing pattern may indicate corresponding timings that a candidate PUCCH cell, in the candidate PUCCH cells, is configured as a PUCCH cell. Example time/timing patterns and timings that candidate PUCCH cells, in a PUCCH group, are configured as PUCCH cell are shown in FIG. 18 and FIG. 19.

The wireless device may determine to deactivate the first cell. In an example, the wireless device may determine to deactivate the first cell, in response to receiving a command (e.g., an activation/deactivation MAC CE). In an example, the wireless device may determine to deactivate the first cell in response to expiry of a deactivation timer associated with the first cell. In response to deactivation of the first cell and/or determining to deactivate the first cell, the wireless device may ignore the first time/timing pattern. In an example, in response to ignoring the first time/timing pattern, the wireless device may use/consider a second cell, in the plurality of candidate PUCCH cells, as the PUCCH cell and may use the second cell for transmission of uplink control information (e.g., HARQ feedback, SR, CSI report, etc.) associated with the PUCCH group.

In an example embodiment, the second cell may be a primary cell. In response to ignoring the first time/timing pattern, the wireless device may use/consider a second cell as the PUCCH cell and may use the primary cell for transmission of uplink control information (e.g., HARQ feedback, SR, CSI report, etc.) associated with the PUCCH group.

In an example embodiment, the second cell may be a PUCCH SCell. In response to ignoring the first time/timing pattern, the wireless device may use/consider a PUCCH SCell as the PUCCH cell and may use the PUCCH SCell for transmission of uplink control information (e.g., HARQ feedback, SR, CSI report, etc.) associated with the PUCCH group.

In an example embodiment, the second cell may be a reference cell in the plurality of candidate PUCCH cells. In an example, the first timing pattern may be based on a numerology of the reference cell and the wireless device may use the numerology of the reference cell to determine the first timing pattern. In response to ignoring the first time/timing pattern, the wireless device may use/consider the reference cell as the PUCCH cell and may use the reference cell for transmission of uplink control information (e.g., HARQ feedback, SR, CSI report, etc.) associated with the PUCCH group.

In an example, after deactivating the first cell and/or ignoring the first time/timing pattern, the wireless device may receive one or more third configuration parameters of a second time/timing pattern. The second time/timing pattern may indicate corresponding timings that each candidate PUCCH cell (e.g., each candidate PUCCH cell excluding the first cell), is configured as PUCCH cell.

Figure 26:
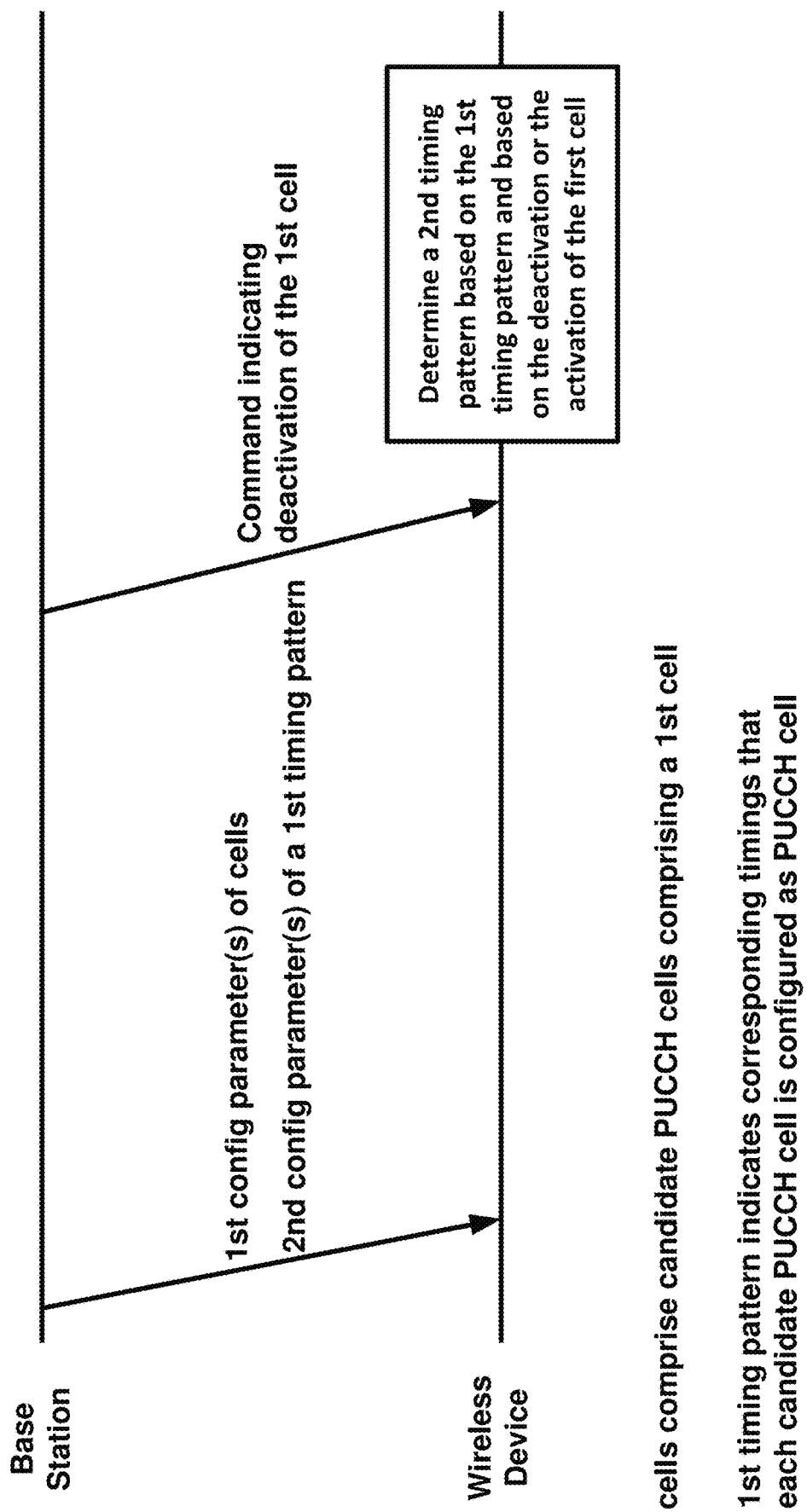
FIG. 26 shows an example process in accordance with several of various embodiments of the present disclosure.

In an example embodiment as shown in FIG. 26, a wireless device may receive one or more messages (e.g., one or more RRC messages) comprising one or more first configuration parameters and one or more second configuration parameters. The one or more first configuration parameters may be of/associated with a plurality of cells. In an example, the plurality of cells may be grouped into a cell group (e.g., a PUCCH group, e.g., a primary PUCCH group or a secondary PUCCH group). The plurality of cells may comprise a first plurality of cells that are candidate PUCCH cells. The candidate PUCCH cells may comprise a first cell. In an example, the first cell may be a secondary cell.

In an example, the one or more first configuration parameters may indicate that the first plurality of cells, in the plurality of cells, are candidate PUCCH cells. In an example, the one or more first configuration parameters may comprise PUCCH configuration parameters indicating PUCCH resources for the first plurality of cell. The configuration of PUCCH resources for the first plurality of cells may indicate that the first plurality of cells are candidate PUCCH cells. The one or more second configuration parameters may indicate a first time/timing pattern. The first time/timing pattern may indicate corresponding timings that a candidate PUCCH cell, in the candidate PUCCH cells, is configured as a PUCCH cell. Example time/timing patterns and timings that candidate PUCCH cells, in a PUCCH group, are configured as PUCCH cell are shown in FIG. 18 and FIG. 19.

The wireless device may receive a command (e.g., an activation/deactivation MAC CE) indicating activation or deactivation of the first cell. In response to receiving the command, the wireless device may determine a second time/timing pattern. The wireless device may determine the second time/timing pattern based on the first time/timing pattern (e.g., the first time/timing pattern determined based on the one or more second configuration parameters) and based on the deactivation or activation of the first cell. For example, the command may indicate deactivation of the first cell and the second time/timing pattern may exclude timings associated with the first cell from the first time/timing pattern. In response to the determination of the second time/timing pattern, the wireless device may transmit uplink control information (e.g., HARQ feedback, SR, CSI reports, etc.) based on the second time/timing pattern. For example, the second time/timing pattern may indicate that a first candidate PUCCH cell is configured as a PUCCH cell in a timing scheduled for transmission of uplink control information and the wireless device may transmit the uplink control information via the first candidate PUCCH cell in the timing.

In an example, the first time/timing pattern may be applied periodically/periodically repeated based on a first period. The second time/timing pattern may be applied periodically/periodically repeated based on a second period. In an example, the first period may be one frame (10 ms). In an example, the second period may be one frame (10 ms). In an example, the configuration parameters (e.g., the one or more second configuration parameters) may indicate the first period and/or the second period.

Figure 27:
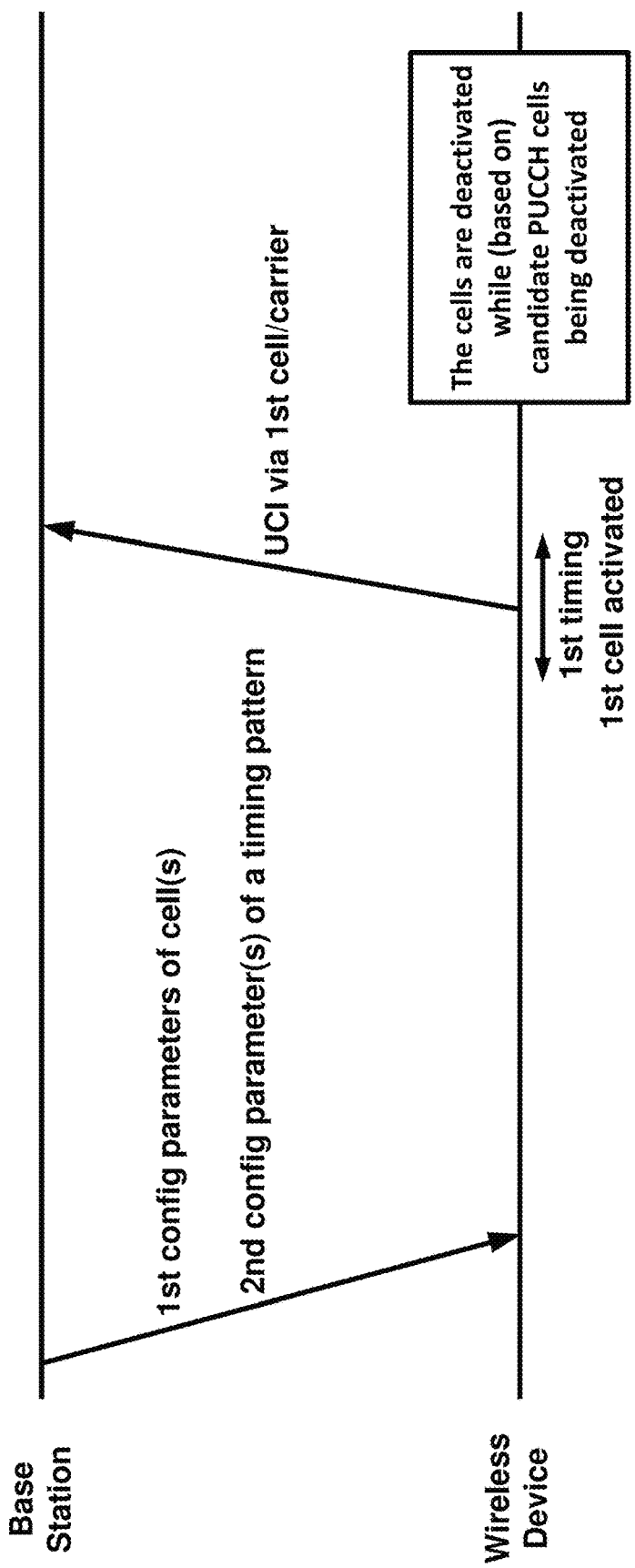
FIG. 27 shows an example process in accordance with several of various embodiments of the present disclosure.

In an example embodiment as shown in FIG. 27, a wireless device may receive one or more messages (e.g., one or more RRC messages) comprising one or more first configuration parameters and one or more second configuration parameters. The one or more first configuration parameters may be of/associated with a plurality of cells. In an example, the plurality of cells may be grouped into a cell group (e.g., a PUCCH group, e.g., a primary PUCCH group or a secondary PUCCH group). The plurality of cells may comprise a plurality of candidate PUCCH cells. The plurality of cells may further comprise one or more second cells.

In an example, the one or more first configuration parameters may comprise PUCCH configuration parameters indicating PUCCH resources for the plurality of candidate PUCCH cells. The configuration of PUCCH resources for the plurality of candidate PUCCH cells may indicate that the plurality of candidate PUCCH cells are candidate PUCCH cells for the PUCCH group. The one or more second configuration parameters may indicate a time/timing pattern. The time/timing pattern may indicate corresponding timings that a candidate PUCCH cell, in the plurality of candidate PUCCH cells, is configured as a PUCCH cell. Example time/timing patterns and timings that candidate PUCCH cells, in a PUCCH group, are configured as PUCCH cell are shown in FIG. 18 and FIG. 19.

Figure 28:
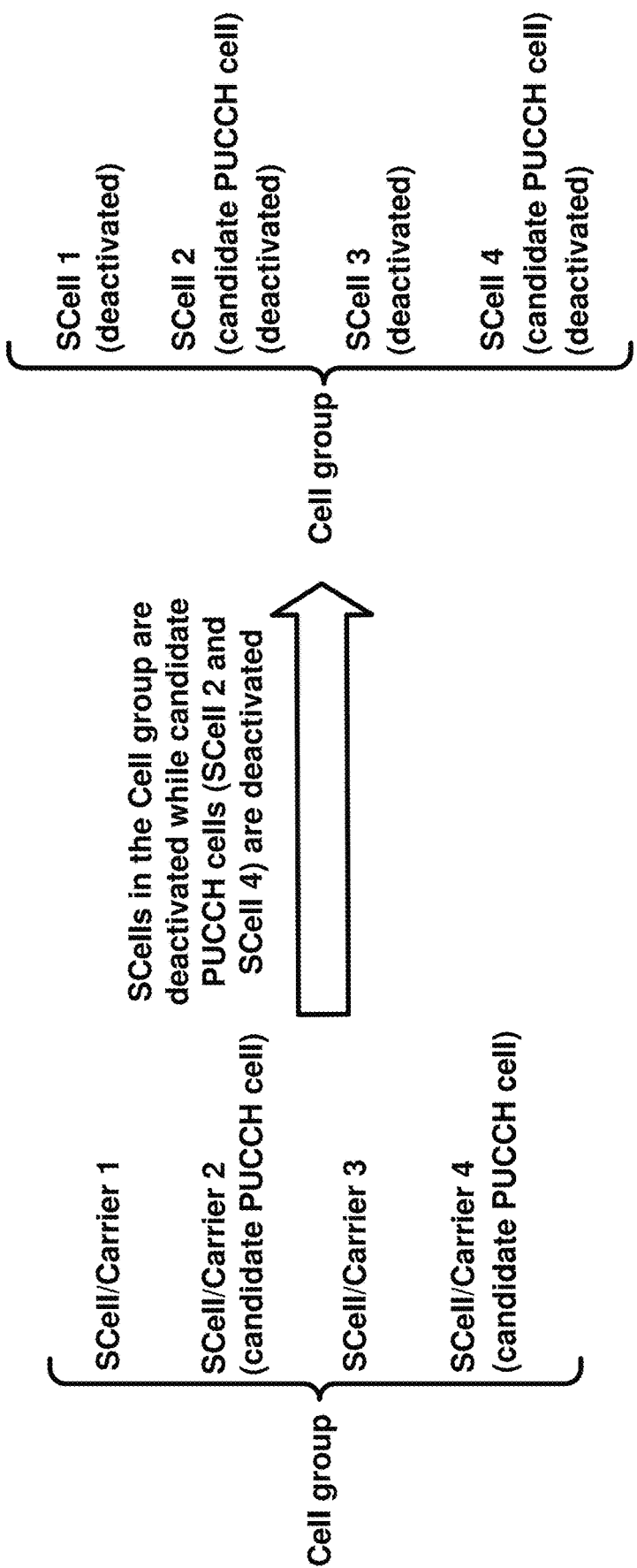
FIG. 28 shows an example process in accordance with several of various embodiments of the present disclosure.

The plurality of candidate PUCCH cells may be secondary cells. In an example, the plurality of candidate PUCCH cells deactivated. In an example, the plurality of candidate PUCCH cells may be deactivated in response to one or more deactivation MAC CEs. The plurality of cells may be deactivated while the plurality of candidate PUCCH cells are deactivated. The plurality of cells may be deactivated based on the plurality of candidate PUCCH cells being deactivated. An example scenario with four SCells/carriers in a PUCCH group comprising two candidate PUCCH cells is shown in FIG. 28. For example, first cells of the plurality of cells excluding the candidate PUCCH cells (e.g., SCell/carrier 1 and SCell/carrier 2 in FIG. 28) may be deactivated prior to the time that the plurality of candidate PUCCH cells are deactivated. For example, the wireless device may receive one or more first MAC CEs indicating deactivation of the first cells of the plurality of cells, excluding the plurality of candidate PUCCH cells, prior to the time that the plurality of candidate PUCCH cells are deactivated.

The wireless device may transmit uplink control information (e.g., HARQ feedback, SR, CSI reports, etc.) via a first cell in the plurality of candidate PUCCH cells based on the time/timing pattern and while the first cell is activated.

Figure 29:
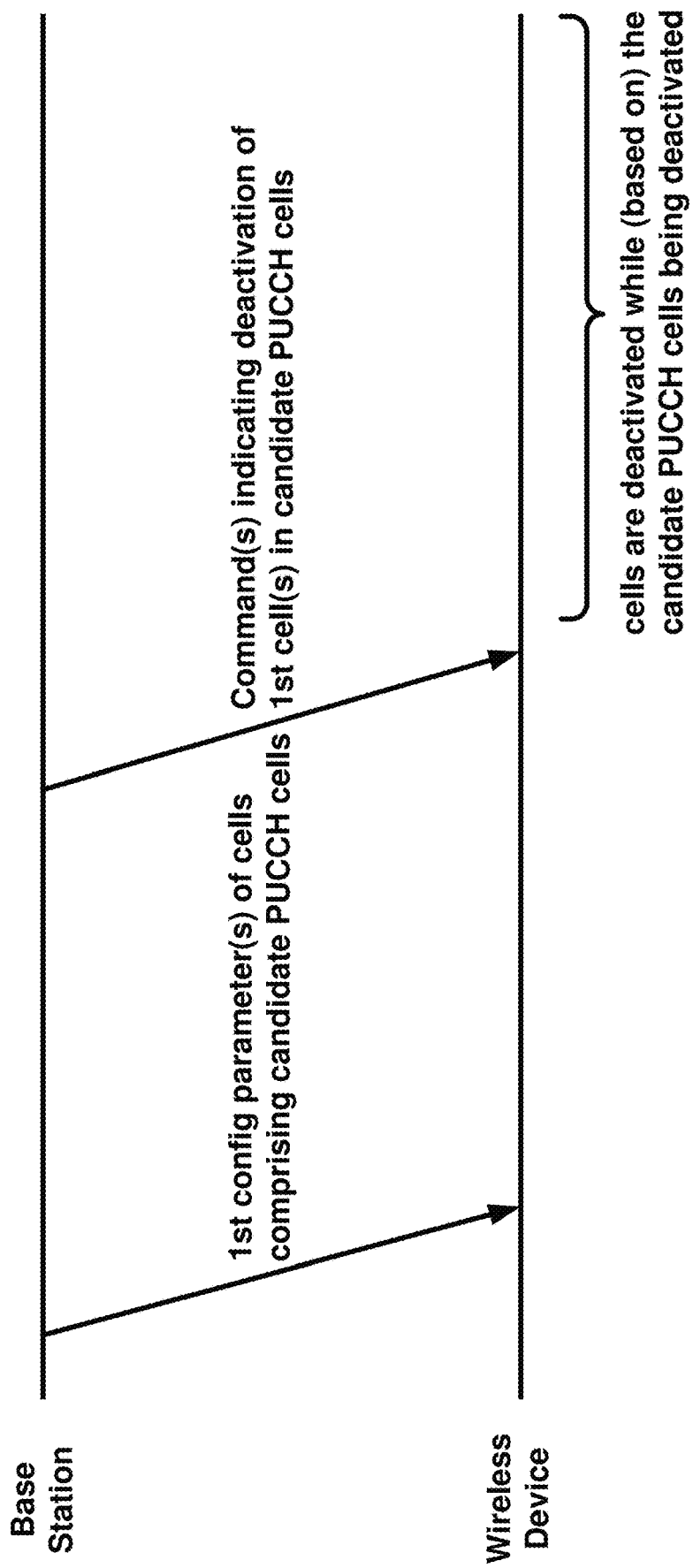
FIG. 29 shows an example process in accordance with several of various embodiments of the present disclosure.

In an example embodiment as shown in FIG. 29, a wireless device may receive one or more messages (e.g., one or more RRC messages) comprising one or more first configuration parameters. The one or more first configuration parameters may be of/associated with a plurality of cells. In an example, the plurality of cells may be grouped into a cell group (e.g., a PUCCH group, e.g., a primary PUCCH group or a secondary PUCCH group). The plurality of cells may comprise a plurality of candidate PUCCH cells. The plurality of cells may further comprise one or more second cells. The wireless device may receive at least one command (e.g., at least one cell activation/deactivation MAC CE) indicating deactivation of at least one first cell of the plurality of cells. The deactivation of the at least one first cell may be such that plurality of cells are deactivated while the candidate PUCCH cells are deactivated.

In an example embodiment, the plurality of cells in a PUCCH group may be deactivated while (e.g., based on) the candidate PUCCH cells of the PUCCH group are deactivated. For example, the network (base station) may transmit commands (e.g., one or more MAC CEs) indicating deactivation of all of the cells of the PUCCH group based on/while the candidate PUCCH cells of the PUCCH group are deactivated.

In an example embodiment, if at least one candidate PUCCH cell of the PUCCH group is activated, the network (base station) may not (e.g., does not have to) deactivate cells of the PUCCH group.

Figure 30:
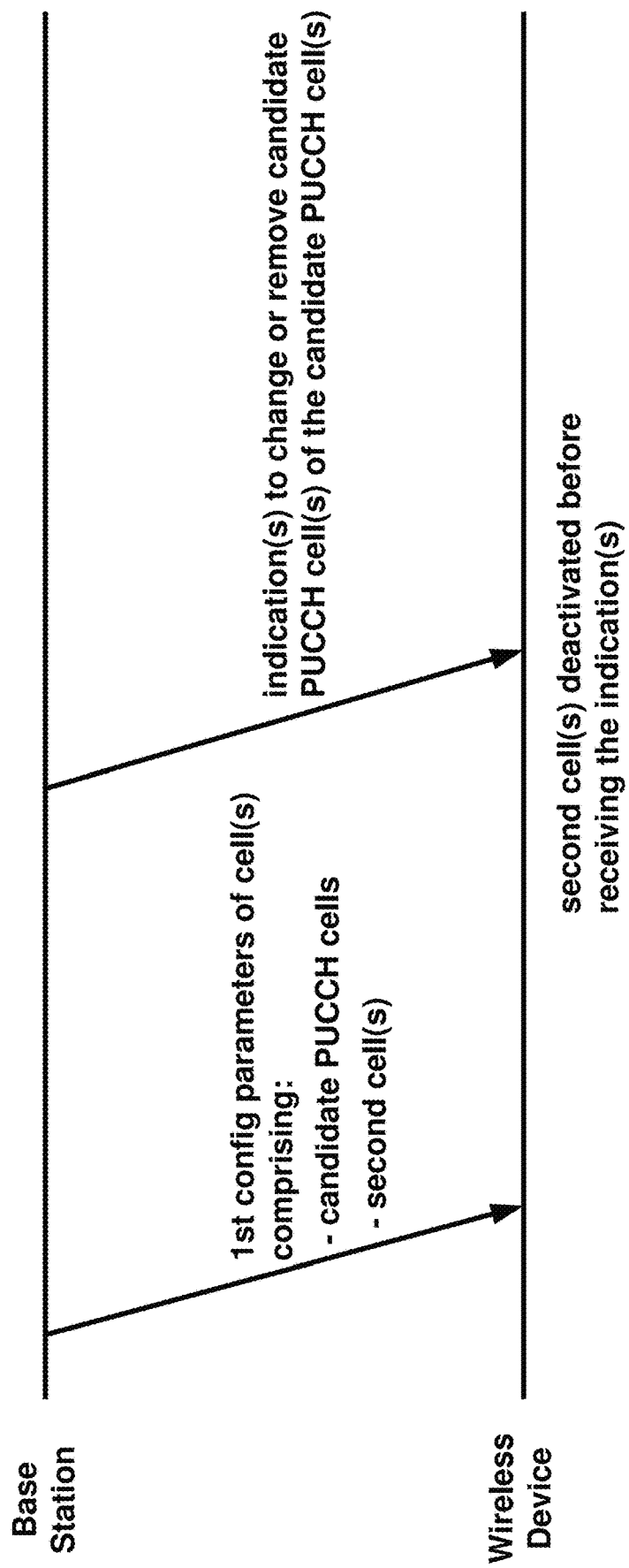
FIG. 30 shows an example process in accordance with several of various embodiments of the present disclosure.
Figure 31:
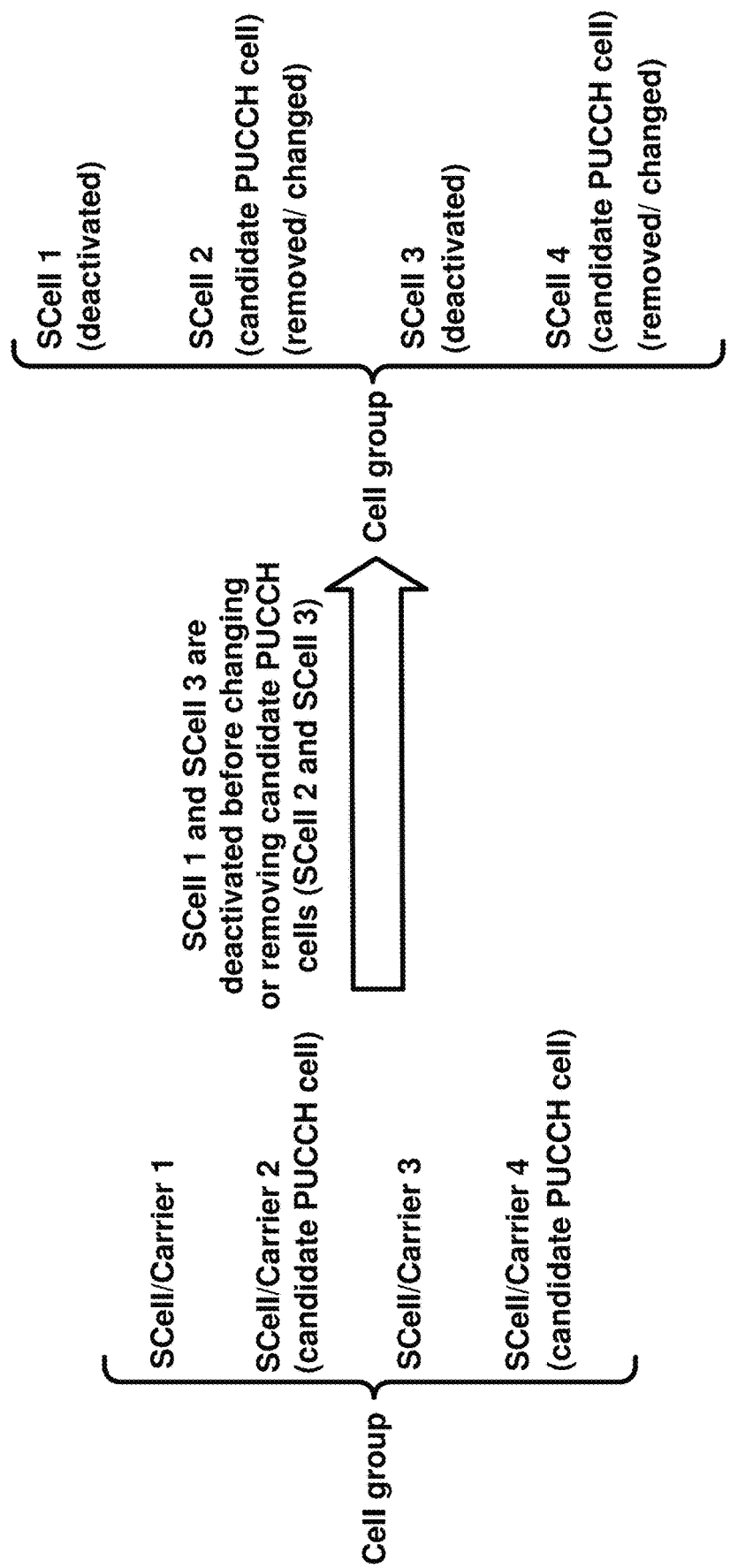
FIG. 31 shows an example process in accordance with several of various embodiments of the present disclosure.

In an example embodiment as shown in FIG. 30, a wireless device may receive one or more first messages (e.g., one or more first RRC messages) comprising one or more first configuration parameters. The one or more first configuration parameters may be of/associated with a plurality of cells. The plurality of cells may be grouped into a cell group (e.g., a PUCCH group, e.g., a primary PUCCH group or a secondary PUCCH group). The plurality of cells may comprise a first plurality of candidate PUCCH cells. The plurality of cells may further comprise one or more second cells. The wireless device may receive one or more commands (e.g., one or more cell activation/deactivation MAC CEs) indicating deactivation of the one or more second cells (e.g., the cells of the PUCCH group excluding the candidate PUCCH cells). The wireless device may receive one or more second message indicating changing or removing the first plurality of candidate PUCCH cells. In an example, the wireless device may receive one or more second message indicating changing or removing at least one candidate PUCCH cell of the first plurality of candidate PUCCH cells. The one or more second cells (e.g., cells of the PUCCH group excluding the first plurality of candidate PUCCH cells) may be deactivated before receiving the one or more second messages indicating the changing or removing the first plurality of candidate PUCCH cells or at least one candidate PUCCH cell of the first plurality of candidate PUCCH cells. An example scenario in which a PUCCH group comprises four cells/carriers with two of the cells/carriers being candidate PUCCH cells are shown in FIG. 31. In an example, the receiving the one or more second message may be based on the one or more second cells (e.g., the cells of the PUCCH group excluding the candidate PUCCH cells) being deactivated.

In an example, timings that a candidate PUCCH cell, in the candidate PUCCH cells, is configured as a PUCCH cell may be based on a time/timing pattern. The wireless device may receive one or more second configuration parameters indicating the time/timing pattern. A candidate PUCCH cell may be configured with PUCCH resources and may be configured as a PUCCH cell in timings determined based on the time/timing patter. Example time/timing patterns and timings that candidate PUCCH cells, in a PUCCH group, are configured as PUCCH cell are shown in FIG. 18 and FIG. 19.

In an example, the one or more first configuration parameters may indicate the candidate PUCCH cells. In an example, the one or more first configuration parameters may comprise PUCCH configuration parameters indicating PUCCH resources for the candidate PUCCH cells. The configuration of PUCCH resources for the candidate PUCCH cells may indicate that the candidate PUCCH cells.

Figure 32:
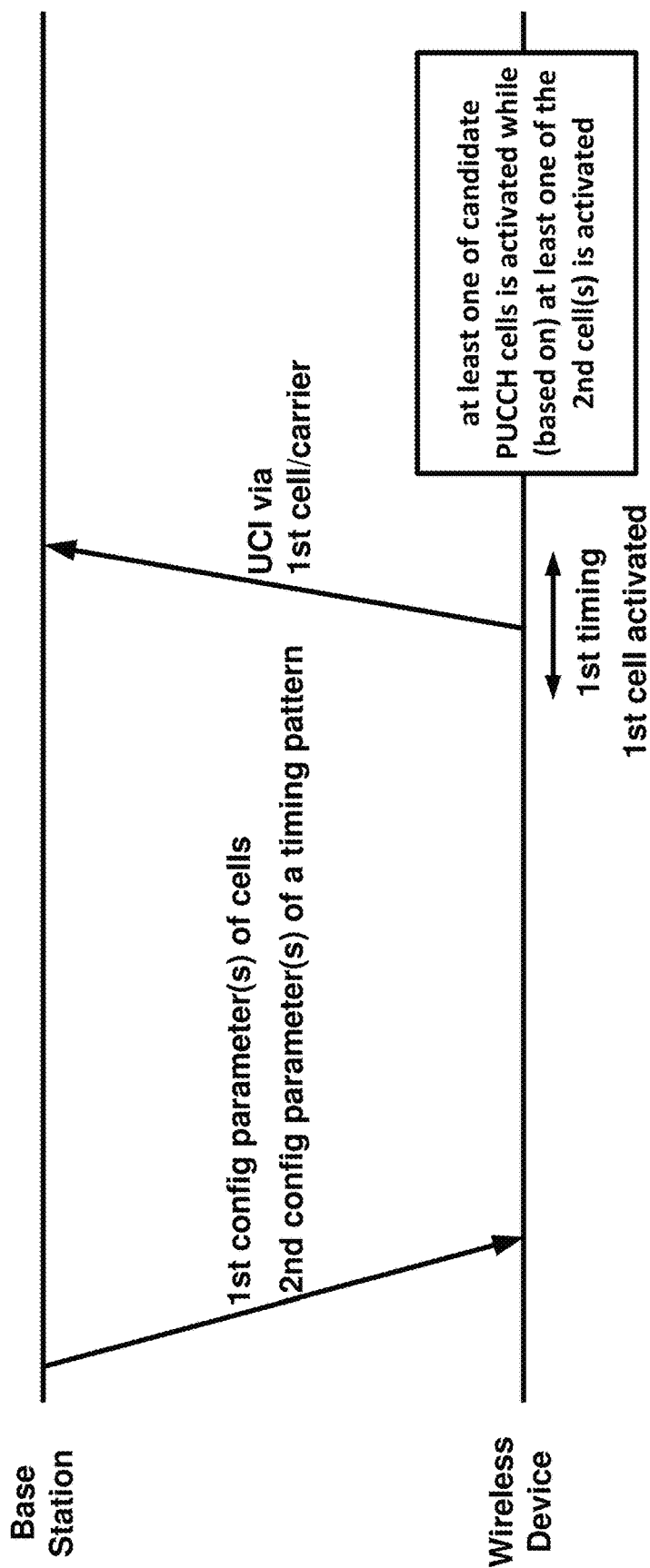
FIG. 32 shows an example process in accordance with several of various embodiments of the present disclosure.

In an example embodiment as shown in FIG. 32, a wireless device may receive one or more messages (e.g., one or more RRC messages) comprising one or more first configuration parameters and one or more second configuration parameters. The one or more first configuration parameters may be of/associated with a plurality of cells. In an example, the plurality of cells may be grouped into a cell group (e.g., a PUCCH group, e.g., a primary PUCCH group or a secondary PUCCH group). The plurality of cells may comprise a first plurality of cells that are first candidate PUCCH cells. The plurality of cells may further comprise one or more second cells.

In an example, the one or more first configuration parameters may indicate that the first plurality of cells, in the plurality of cells, are candidate PUCCH cells. In an example, the one or more first configuration parameters may comprise PUCCH configuration parameters indicating PUCCH resources for the first plurality of cell. The configuration of PUCCH resources for the first plurality of cells may indicate that the first plurality of cells are candidate PUCCH cells. The one or more second configuration parameters may indicate a time/timing pattern. The time/timing pattern may indicate corresponding timings that a candidate PUCCH cell, in the candidate PUCCH cells, is configured as a PUCCH cell. Example time/timing patterns and timings that candidate PUCCH cells, in a PUCCH group, are configured as PUCCH cell are shown in FIG. 18 and FIG. 19.

Figure 33:
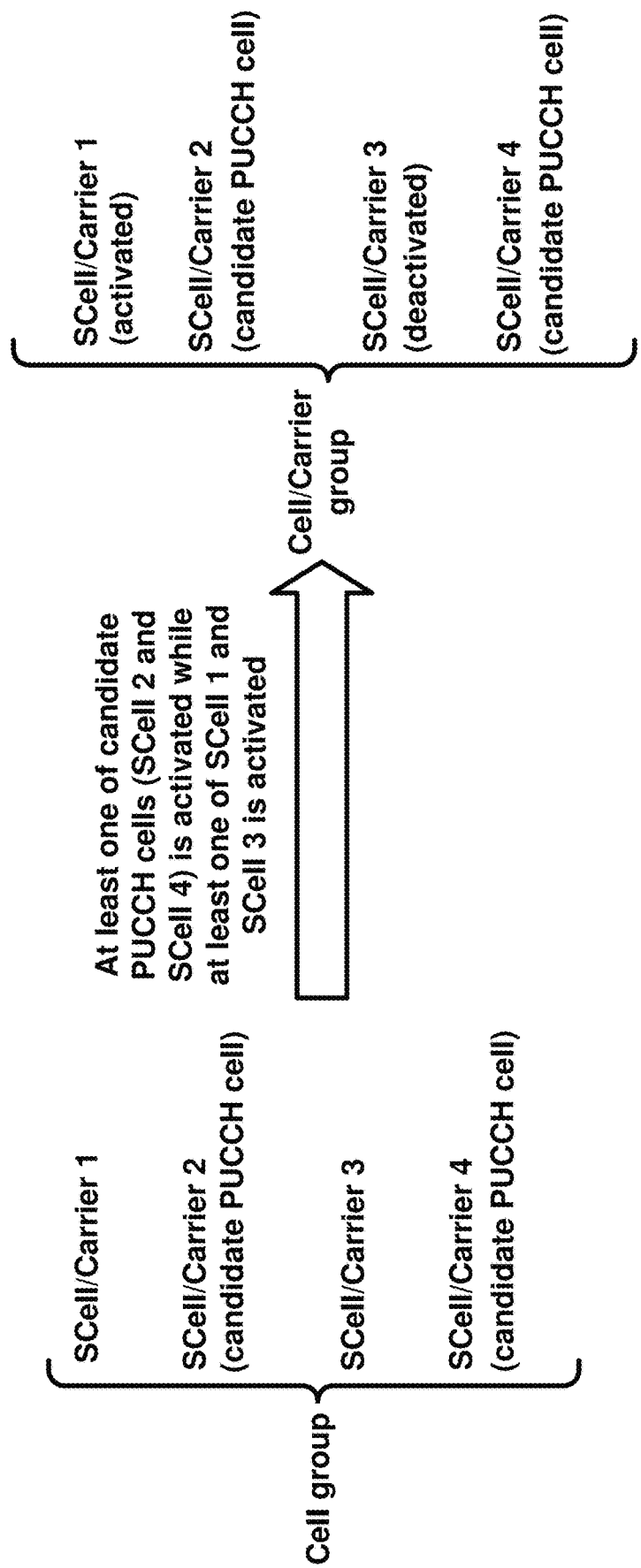
FIG. 33 shows an example process in accordance with several of various embodiments of the present disclosure.

The first plurality of cells (first candidate PUCCH cells) or at least one first cell of the plurality of cells (candidate PUCCH cells) may be activated based on at least one second cell in the one or more second cells (e.g., the cells of the PUCCH group excluding the candidate PUCCH cells) is activated. An example PUCCH group with four cells comprising two candidate PUCCH cells is shown in FIG. 33. At least one of candidate PUCCH cells (SCell 2 and SCell 4) are activated while at least one of SCell 1 and SCell 3 is activated.

In an example, to enable fast SCell activation when CA is configured, one dormant BWP may be configured for an SCell. If the active BWP of the activated SCell is a dormant BWP, the UE may stop monitoring PDCCH and transmitting SRS/PUSCH/PUCCH on the SCell and may continue performing CSI measurements, AGC and beam management, if configured. A DCI may be used to control entering/leaving the dormant BWP for one or more SCell(s) or one or more SCell group(s). The dormant BWP may be one of the UE's dedicated BWPs configured by network via dedicated RRC signaling. In example embodiments, in case of PUCCH carrier switching, the candidate PUCCH cells in a PUCCH group may not be configured with a dormant BWP.

In an example embodiment, a wireless device may receive, from a base station, one or more first configuration parameters of a plurality of cells and one or more second configuration parameters of/indicating a timing pattern. A first plurality of cells, in the plurality of cells, may be candidate physical uplink control channel (PUCCH) cells. The first plurality of cells may comprise a first cell and a second cell. The timing pattern may indicate corresponding timings that each candidate PUCCH cell, in the candidate PUCCH cells, is configured as a PUCCH cell. The timing pattern may indicate that the second cell is configured as the PUCCH cell in a first timing. The wireless device may receive a first command indicating deactivation of the second cell. In response to receiving the first command, the wireless device may determine that the first cell is the PUCCH cell during the first timing. The wireless device may transmit first uplink control information during the first timing based on PUCCH resources of the first cell.

In an example, timings that a candidate PUCCH cell, in the candidate PUCCH cells, is configured as the PUCCH cell is based on the timing pattern.

In an example, a candidate PUCCH cell may be configured with PUCCH resources and may be configured as a PUCCH cell (e.g., may be used for transmission of uplink control information) in timings determined based on the timing pattern.

In an example, the second cell may be a secondary cell.

In an example, the plurality of cells may be in a cell group. In an example, the plurality of cells may be provided by a master base station; and the cell group may be a master cell group (MCG). In an example, the plurality of cells may be provided by a secondary base station; and the cell group may be a secondary cell group (SCG). In an example, the cell group may be a PUCCH group. In an example, uplink control information, associated with the plurality of cells, may be transmitted via PUCCHs configured for the first plurality of cells (the candidate PUCCH cells). In an example, the uplink control information may comprise hybrid automatic repeat request (HARQ) feedbacks associated with downlink transport blocks (TBs) received via the plurality of cells. In an example, the uplink control information may comprise scheduling request. In an example, the uplink control information may comprise channel state information. In an example, the timing pattern may be for/associated with the PUCCH group. In an example, the PUCCH group may be a primary PUCCH group. In an example, the first cell may be a primary cell. In an example, the PUCCH group may be a secondary PUCCH group. In an example, the first cell may be a PUCCH secondary cell. In an example, the PUCCH secondary cell may be a secondary cell configured with PUCCH.

In an example, the first command may be an activation/deactivation medium access control (MAC) control element (CE).

In an example, the one or more first configuration parameters may indicate that the first plurality of cells are candidate PUCCH cells.

In an example, the one or more first configuration parameters may comprise PUCCH configuration parameters of a plurality of PUCCHs for the first plurality of cells (candidate PUCCH cells). In an example, the PUCCH configuration parameters may indicate PUCCH radio resources for the first plurality of cells (candidate PUCCH cells).

In an example, the first timing may be within a time duration that the second cell is deactivated (in response to the receiving the first command).

In an example, the timing pattern may indicate that the second cell is configured as a PUCCH cell in a second timing. The second cell may be activated during the second timing. The second cell may be the PUCCH cell during the second timing. The wireless device may transmit second uplink control information via the second cell in the second timing. In an example, the wireless device may receive a second command indicating activation of the second cell, wherein the second cell may be activated in the second timing based on (e.g., in response to) the receiving the second command. In an example, the second command may be an activation/deactivation MAC CE.

In an example, the timing pattern may be based on a slot of a reference cell/carrier. In an example, the reference cell/carrier may be a primary cell (e.g., in the case that the plurality of cells are in the primary PUCCH group). In an example, the reference cell/carrier may be a PUCCH secondary cell (e.g., in the case that the plurality of cells are in the secondary PUCCH group).

In an example, the timing pattern may be configured to be applied periodically based on a period. In an example, the timing pattern may be configured to be periodically repeated based on the period. In an example, the period may be one frame (e.g., 10 ms). In an example, the one or more second configuration parameters may indicate the period. In an example, the timing pattern may indicate, for each slot of a reference cell/carrier, an applicable PUCCH cell in the first plurality of cells (candidate PUCCH cells).

In an example, the second cell may be adjacent to the first cell in the timing pattern. In an example, the second cell may be prior to the first cell in the timing pattern. In an example, the second cell may be after the first cell in the timing pattern.

In an example embodiment, a wireless device may receive, from a base station, one or more first configuration parameters of a plurality of cells and one or more second configuration parameters indicating a plurality of timing patterns. The plurality of cells may comprise a plurality of candidate physical uplink control channel (PUCCH) cells. A timing pattern, in the plurality of patterns, may be based on activation or deactivation status of the plurality of candidate PUCCH cells. The timing pattern may indicate corresponding timings that a candidate PUCCH cell, in the candidate PUCCH cells, is configured as a PUCCH cell. The wireless device may determine the activation or the deactivation status of the plurality of candidate PUCCH cells. The wireless device may determine a first timing pattern, in the plurality of timing patterns, based on the activation or the deactivation status. The wireless device may transmit first uplink control information based on the first timing pattern.

In an example, a cell, in the plurality of candidate PUCCH cells, may be deactivated based on expiry of a corresponding deactivation timer.

In an example, a cell, in the plurality of candidate PUCCH cells, may be activated or deactivated in response to a command (e.g., an activation/deactivation medium access control (MAC) control element (CE)).

In an example, a number of timing patterns, in the plurality of timing patterns, may be based on a number of combinations of deactivation or activation status of the candidate PUCCH cells.

In an example, the first uplink control information may comprise one or more of hybrid automatic repeat request (HARQ) feedback, scheduling request, and channel state information.

In an example, timings that a candidate PUCCH cell, in the candidate PUCCH cells, is configured as the PUCCH cell is based on a timing pattern.

In an example, a candidate PUCCH cell may be configured with PUCCH resources and may be configured as a PUCCH cell (e.g., may be used for transmission of uplink control information) in timings determined based on a timing pattern.

In an example, one or more cells of the plurality of candidate PUCCH cells may be secondary cells.

In an example, the plurality of cells may be in a cell group. In an example, the plurality of cells may be provided by a master base station; and the cell group may be a master cell group (MCG).

In an example, the plurality of cells may be provided by a secondary base station; and the cell group may be a secondary cell group (SCG). In an example, the cell group may be a PUCCH group. In an example, uplink control information, associated with the plurality of cells, may be transmitted via PUCCHs configured for the candidate PUCCH cells. In an example, the uplink control information may comprise hybrid automatic repeat request (HARQ) feedbacks associated with downlink transport blocks (TBs) received via the plurality of cells. In an example, the uplink control information may comprise scheduling request. In an example, the uplink control information may comprise channel state information. In an example, the PUCCH group may be a primary PUCCH group. In an example, the primary PUCCH group may comprise a primary cell. In an example, the PUCCH group may be a secondary PUCCH group. In an example, the secondary PUCCH group may comprise a PUCCH secondary cell. In an example, the PUCCH secondary cell may be a secondary cell configured with PUCCH.

In an example, the one or more first configuration parameters indicate that the candidate PUCCH cells are configured with PUCCH.

In an example, the one or more first configuration parameters comprise PUCCH configuration parameters of a plurality of PUCCHs for the candidate PUCCH cells.

In an example, the PUCCH configuration parameters may indicate PUCCH radio resources for the candidate PUCCH cells.

In an example, the first timing pattern may be based on a slot/numerology of a reference cell/carrier. In an example, the reference cell/carrier may be a primary cell (e.g., for the case that the plurality of cells are in a primary PUCCH group). In an example, the reference cell/carrier is a PUCCH secondary cell (e.g., for the case that the plurality of cells are in a secondary PUCCH group).

In an example, the timing pattern may be configured to be applied periodically based on a period. In an example, the timing pattern may be configured to be periodically repeated based on a period. In an example, the period may be one frame (10 ms). In an example, the one or more second configuration parameters may indicate the period.

In an example, the first timing pattern may indicate, for each slot of a reference cell/carrier, an applicable PUCCH cell in the candidate PUCCH cells.

In an example embodiment, a wireless device may receive, from a base station, one or more first configuration parameters of a plurality of cells and one or more second configuration parameters of a first timing pattern. A first plurality of cells, in the plurality of cells, may be candidate physical uplink control channel (PUCCH) cells. The first plurality of cells may comprise a first cell. The timing pattern may indicate corresponding timings that each candidate PUCCH cell, in the candidate PUCCH cells, is configured as a PUCCH cell. The wireless device may determine to deactivate the first cell. The wireless device may deactivate the first cell. The wireless device may ignore the first timing pattern in response to determining to deactivate the first cell. The wireless device may ignore the first timing pattern in response to deactivating the first cell.

In an example, the wireless device may consider (e.g., in response to the ignoring the first timing pattern) a second cell as the PUCCH cell. The wireless device may use (e.g., in response to the ignoring the first timing pattern) a second cell as the PUCCH cell. In an example, the second cell may be a primary cell. In an example, the second cell may be a PUCCH secondary cell. In an example, the second cell may be a reference cell. In an example, the first timing may be based on a slot/numerology of the reference cell.

In an example, the wireless device may receive, after the deactivating the first cell, one or more third configuration parameters of a second timing pattern. In an example, the second timing pattern, may indicate corresponding timings that each candidate PUCCH cell, excluding the first cell in the candidate PUCCH cells, is configured as a PUCCH cell.

In an example, a cell, in the candidate PUCCH cells, may be deactivated based on expiry of a corresponding deactivation timer. In an example, a cell, in the plurality of candidate PUCCH cells, may be activated or deactivated in response to a command (e.g., an activation/deactivation medium access control (MAC) control element (CE)).

In an example, a number of timing patterns, in the plurality of timing patterns, may be based on a number of combinations of deactivation or activation status of the candidate PUCCH cells.

In an example, the first uplink control information comprise one or more of hybrid automatic repeat request (HARQ) feedback, scheduling request, and channel state information.

In an example, timings that a candidate PUCCH cell, in the candidate PUCCH cells, is configured as the PUCCH cell is based on a timing pattern.

In an example, a candidate PUCCH cell may be configured with PUCCH resources and may be configured as a PUCCH cell (e.g., may be used for transmission of uplink control information) in timings determined based on a timing pattern.

In an example, one or more cells of the plurality of candidate PUCCH cells may be secondary cells.

In an example, the plurality of cells may be in a cell group. In an example, the plurality of cells may be provided by a master base station; and the cell group may be a master cell group (MCG). In an example, the plurality of cells may be provided by a secondary base station; and the cell group may be a secondary cell group (SCG). In an example, the cell group may be a PUCCH group. In an example, uplink control information, associated with the plurality of cells, may be transmitted via PUCCHs configured for the candidate PUCCH cells. In an example, the uplink control information may comprise hybrid automatic repeat request (HARQ) feedbacks associated with downlink transport blocks (TBs) received via the plurality of cells. In an example, the uplink control information may comprise scheduling request. In an example, the uplink control information may comprise channel state information. In an example, the timing pattern may be for/associated with the PUCCH group. In an example, the PUCCH group may be a primary PUCCH group. In an example, the primary PUCCH group may comprise a primary cell. In an example, the PUCCH group may be a secondary PUCCH group. In an example, the secondary PUCCH group may comprise a PUCCH secondary cell. In an example, the PUCCH secondary cell may be a secondary cell configured with PUCCH.

In an example, the one or more first configuration parameters may indicate that the candidate PUCCH cells are configured with PUCCH.

In an example, the one or more first configuration parameters may comprise PUCCH configuration parameters of a plurality of PUCCHs for the candidate PUCCH cells.

In an example, the first timing pattern may be based on a slot of a reference cell/carrier.

In an example, the reference cell/carrier may be a primary cell (e.g., for the case that the plurality of cells are in a primary PUCCH group).

In an example, the reference cell/carrier may be a PUCCH secondary cell (e.g., for the case that the plurality of cells are in a secondary PUCCH group).

In an example, the timing pattern may be configured to be applied periodically. In an example, the timing pattern may be configured to be periodically repeated based on a period. In an example, the time period may be one frame (10 ms).

In an example, the one or more second configuration parameters may indicate the period.

In an example, the first timing pattern may indicate, for each slot of a reference cell/carrier, an applicable PUCCH cell in the candidate PUCCH cells.

In an example embodiment, a wireless device may receive, from a base station, one or more first configuration parameters of a plurality of cells and one or more second configuration parameters of a first timing pattern. A first plurality of cells, in the plurality of cells, may be candidate physical uplink control channel (PUCCH) cells. The first plurality of cells may comprise a first cell. The first timing pattern may indicate corresponding timings that each candidate PUCCH cell, in the candidate PUCCH cells, is configured as a PUCCH cell. The wireless device may receive a command indicating deactivation or activation of the first cell. In response to receiving the command, the wireless device may determine a second timing pattern based on the first timing pattern and based on the deactivation or the activation of the first cell.

In an example, the command may be an activation/deactivation MAC CE.

In an example, the command may indicate deactivation of the first cell. The second timing pattern may exclude timings, corresponding to the first cell, from the first timing pattern.

In an example, timings that a candidate PUCCH cell, in the candidate PUCCH cells, is configured as the PUCCH cell may be based on a timing pattern.

In an example, a candidate PUCCH cell may be configured with PUCCH resources and may be configured as a PUCCH cell (e.g., may be used for transmission of uplink control information) in timings determined based on a timing pattern.

In an example, the first cell may be a secondary cell.

In an example, the plurality of cells may be in a cell group. In an example, the plurality of cells may be provided by a master base station; and the cell group may be a master cell group (MCG). In an example, the plurality of cells may be provided by a secondary base station; and the cell group may be a secondary cell group (SCG). In an example, the cell group may be a PUCCH group. In an example, uplink control information, associated with the plurality of cells, may be transmitted via PUCCHs configured for the first plurality of cells (the candidate PUCCH cells). In an example, the uplink control information may comprise hybrid automatic repeat request (HARQ) feedbacks associated with downlink transport blocks (TBs) received via the plurality of cells. In an example, the uplink control information may comprise scheduling request. In an example, the uplink control information may comprise channel state information. In an example, the first timing pattern and the second may be for/associated with the PUCCH group. In an example, the PUCCH group may be a primary PUCCH group. In an example, the primary PUCCH group may comprise a primary cell. In an example, the PUCCH group may be a secondary PUCCH group. In an example, the secondary PUCCH group may comprise a PUCCH secondary cell. In an example, the PUCCH secondary cell may be a secondary cell configured with PUCCH.

In an example, the one or more first configuration parameters may indicate that the first plurality of cells are candidate PUCCH cells.

In an example, the one or more first configuration parameters may comprise PUCCH configuration parameters of a plurality of PUCCHs for the first plurality of cells (candidate PUCCH cells).

In an example, the PUCCH configuration parameters may indicate PUCCH radio resources for the first plurality of cells (candidate PUCCH cells).

In an example, the first timing pattern and the second timing pattern may be based on a slot of a reference cell/carrier. In an example, the reference cell/carrier may be a primary cell (e.g., for the case that the plurality of cells are in a primary PUCCH group). In an example, the reference cell/carrier may be a PUCCH secondary cell (e.g., for the case that the plurality of cells are in a secondary PUCCH group).

In an example, the first timing pattern may be configured to be applied periodically based on a first period. In an example, the first timing pattern may be configured to be periodically repeated based on a first period. In an example, the second timing pattern may be configured to be applied periodically based on a second period. In an example, the second timing pattern may be configured to be periodically repeated based on a second period.

In an example, the first period may be one frame (10 ms).

In an example, the second period may be one frame (10 ms).

In an example, a timing pattern may indicate, for each slot of a reference cell/carrier, an applicable PUCCH cell in the first plurality of cells (e.g., the candidate PUCCH cells).

In an example embodiment, a wireless device may receive, from a base station, one or more first configuration parameters of a plurality of cells and one or more second configuration parameters of a timing pattern. The plurality of cells may comprise a first plurality of candidate physical uplink control channel (PUCCH) cells. The timing pattern may indicate corresponding timings that each candidate PUCCH cell, in the candidate PUCCH cells, is configured as a PUCCH cell. The plurality of cells may be deactivated while the candidate PUCCH cells are deactivated. The wireless device may transmit uplink control information via a first cell in the first plurality of candidate PUCCH cells. The wireless device may transmit the uplink control information during a first timing that the first cell is configured as the PUCCH cell based on the timing pattern and while the first cell is deactivated.

In an example, the plurality of cells may further comprise one or more second cells.

In an example, timings that a candidate PUCCH cell, in the candidate PUCCH cells, is configured as the PUCCH cell may be based on the timing pattern.

In an example, a candidate PUCCH cell may be configured with PUCCH resources and may be configured as a PUCCH cell (e.g., is used for transmission of uplink control information) in timings determined based on the timing pattern.

In an example, the plurality of cells may be in a cell group. In an example, the plurality of cells may be provided by a master base station; and the cell group may be a master cell group (MCG). In an example, the plurality of cells are provided by a secondary base station; and the cell group may be a secondary cell group (SCG). In an example, the cell group may be a PUCCH group. In an example, uplink control information, associated with the plurality of cells, may be transmitted via PUCCHs configured for the first plurality of cells (e.g., candidate PUCCH cells). In an example, the uplink control information may comprise hybrid automatic repeat request (HARQ) feedbacks associated with downlink transport blocks (TB s) received via the plurality of cells. In an example, the uplink control information may comprise scheduling request. In an example, the uplink control information may comprise channel state information. In an example, the timing pattern may be for/associated with the PUCCH group. In an example, the PUCCH group may be a primary PUCCH group. In an example, the candidate PUCCH cells may comprise a primary cell. In an example, the PUCCH group may be a secondary PUCCH group. In an example, the candidate PUCCH cells may comprise a PUCCH secondary cell. In an example, the PUCCH secondary cell may be a secondary cell configured with PUCCH.

In an example, the one or more first configuration parameters may indicate the candidate PUCCH cells as cells configured to be candidate PUCCH cell.

In an example, the one or more first configuration parameters may comprise PUCCH configuration parameters of a plurality of PUCCHs for the candidate PUCCH cells. In an example, the PUCCH configuration parameters may indicate PUCCH radio resources for the candidate PUCCH cells.

In an example, the timing pattern may be based on a slot/numerology of a reference cell/carrier. In an example, the reference cell/carrier may be a primary cell (e.g., for the case that the plurality of cells are in a primary PUCCH group). In an example, the reference cell/carrier may be a PUCCH secondary cell (e.g., for the case that the plurality of cells are in a secondary PUCCH group).

In an example, the timing pattern may be configured to be applied periodically based on a period. In an example, the timing pattern may be configured to be periodically repeated based on a period. In an example, the period may be one frame (10 ms). In an example, the one or more second configuration parameters may indicate the period.

In an example, the timing pattern may indicate, for each slot of a reference cell/carrier, an applicable PUCCH cell in the first plurality of cells (e.g., the candidate PUCCH cells).

In an example embodiment, a wireless device may receive, from a base station, one or more first configuration parameters of a plurality of cells comprising a plurality of candidate physical uplink control channel (PUCCH) cells. The wireless device may receive at least one command indicating deactivation of at least one first cell of the plurality of cells such that the plurality of cells are deactivated while the candidate PUCCH cells are deactivated.

In an example, the plurality of cells may further comprise one or more second cells.

In an example, timings that a candidate PUCCH cell, in the candidate PUCCH cells, is configured as the PUCCH cell is based on a timing pattern. In an example, the wireless device may receive one or more second configuration parameters indicating the timing pattern. In an example, a candidate PUCCH cell may be configured with PUCCH resources and may be configured as a PUCCH cell (e.g., may be used for transmission of uplink control information) in timings determined based on the timing pattern.

In an example, the plurality of cells may be in a cell group. In an example, the plurality of cells may be provided by a master base station; and the cell group may be a master cell group (MCG). In an example, the plurality of cells are provided by a secondary base station; and the cell group may be a secondary cell group (SCG). In an example, the cell group may be a PUCCH group. In an example, uplink control information, associated with the plurality of cells, may be transmitted via PUCCHs configured for the first plurality of cells (e.g., candidate PUCCH cells). In an example, the uplink control information may comprise hybrid automatic repeat request (HARQ) feedbacks associated with downlink transport blocks (TB s) received via the plurality of cells. In an example, the uplink control information may comprise scheduling request. In an example, the uplink control information may comprise channel state information. In an example, the timing pattern may be for/associated with the PUCCH group. In an example, the PUCCH group may be a primary PUCCH group. In an example, the candidate PUCCH cells may comprise a primary cell. In an example, the PUCCH group may be a secondary PUCCH group. In an example, the candidate PUCCH cells may comprise a PUCCH secondary cell. In an example, the PUCCH secondary cell may be a secondary cell configured with PUCCH.

In an example, the one or more first configuration parameters may indicate the plurality of candidate PUCCH cells as cells configured to be candidate PUCCH.

In an example, the one or more first configuration parameters may comprise PUCCH configuration parameters of a plurality of PUCCHs for the plurality of candidate PUCCH cells. In an example, the PUCCH configuration parameters may indicate PUCCH radio resources for the plurality of candidate PUCCH cells.

In an example, the timing pattern may be based on a slot of a reference cell/carrier. In an example, the reference cell/carrier may be a primary cell (e.g., for the case that the plurality of cells are in a primary PUCCH group). In an example, the reference cell/carrier may be a PUCCH secondary cell (e.g., for the case that the plurality of cells are in a secondary PUCCH group).

In an example, the wireless device may receive one or more second configuration parameters indicating a timing pattern. The timing pattern may be configured to be applied periodically based on a period. The timing pattern may be configured to be periodically repeated based on a period. In an example, the period may be one frame (10 ms). In an example, the one or more second configuration parameters may indicate the period. In an example, the one or more second configuration parameters may indicate the period. In an example, the timing pattern may indicate, for each slot of a reference cell/carrier, an applicable PUCCH cell in the plurality of candidate PUCCH cells.

In an example embodiment, a wireless device may receive one or more first messages comprising one or more first configuration parameters of a plurality of cells comprising a first plurality of candidate physical uplink control channel (PUCCH) cells and one or more second cells. The wireless device may receive one or more commands indicating deactivation of the one or more second cells. The wireless device may receive one or more second messages indicating changing or removing at least one candidate PUCCH cell in the first plurality of candidate PUCCH cells. The one or more second cells may be deactivated before the receiving the one or more second messages.

In an example embodiment, a wireless device may receive one or more first messages comprising one or more first configuration parameters of a plurality of cells comprising a first plurality of candidate physical uplink control channel (PUCCH) cells and one or more second cells. The wireless device may receive one or more commands indicating deactivation of the one or more second cells. The wireless device may receive one or more second messages indicating changing or removing the candidate PUCCH cells. The one or more second cells may be deactivated before the receiving the one or more second messages.

In an example, the receiving of the one or more second messages may be based on the one or more second cells being deactivated.

In an example, timings that a candidate PUCCH cell, in the candidate PUCCH cells, is configured as the PUCCH cell is based on a timing pattern. In an example, the wireless device may receive one or more second configuration parameters indicating the timing pattern. In an example, a candidate PUCCH cell may be configured with PUCCH resources and may be configured as a PUCCH cell (e.g., may be used for transmission of uplink control information) in timings determined based on the timing pattern.

In an example, the plurality of cells may be in a cell group. In an example, the plurality of cells may be provided by a master base station; and the cell group may be a master cell group (MCG). In an example, the plurality of cells are provided by a secondary base station; and the cell group may be a secondary cell group (SCG). In an example, the cell group may be a PUCCH group. In an example, uplink control information, associated with the plurality of cells, may be transmitted via PUCCHs configured for the first plurality of cells (e.g., candidate PUCCH cells). In an example, the uplink control information may comprise hybrid automatic repeat request (HARQ) feedbacks associated with downlink transport blocks (TB s) received via the plurality of cells. In an example, the uplink control information may comprise scheduling request. In an example, the uplink control information may comprise channel state information. In an example, the timing pattern may be for/associated with the PUCCH group. In an example, the PUCCH group may be a primary PUCCH group. In an example, the candidate PUCCH cells may comprise a primary cell. In an example, the PUCCH group may be a secondary PUCCH group. In an example, the candidate PUCCH cells may comprise a PUCCH secondary cell. In an example, the PUCCH secondary cell may be a secondary cell configured with PUCCH.

In an example, the one or more first configuration parameters may indicate the plurality of candidate PUCCH cells as cells configured to be candidate PUCCH.

In an example, the one or more first configuration parameters may comprise PUCCH configuration parameters of a plurality of PUCCHs for the plurality of candidate PUCCH cells. In an example, the PUCCH configuration parameters may indicate PUCCH radio resources for the plurality of candidate PUCCH cells.

In an example, the timing pattern may be based on a slot of a reference cell/carrier. In an example, the reference cell/carrier may be a primary cell (e.g., for the case that the plurality of cells are in a primary PUCCH group). In an example, the reference cell/carrier may be a PUCCH secondary cell (e.g., for the case that the plurality of cells are in a secondary PUCCH group).

In an example, the wireless device may receive one or more second configuration parameters indicating a timing pattern. The timing pattern may be configured to be applied periodically based on a period. The timing pattern may be configured to be periodically repeated based on a period. In an example, the period may be one frame (10 ms). In an example, the one or more second configuration parameters may indicate the period. In an example, the one or more second configuration parameters may indicate the period. In an example, the timing pattern may indicate, for each slot of a reference cell/carrier, an applicable PUCCH cell in the plurality of candidate PUCCH cells.

In an example embodiment, a wireless device may receive, from a base station, one or more first configuration parameters of a plurality of cells and one or more second configuration parameters of a timing pattern. The plurality of cells may comprise a first plurality of candidate physical uplink control channel (PUCCH) cells and one or more second cells. The timing pattern may indicate corresponding timings that each candidate PUCCH cell, in the candidate PUCCH cells, is configured as a PUCCH cell. The first plurality of cells may be activated based on and/or while at least one second cell, in the one or more second cells, being activated. The wireless device may transmit uplink control information, via a first cell in the first plurality of cells, during a first timing that the first cell is the PUCCH cell based on the timing pattern.

In an example embodiment, a wireless device may receive, from a base station, one or more first configuration parameters of a plurality of cells and one or more second configuration parameters of a timing pattern. The plurality of cells may comprise a first plurality of candidate physical uplink control channel (PUCCH) cells and one or more second cells. The timing pattern may indicate corresponding timings that each candidate PUCCH cell, in the candidate PUCCH cells, is configured as a PUCCH cell. At least one first cell of the first plurality of cells may be activated based on and/or while at least one second cell, in the one or more second cells, being activated. The wireless device may transmit uplink control information, via a first cell in the first plurality of cells, during a first timing that the first cell is the PUCCH cell based on the timing pattern.

In an example, timings that a candidate PUCCH cell, in the candidate PUCCH cells, is configured as the PUCCH cell is based on a timing pattern. In an example, the wireless device may receive one or more second configuration parameters indicating the timing pattern. In an example, a candidate PUCCH cell may be configured with PUCCH resources and may be configured as a PUCCH cell (e.g., may be used for transmission of uplink control information) in timings determined based on the timing pattern.

In an example, the plurality of cells may be in a cell group. In an example, the plurality of cells may be provided by a master base station; and the cell group may be a master cell group (MCG). In an example, the plurality of cells are provided by a secondary base station; and the cell group may be a secondary cell group (SCG). In an example, the cell group may be a PUCCH group. In an example, uplink control information, associated with the plurality of cells, may be transmitted via PUCCHs configured for the first plurality of cells (e.g., candidate PUCCH cells). In an example, the uplink control information may comprise hybrid automatic repeat request (HARQ) feedbacks associated with downlink transport blocks (TB s) received via the plurality of cells. In an example, the uplink control information may comprise scheduling request. In an example, the uplink control information may comprise channel state information. In an example, the timing pattern may be for/associated with the PUCCH group. In an example, the PUCCH group may be a primary PUCCH group. In an example, the candidate PUCCH cells may comprise a primary cell. In an example, the PUCCH group may be a secondary PUCCH group. In an example, the candidate PUCCH cells may comprise a PUCCH secondary cell. In an example, the PUCCH secondary cell may be a secondary cell configured with PUCCH.

In an example, the one or more first configuration parameters may indicate the plurality of candidate PUCCH cells as cells configured to be candidate PUCCH.

In an example, the one or more first configuration parameters may comprise PUCCH configuration parameters of a plurality of PUCCHs for the plurality of candidate PUCCH cells. In an example, the PUCCH configuration parameters may indicate PUCCH radio resources for the plurality of candidate PUCCH cells.

In an example, the timing pattern may be based on a slot of a reference cell/carrier. In an example, the reference cell/carrier may be a primary cell (e.g., for the case that the plurality of cells are in a primary PUCCH group). In an example, the reference cell/carrier may be a PUCCH secondary cell (e.g., for the case that the plurality of cells are in a secondary PUCCH group).

In an example, the wireless device may receive one or more second configuration parameters indicating a timing pattern. The timing pattern may be configured to be applied periodically based on a period. The timing pattern may be configured to be periodically repeated based on a period. In an example, the period may be one frame (10 ms). In an example, the one or more second configuration parameters may indicate the period. In an example, the one or more second configuration parameters may indicate the period. In an example, the timing pattern may indicate, for each slot of a reference cell/carrier, an applicable PUCCH cell in the plurality of candidate PUCCH cells.

Figure 34:
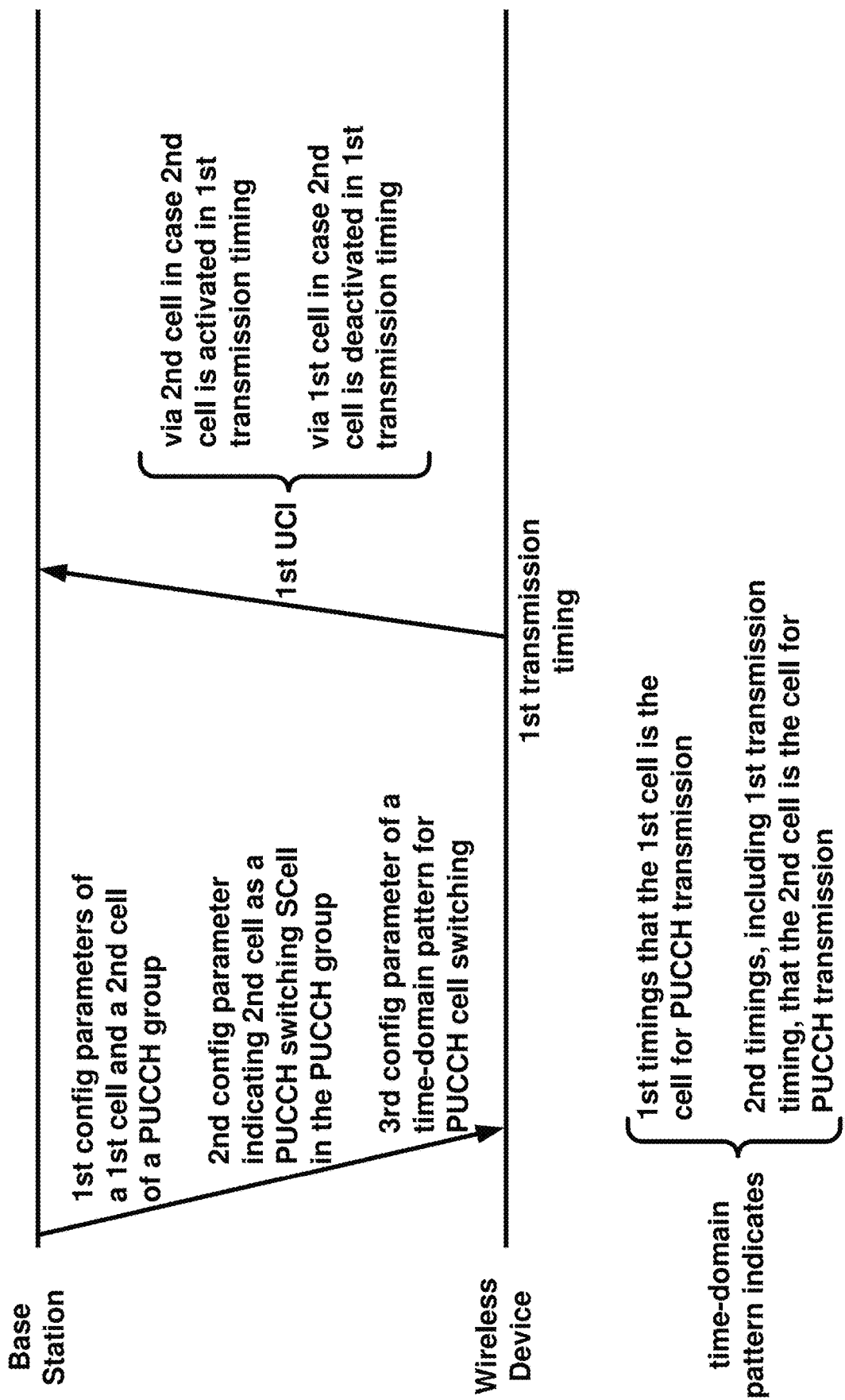
FIG. 34 shows an example process in accordance with several of various embodiments of the present disclosure.

In an example embodiment as shown in FIG. 34, a wireless device may receive one or more messages (e.g., one or more RRC messages) comprising configuration parameters. The configuration parameters may comprise first configuration parameters of a first cell and a second cell, a second configuration parameter and a third configuration parameter. The first cell and the second cell may be in a PUCCH group. A PUCCH group may be a group of cells, wherein uplink control information (e.g., HARQ feedback, CSI, etc.) associated with the cells within the PUCCH group are transmitted via one or more cells of the PUCCH group. A PUCCH group may be referred to as a primary PUCCH group or as a secondary PUCCH group. For example, the first cell may be a primary cell and the PUCCH group may be referred to as a primary PUCCH group. For example, the first cell may be a PUCCH secondary cell and the PUCCH group may be referred to as a secondary PUCCH group. The second cell may be a secondary cell and may be dynamically activated or deactivated (e.g., by an explicit command from the base station or based on expiry of a deactivation timer associated with the second cell). The second configuration parameter may indicate that the second cell is a PUCCH switching secondary cell in the PUCCH group. The first cell and the second cell may be configured for PUCCH transmission in the PUCCH group. For example, the first configuration parameters may comprise PUCCH configuration parameters indicating PUCCH resources for the first cell and the second cell. The uplink control information associated with cells within the PUCCH group may be transmitted via PUCCH configured for the first cell or via PUCCH configured for the second cell according to a time-domain pattern. The time-domain pattern may enable PUCCH cell switching between the first cell and the second cell in the PUCCH group. The third configuration parameter may be of the time-domain pattern and may be for PUCCH cell switching in the PUCCH group. The time domain pattern may indicate and may be used by the wireless device for determining first timings that the first cell is the cell for PUCCH/UCI transmission in the PUCCH group and for determining second timings that the second cell is the cell for PUCCH/UCI transmission in the PUCCH group. The second timings that the second cell is the cell for PUCCH transmission in the PUCCH group (e.g., as indicated by the time domain pattern) may include a first transmission timing. The time domain pattern may indicate that at which slots (e.g., a slot with a duration determined based on numerology of a reference cell, e.g., a primary cell) the first cell is the cell for PUCCH transmission and at which slots the second cell is the cell for PUCCH transmission. The time-domain pattern may repeat according to a periodicity. For example, the time-domain pattern may indicate the cell for PUCCH transmission during N slots and the same pattern may repeat in the subsequent N slots and so on.

The wireless device may transmit first uplink control information (UCI) in the first transmission timing via the second cell or via the first cell depending on the activation/deactivation status of the second cell in the first transmission timing. In response to the second cell being activated in the first transmission timing, the wireless device may transmit the first UCI via the second cell (e.g., via a PUCCH configured for the second cell). In response to the second cell being deactivated in the first transmission timing, the wireless device may transmit the first UCI via the first cell (e.g., via a PUCCH configured for the first cell). For example, the wireless device may receive a first command (e.g., a first SCell Activation/Deactivation MAC CE) indicating deactivation of the second cell. In response to receiving the first command, the wireless device may deactivate the second cell and the second cell may be deactivated in the first transmission timing based on the first command. In response to the second cell being deactivated in the first transmission timing, the wireless device may transmit the first UCI via the first cell in the first transmission timing. In an example, the timing pattern may further indicate that the second cell is the cell configured for PUCCH transmission in a second transmission timing. The wireless device may receive a second command (e.g., a second SCell Activation/Deactivation MAC CE) indicating activation of the second cell. In response to receiving the second command, the wireless device may activate the second cell and the second cell may be activated in the second transmission timing based on the second command. In response to the second cell being activated in the second transmission timing, the wireless device may transmit second UCI via the second cell in the second transmission timing.

In accordance with various exemplary embodiments in the present disclosure, a device (e.g., a wireless device, a base station and/or alike) may include one or more processors and may include memory that may store instructions. The instructions, when executed by the one or more processors, cause the device to perform actions as illustrated in the accompanying drawings and described in the specification. The order of events or actions, as shown in a flow chart of this disclosure, may occur and/or may be performed in any logically coherent order. In some examples, at least two of the events or actions shown may occur or may be performed at least in part simultaneously and/or in parallel. In some examples, one or more additional events or actions may occur or may be performed prior to, after, or in between the events or actions shown in the flow charts of the present disclosure.

FIG. 35 shows an example flow diagram in accordance with several of various embodiments of the present disclosure. At 3510, a wireless device may receive first configuration parameters, a second configuration parameter and a third configuration parameter. The first configuration parameters may be of a first cell and a second cell. The first cell and the second cell may be in a physical uplink control channel (PUCCH) group. The second configuration parameter may indicate the second cell as a PUCCH switching secondary cell in the PUCCH group. The third configuration parameter may be of a time-domain pattern for PUCCH cell switching. The time domain pattern may indicate: first timings that the first cell is a cell for PUCCH transmission, and second timings, comprising a first transmission timing, that the second cell is the cell for PUCCH transmission. At 3520, the wireless device may transmit first uplink control information in the first transmission timing: via the second cell in response to the second cell being activated in the first transmission timing, and via the first cell in response to the second cell being deactivated in the first transmission timing.

In an example embodiment, the wireless device may receive a command indicating deactivation of the second cell. The second cell may be deactivated in the first transmission timing based on the command. The transmitting the first uplink control information in the first transmission timing, at 3520, may be via the first cell.

In an example embodiment, the configuration parameters, received at 3510, may comprise PUCCH configuration parameters indicating PUCCH resources for the first cell and the second cell.

In an example embodiment, the time-domain pattern may be based on a slot duration associated with a numerology of a reference cell. In an example embodiment, the time-domain pattern may indicate whether the first cell or the second cell is the cell for PUCCH transmission during a slot associated with the numerology of the reference cell.

In an example embodiment, the PUCCH group may be a primary PUCCH group. The first cell may be a primary cell.

In an example embodiment, the PUCCH group may be a secondary PUCCH group. The first cell may be a PUCCH secondary cell.

In an example embodiment, the second timings may further comprise a second transmission timing. In an example embodiment, the wireless device may receive a command indicating activation of the second cell. The wireless device may transmit second uplink control information in the second transmission timing via the second cell, in response to the second cell being activated in the second transmission timing based on the command.

In an example embodiment, the time-domain pattern may be repeated based on a periodicity.

Figure 36:
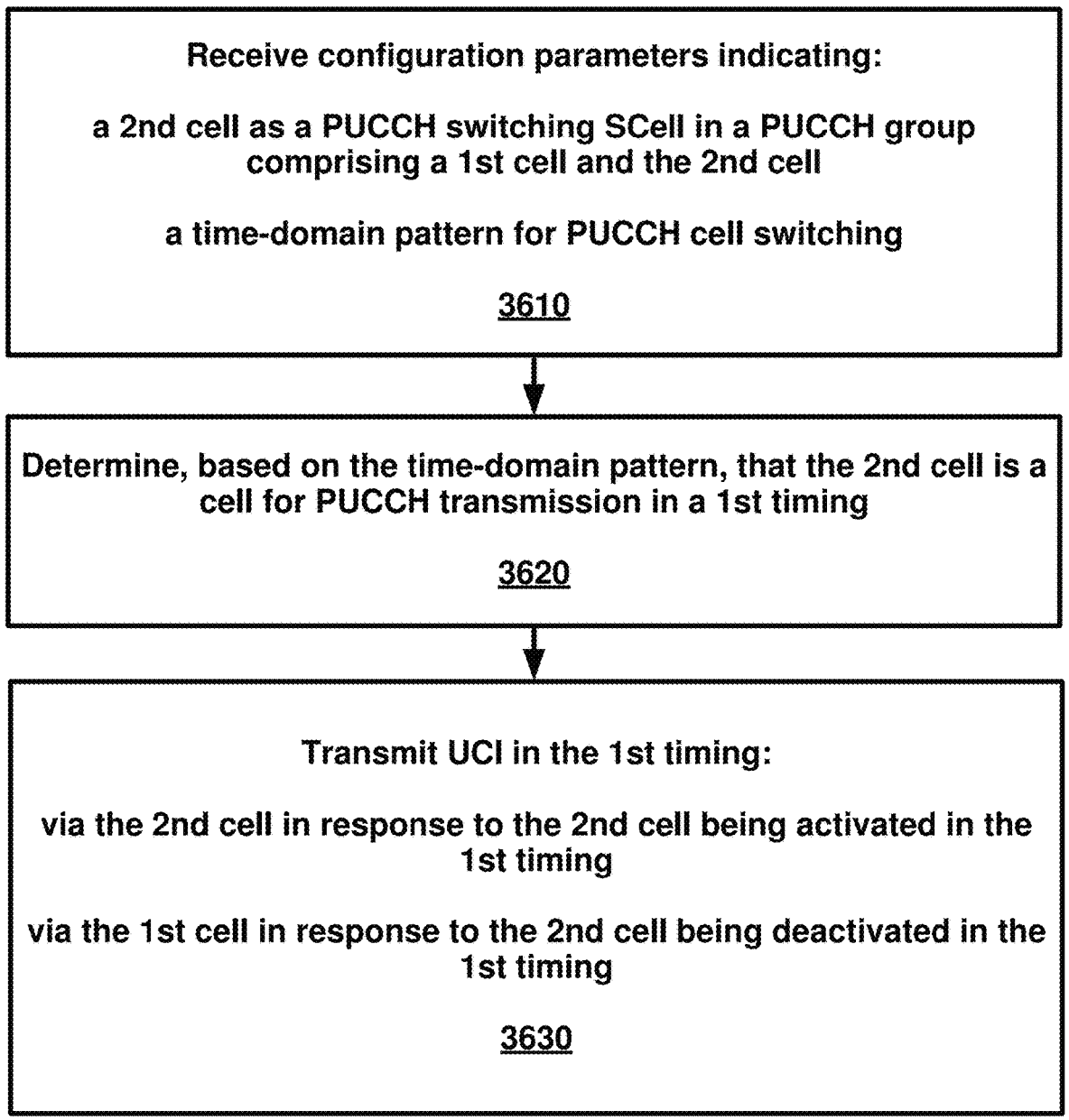
FIG. 36 shows an example flow diagram in accordance with several of various embodiments of the present disclosure.

FIG. 36 shows an example flow diagram in accordance with several of various embodiments of the present disclosure. At 3610, a wireless device may receive configuration parameters indicating: a second cell as a physical uplink control channel (PUCCH) switching secondary cell in a PUCCH group comprising a first cell and the second cell; and a time-domain pattern for PUCCH cell switching. At 3620, the wireless device may determine, based on the time-domain pattern, that the second cell is a cell for PUCCH transmission in a first timing. At 3630, the wireless device may transmit uplink control information in the first timing: via the second cell in response to the second cell being activated in the first timing; and via the first cell in response to the second cell being deactivated in the first timing.

Figure 37:
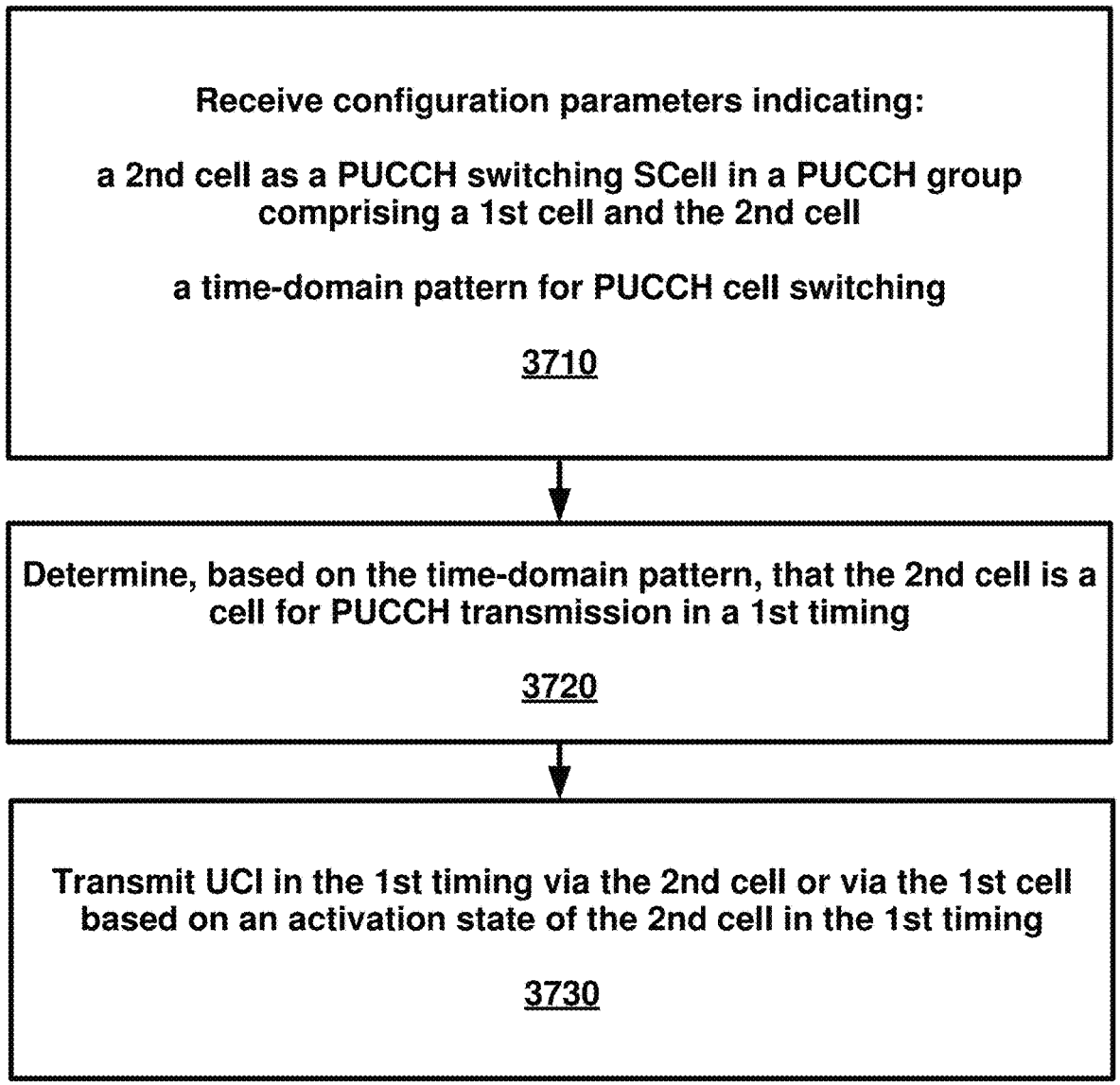
FIG. 37 shows an example flow diagram in accordance with several of various embodiments of the present disclosure.

FIG. 37 shows an example flow diagram in accordance with several of various embodiments of the present disclosure. At 3710, a wireless device may receive configuration parameters indicating: a second cell as a physical uplink control channel (PUCCH) switching secondary cell in a PUCCH group comprising a first cell and the second cell; and a time-domain pattern for PUCCH cell switching. At 3720, the wireless device may determine, based on the time-domain pattern, that the second cell is a cell for PUCCH transmission in a first timing. At 3730, the wireless device may transmit uplink control information in the first timing via the second cell or via the first cell based on an activation state of the second cell in the first timing.

FIG. 38 shows an example flow diagram in accordance with several of various embodiments of the present disclosure. At 3810, a wireless device may receive a configuration parameter of a time-domain pattern indicating: first timings that a first cell in a physical uplink control channel (PUCCH) group is a cell for PUCCH transmission; and second timings, comprising a transmission timing, that that a second cell in the PUCCH group is the cell for PUCCH transmission. At 3820, the wireless device may transmit uplink control information in the transmission timing via the second cell or via the first cell based on an activation state of the second cell in the first timing.

Various exemplary embodiments of the disclosed technology are presented as example implementations and/or practices of the disclosed technology. The exemplary embodiments disclosed herein are not intended to limit the scope. Persons of ordinary skill in the art will appreciate that various changes can be made to the disclosed embodiments without departure from the scope. After studying the exemplary embodiments of the disclosed technology, alternative aspects, features and/or embodiments will become apparent to one of ordinary skill in the art. Without departing from the scope, various elements or features from the exemplary embodiments may be combined to create additional embodiments. The exemplary embodiments are described with reference to the drawings. The figures and the flowcharts that demonstrate the benefits and/or functions of various aspects of the disclosed technology are presented for illustration purposes only. The disclosed technology can be flexibly configured and/or reconfigured such that one or more elements of the disclosed embodiments may be employed in alternative ways. For example, an element may be optionally used in some embodiments or the order of actions listed in a flowchart may be changed without departure from the scope.

An example embodiment of the disclosed technology may be configured to be performed when deemed necessary, for example, based on one or more conditions in a wireless device, a base station, a radio and/or core network configuration, a combination thereof and/or alike. For example, an example embodiment may be performed when the one or more conditions are met. Example one or more conditions may be one or more configurations of the wireless device and/or base station, traffic load and/or type, service type, battery power, a combination of thereof and/or alike. In some scenarios and based on the one or more conditions, one or more features of an example embodiment may be implemented selectively.

In this disclosure, the articles "a" and "an" used before a group of one or more words are to be understood as "at least one" or "one or more" of what the group of the one or more words indicate. The use of the term "may" before a phrase is to be understood as indicating that the phrase is an example of one of a plurality of useful alternatives that may be employed in an embodiment in this disclosure.

In this disclosure, an element may be described using the terms "comprises", "includes" or "consists of" in combination with a list of one or more components. Using the terms "comprises" or "includes" indicates that the one or more components are not an exhaustive list for the description of the element and do not exclude components other than the one or more components. Using the term "consists of" indicates that the one or more components is a complete list for description of the element. In this disclosure, the term "based on" is intended to mean "based at least in part on". The term "based on" is not intended to mean "based only on". In this disclosure, the term "and/or" used in a list of elements indicates any possible combination of the listed elements. For example, "X, Y, and/or Z" indicates X; Y; Z; X and Y; X and Z; Y and Z; or X, Y, and Z.

Some elements in this disclosure may be described by using the term "may" in combination with a plurality of features. For brevity and ease of description, this disclosure may not include all possible permutations of the plurality of features. By using the term "may" in combination with the plurality of features, it is to be understood that all permutations of the plurality of features are being disclosed. For example, by using the term "may" for description of an element with four possible features, the element is being described for all fifteen permutations of the four possible features. The fifteen permutations include one permutation with all four possible features, four permutations with any three features of the four possible features, six permutations with any two features of the four possible features and four permutations with any one feature of the four possible features.

Although mathematically a set may be an empty set, the term set used in this disclosure is a nonempty set. Set B is a subset of set A if every element of set B is in set A. Although mathematically a set has an empty subset, a subset of a set is to be interpreted as a non-empty subset in this disclosure. For example, for set A={subcarrier1, subcarrier2}, the subsets are {subcarrier1}, {subcarrier2} and {subcarrier1, subcarrier2}.

In this disclosure, the phrase "based on" may be used equally with "based at least on" and what follows "based on" or "based at least on" indicates an example of one of plurality of useful alternatives that may be used in an embodiment in this disclosure. The phrase "in response to" may be used equally with "in response at least to" and what follows "in response to" or "in response at least to" indicates an example of one of plurality of useful alternatives that may be used in an embodiment in this disclosure. The phrase "depending on" may be used equally with "depending at least on" and what follows "depending on" or "depending at least on" indicates an example of one of plurality of useful alternatives that may be used in an embodiment in this disclosure. The phrases "employing" and "using" and "employing at least" and "using at least" may be used equally in this in this disclosure and what follows "employing" or "using" or "employing at least" or "using at least" indicates an example of one of plurality of useful alternatives that may be used in an embodiment in this disclosure.

The example embodiments disclosed in this disclosure may be implemented using a modular architecture comprising a plurality of modules. A module may be defined in terms of one or more functions and may be connected to one or more other elements and/or modules. A module may be implemented in hardware, software, firmware, one or more biological elements (e.g., an organic computing device and/or a neurocomputer) and/or a combination thereof and/or alike. Example implementations of a module may be as software code configured to be executed by hardware and/or a modeling and simulation program that may be coupled with hardware. In an example, a module may be implemented using general-purpose or special-purpose processors, digital signal processors (DSPs), microprocessors, microcontrollers, application-specific integrated circuits (ASICs), programmable logic devices (PLDs) and/or alike. The hardware may be programmed using machine language, assembly language, high-level language (e.g., Python, FORTRAN, C, C++ or the like) and/or alike. In an example, the function of a module may be achieved by using a combination of the mentioned implementation methods.

What is claimed is:

1. A method comprising:
transmitting, by a wireless device:
a first capability parameter indicating that the wireless device supports semi-static physical uplink control channel (PUCCH) cell switching; and
a second capability parameter associated with a transitioning time of switching from a first carrier to a second carrier for the semi-static PUCCH cell switching;
receiving:
first configuration parameters of a first cell and a second cell, wherein the first cell and the second cell are in a PUCCH group;
a second configuration parameter indicating the second cell as a PUCCH switching secondary cell in the PUCCH group; and
based on the wireless device capability, a third configuration parameter of a time-domain pattern for the semi-static PUCCH cell switching;
wherein the time-domain pattern indicates:
first timings that the first cell is a cell for PUCCH transmission; and
second timings, comprising a first transmission timing, that the second cell is the cell for PUCCH transmission; and
transmitting first uplink control information in the first transmission timing:
via the second cell in response to the second cell being activated in the first transmission timing; and
via the first cell in response to the second cell being deactivated in the first transmission timing.

2. The method of claim 1, further comprising receiving a command indicating deactivation of the second cell, wherein:
the second cell is deactivated in the first transmission timing based on the command; and
the transmitting the first uplink control information in the first transmission timing is via the first cell.

3. The method of claim 1, wherein the time-domain pattern is based on a slot duration associated with a numerology of the first cell.

4. The method of claim 3, wherein the time domain-pattern indicates whether the first cell or the second cell is the cell for PUCCH transmission during a slot associated with the numerology of the first cell.

5. The method of claim 1, wherein:
the PUCCH group is a primary PUCCH group; and
the first cell is a primary cell.

6. The method of claim 1, wherein:
the PUCCH group is a secondary PUCCH group; and
the first cell is a PUCCH secondary cell.

7. The method of claim 1, wherein the second timings further comprise a second transmission timing.

8. The method of claim 7, further comprising:
receiving a command indicating activation of the second cell; and transmitting second uplink control information in the second transmission timing via the second cell, in response to the second cell being activated in the second transmission timing based on the command.

9. The method of claim 1, wherein the time-domain pattern is repeated based on a periodicity.

10. A wireless device comprising:
one or more processors; and
memory storing instructions that, when executed by the one or more processors, cause the wireless device to:
transmit:
a first capability parameter indicating that the wireless device supports semi-static physical uplink control channel (PUCCH) cell switching; and
a second capability parameter associated with a transitioning time of switching from a first carrier to a second carrier for the semi-static PUCCH cell switching;
receive:
first configuration parameters of a first cell and a second cell, wherein the first cell and the second cell are in a PUCCH group;
a second configuration parameter indicating the second cell as a PUCCH switching secondary cell in the PUCCH group; and
based on the wireless device capability, a third configuration parameter of a time-domain pattern for the semi-static PUCCH cell switching;
wherein the time-domain pattern indicates:
first timings that the first cell is a cell for PUCCH transmission; and
second timings, comprising a first transmission timing, that the second cell is the cell for PUCCH transmission; and
transmit first uplink control information in the first transmission timing:
via the second cell in response to the second cell being activated in the first transmission timing; and
via the first cell in response to the second cell being deactivated in the first transmission timing.

11. The wireless device of claim 10, wherein the instructions, when executed by the one or more processors, further cause the wireless device to receive a command indicating deactivation of the second cell, wherein:
the second cell is deactivated in the first transmission timing based on the command; and
transmitting the first uplink control information in the first transmission timing is via the first cell.

12. The wireless device of claim 10, wherein the time-domain pattern is based on a slot duration associated with a numerology of the first cell.

13. The wireless device of claim 12, wherein the time domain-pattern indicates whether the first cell or the second cell is the cell for PUCCH transmission during a slot associated with the numerology of the first cell.

14. The wireless device of claim 10, wherein:
the PUCCH group is a primary PUCCH group; and
the first cell is a primary cell.

15. The wireless device of claim 10, wherein:
the PUCCH group is a secondary PUCCH group; and
the first cell is a PUCCH secondary cell.

16. The wireless device of claim 10, wherein the second timings further comprise a second transmission timing.

17. The wireless device of claim 16, wherein the instructions, when executed by the one or more processors, further cause the wireless device to:
receive a command indicating activation of the second cell; and
transmit second uplink control information in the second transmission timing via the second cell, in response to the second cell being activated in the second transmission timing based on the command.

18. A system comprising:
a base station; and
a wireless device comprising: one or more processors; and memory storing instructions that, when executed by the one or more processors, cause the wireless device to: transmit: a first capability parameter indicating that the wireless device supports semi-static physical uplink control channel (PUCCH) cell switching; and a second capability parameter associated with a transitioning time of switching from a first carrier to a second carrier for the semi-static PUCCH cell switching; receive: first configuration parameters of a first cell and a second cell, wherein the first cell and the second cell are in a PUCCH group; a second configuration parameter indicating the second cell as a PUCCH switching secondary cell in the PUCCH group; and based on the wireless device capability, a third configuration parameter of a time-domain pattern for the semi-static PUCCH cell switching; wherein the time-domain pattern indicates: first timings that the first cell is a cell for PUCCH transmission; and second timings, comprising a first transmission timing, that the second cell is the cell for PUCCH transmission; and transmit first uplink control information in the first transmission timing: via the second cell in response to the second cell being activated in the first transmission timing; and via the first cell in response to the second cell being deactivated in the first transmission timing.

* * * * *